(12) United States Patent
Wolovitz et al.

(10) Patent No.: US 8,150,431 B2
(45) Date of Patent: Apr. 3, 2012

(54) SERVICE MANAGEMENT SYSTEM AND ASSOCIATED METHODOLOGY OF PROVIDING SERVICE RELATED MESSAGE PRIORITIZATION IN A MOBILE CLIENT

(75) Inventors: Lionel Wolovitz, Lymington (GB); Tim Collins, Helsinki (FI)

(73) Assignee: Visto Corporation, Redwood City, CA (US)

( * ) Notice: Subject to any disclaimer, the term of this patent is extended or adjusted under 35 U.S.C. 154(b) by 129 days.

(21) Appl. No.: 12/770,936

(22) Filed: Apr. 30, 2010

(65) Prior Publication Data

US 2010/0273456 A1 Oct. 28, 2010

Related U.S. Application Data

(63) Continuation of application No. PCT/US2008/082450, filed on Nov. 5, 2008.

(60) Provisional application No. 60/985,354, filed on Nov. 5, 2007.

(51) Int. Cl.
*H04W 4/00* (2009.01)

(52) U.S. Cl. ............. 455/466; 455/414.1; 455/418; 455/412.1; 455/566

(58) Field of Classification Search .......... 455/466, 455/414.1, 418, 412.1, 566
See application file for complete search history.

(56) References Cited

U.S. PATENT DOCUMENTS

| | | | |
|---|---|---|---|
| 7,586,907 B2 | 9/2009 | Kubler et al. | |
| 7,627,349 B2 * | 12/2009 | Vetelainen et al. | 455/566 |
| 7,627,640 B2 | 12/2009 | Gardner et al. | |
| 2003/0182383 A1 | 9/2003 | He | |
| 2005/0216421 A1 | 9/2005 | Barry et al. | |

* cited by examiner

*Primary Examiner* — Nghi Ly
(74) *Attorney, Agent, or Firm* — Oblon, Spivak, McClelland, Maier & Neustadt, L.L.P.

(57) ABSTRACT

A method for managing service messages on a mobile device, the method including receiving at least one service message, assigning a priority to the at least one service message, arranging a plurality of messages and the at least one service message in an electronic mail inbox based on a priority of the plurality of messages and the priority of the at least one service message, the at least one service message having a higher priority than the plurality of messages, and displaying the plurality of messages and the at least one service message in the electronic mail inbox in order of their priority.

34 Claims, 61 Drawing Sheets

SERVICE MANAGEMENT SYSTEM AND ASSOCIATED METHODOLOGY OF PROVIDING SERVICE RELATED MESSAGE PRIORITIZATION IN A MOBILE CLIENT

CROSS REFERENCE TO RELATED APPLICATIONS

The present application is a continuation application of PCT/US08/82450 filed Nov. 5, 2008, which claims the benefit of U.S. provisional application Ser. No. 60/985,354, entitled Service Management System and Associated Methodology of Providing Service Related Message Prioritization in a Mobile Client, filed on Nov. 5, 2007, the entire contents of both of which are incorporated herein by reference.

BACKGROUND

The present advancements in the art relate to the field of mobile communications and, more particularly, a service management system and associated method of providing service related message prioritization in a mobile client. Mobile clients are known in the art. However, in the current state of the art, when there is a service interruption with the mobile client, a user does not have notice of the service interruption and only discovers the interruption upon making a phone call or trying to use the mobile client. A service management system and method does not exist in which a user can receive service related messages on their mobile client, in which the user can easily view service interruptions and take necessary steps to correct the service interruptions in a fast and easy manner.

SUMMARY OF EXEMPLARY ASPECTS OF THE ADVANCEMENTS

A method for managing service messages on a mobile device. The method includes receiving at least one service message and assigning a priority to the at least one service message. The method also includes arranging a plurality of messages and the at least one service message in an electronic mail inbox based on a priority of the plurality of messages and the priority of the at least one service message. The at least one service message has a higher priority than the plurality of messages. The method also includes displaying the plurality of messages and the at least one service message in the electronic mail inbox in order of their priority.

BRIEF DESCRIPTION OF THE SEVERAL VIEWS OF THE DRAWINGS

A more complete appreciation of the advancement and many of the attendant advantages thereof will be readily obtained as the same becomes better understood by reference to the following detailed description when considered in connection with the accompanying drawings, wherein.

DETAILED DESCRIPTION

Figure 1:
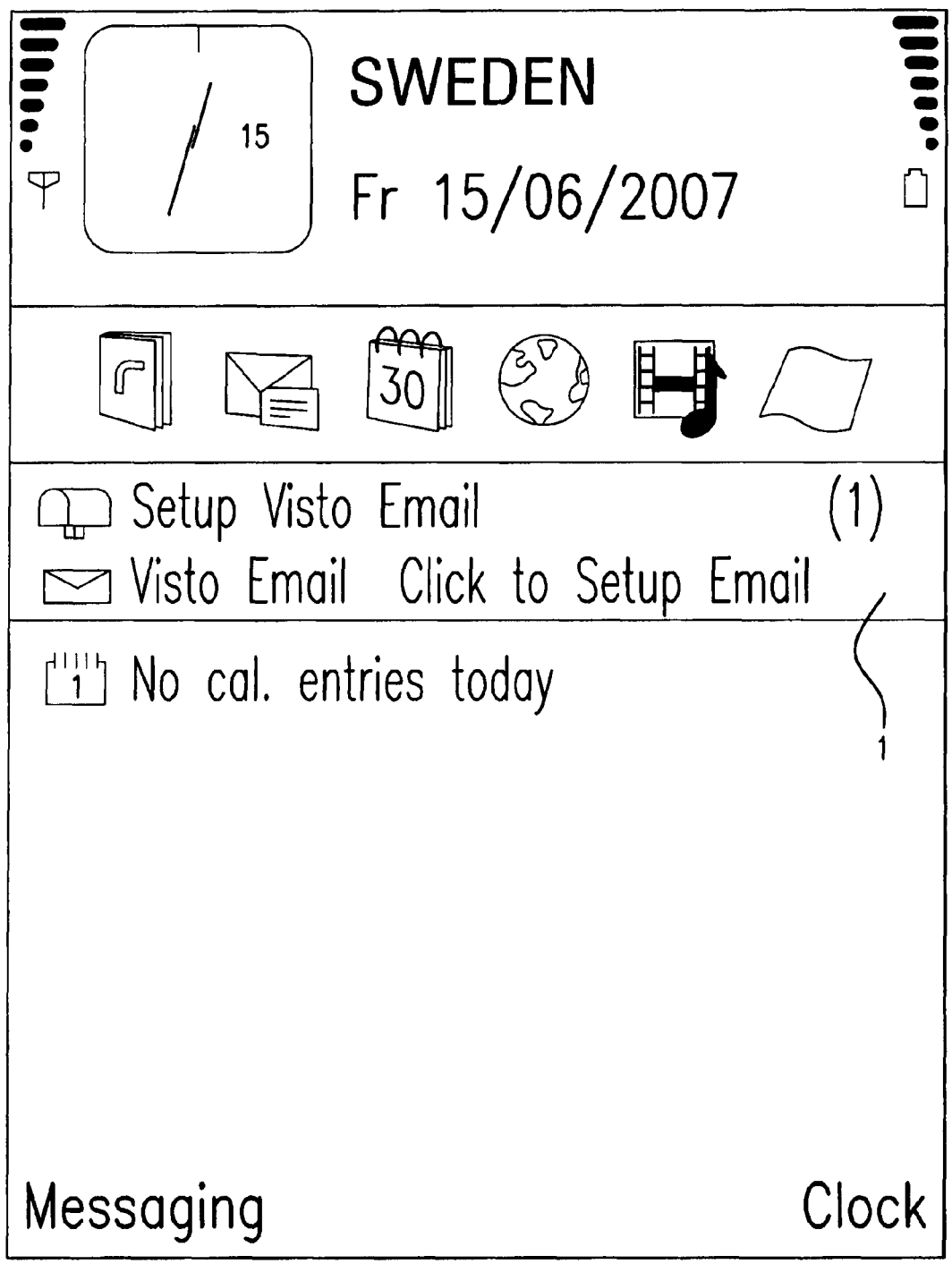
FIG. 1 is a screen shot of an active idle screen of an embodiment of the present advancement.

Certain terminology used in the following description is for convenience only and is not limiting. The term "click" as used herein refers to the usual manner of selecting and accessing textual and graphical based computer information. The term does not limit the present advancement to mouse-based peripherals or like interface devices, but is simply utilized as a shorthand term for describing known computer functionality and processes. An embodiment of the present advancement includes an application for managing service messages. The application is loaded/installed on a user device (e.g. Personal Digital Assistant, smart phone, laptop).

Referring now to the drawings, wherein like reference numerals designate identical or corresponding parts throughout the several views.

Figure 60:
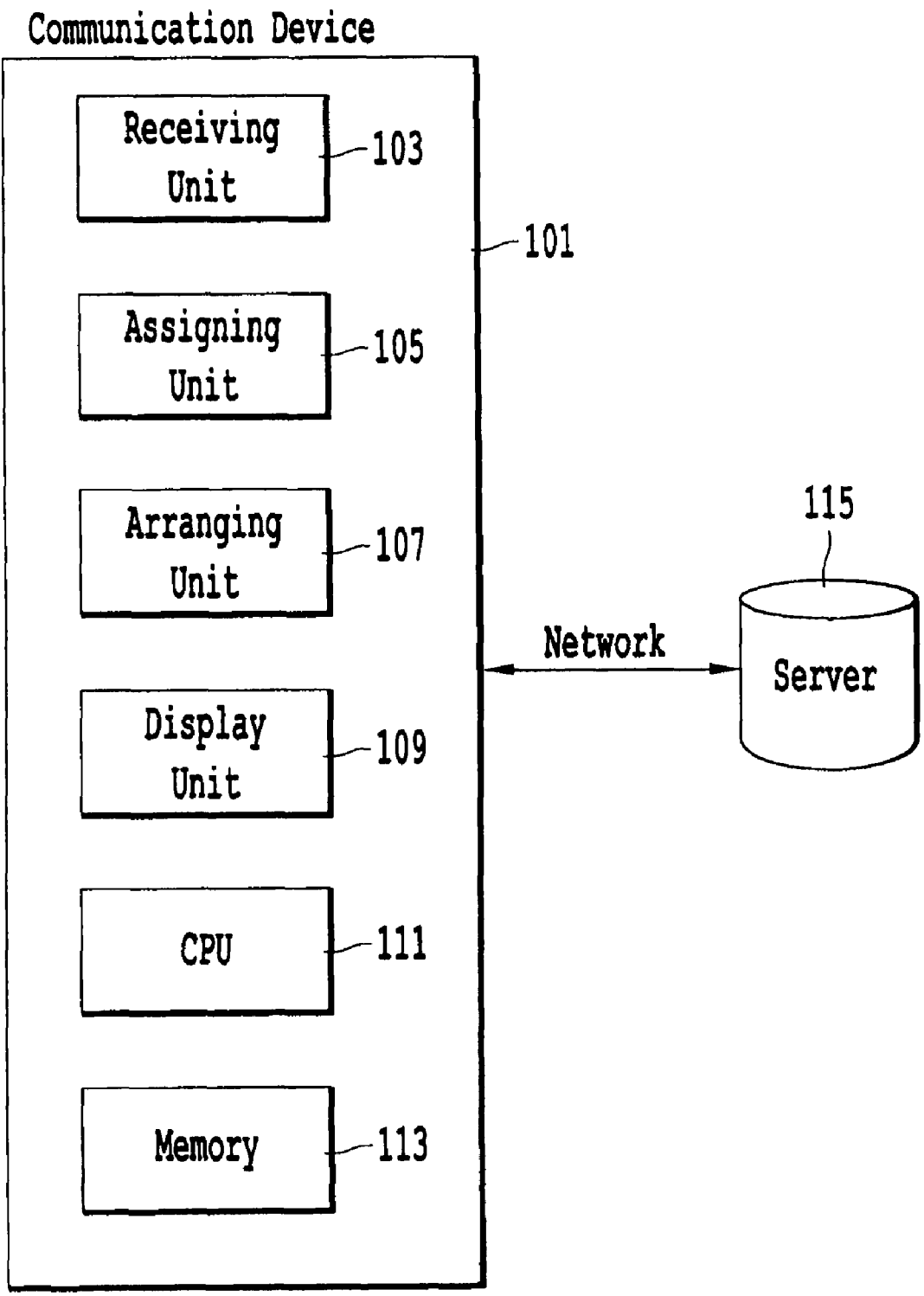
FIG. 60 is block diagram of a system of an embodiment of the present advancement.

FIG. 60 depicts a high level block diagram of an exemplary hardware embodiment of the present advancement. The communication device 101 shown in FIG. 60 can include a receiving unit 103, an assigning unit 105, an arranging unit 107, a display unit 109, a central processing unit (CPU) 111, and a memory 113. The exemplary communication device 101 is configured to access a public network, such as the Internet for connecting to the server 15. Description of routine HTTP protocol handshaking and DNS query processing is omitted here for sake of brevity. The exemplary communication device 101 may also employ other wireless protocols, such as Bluetooth® and I.E.E.E. 802.11x wireless Ethernet, and in smart phone embodiments, employ cellular protocols including 3G and 4G technologies. In the exemplary embodiment, units 103, 105, 107 and 109 may be implemented as separate threads of in a single computer executable instruction set of CPU 111, implemented separately as independent instruction sets. The instruction ses may be provided as a utility application, background daemon, or component of an operating system, or combination thereof executing in conjunction with CPU 11 and an operating system. In more robust devices, the operating system may Microsoft VISTA®, Unix, Solaris, Linux, Apple MAC-OS and other PC/workstation based systems known to those skilled in the art.

Exemplary memory 113 is a semiconductor based memory. Of course those skilled in the art will recognize that other memory mediums are applicable such as optical discs, smart phone SIM cards and the like. Memory required for supporting the registries and like features of the device 101 FIG. 1 is omitted as well known. Likewise a description of the general features of the device 101 such as volatile and/or non-volatile memory, I/O capabilities, etc as well as corresponding functionality have been omitted for brevity. The specific coding and porting of the algorithms described herein is within the ability of one skilled in the art upon review of the specification, flowcharts and drawings.

The receiving unit 103 can receive at least one service message. This service message can be a notification that service is interrupted or that a service update is available.

The assigning unit 105 can assign a priority to at least one service message.

The arranging unit 107 can arrange a plurality of messages and the at least one service message in an electronic mail inbox based on a priority of the plurality of messages and the priority of the at least one service message.

The display unit 109 displays several menus to the user and can display a plurality of messages and at least one service message in an electronic mail inbox in order of their priority. The display unit 109 could be, for example, a liquid crystal display having a touch screen interface for actuating and managing the methodology discussed herein. The CPU 111 executes instructions stored in the memory 113 and controls the overall functionality of the communication device 101, and the hardware components associated with the communication device 101. In the exemplary communication device 101 a graphical user interface (GUI) based operating system is described. Preferably, the operating system is based upon commercially available systems such as Symbian®, Android® or Windows Mobile® products. The communication device 101 communicates with a server 115 over a network, e.g. a wireless network. A further exemplary platform on which the methodology described herein may be implemented is described in U.S. Pat. No. 6,085,192 to Visto Corporation entitled "System and method for securely synchronizing multiple copies of a workspace element in a network," the entire contents of which is hereby incorporated by reference.

Figure 2:
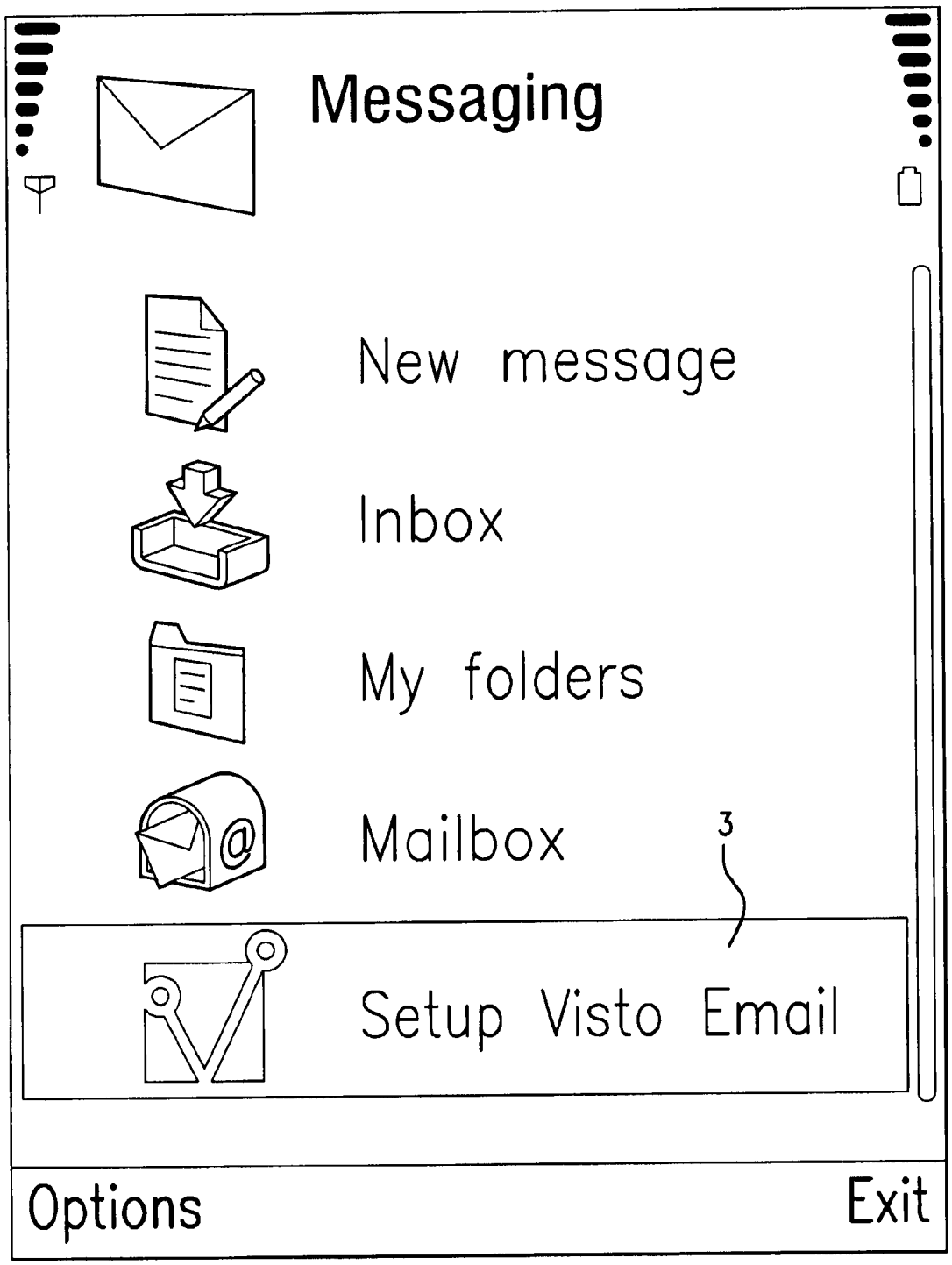
FIGS. 2-4 are screen shots of a setup menu of an embodiment of the present advancement.
Figure 3:
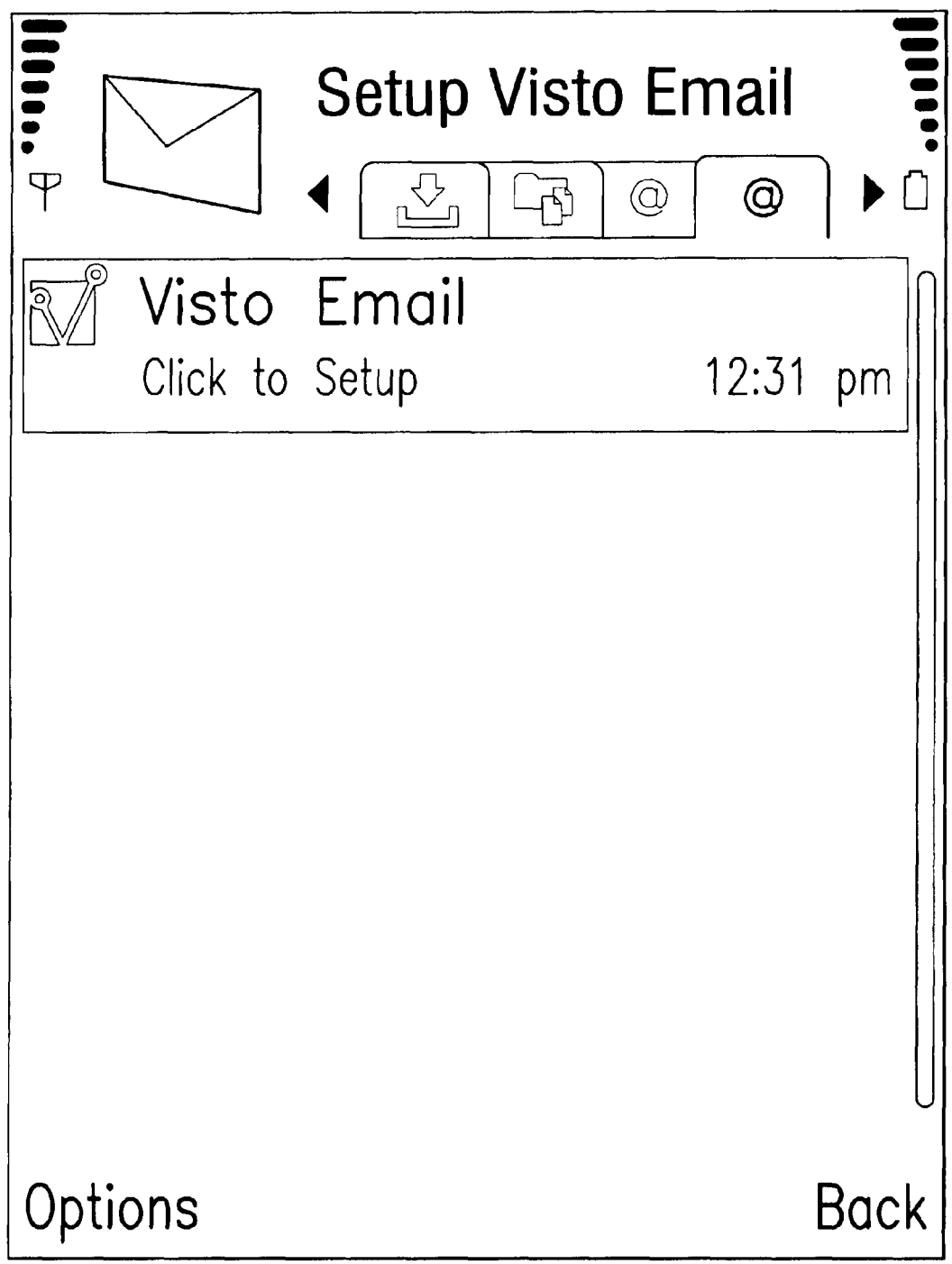
Figure 4:
Figure 5:
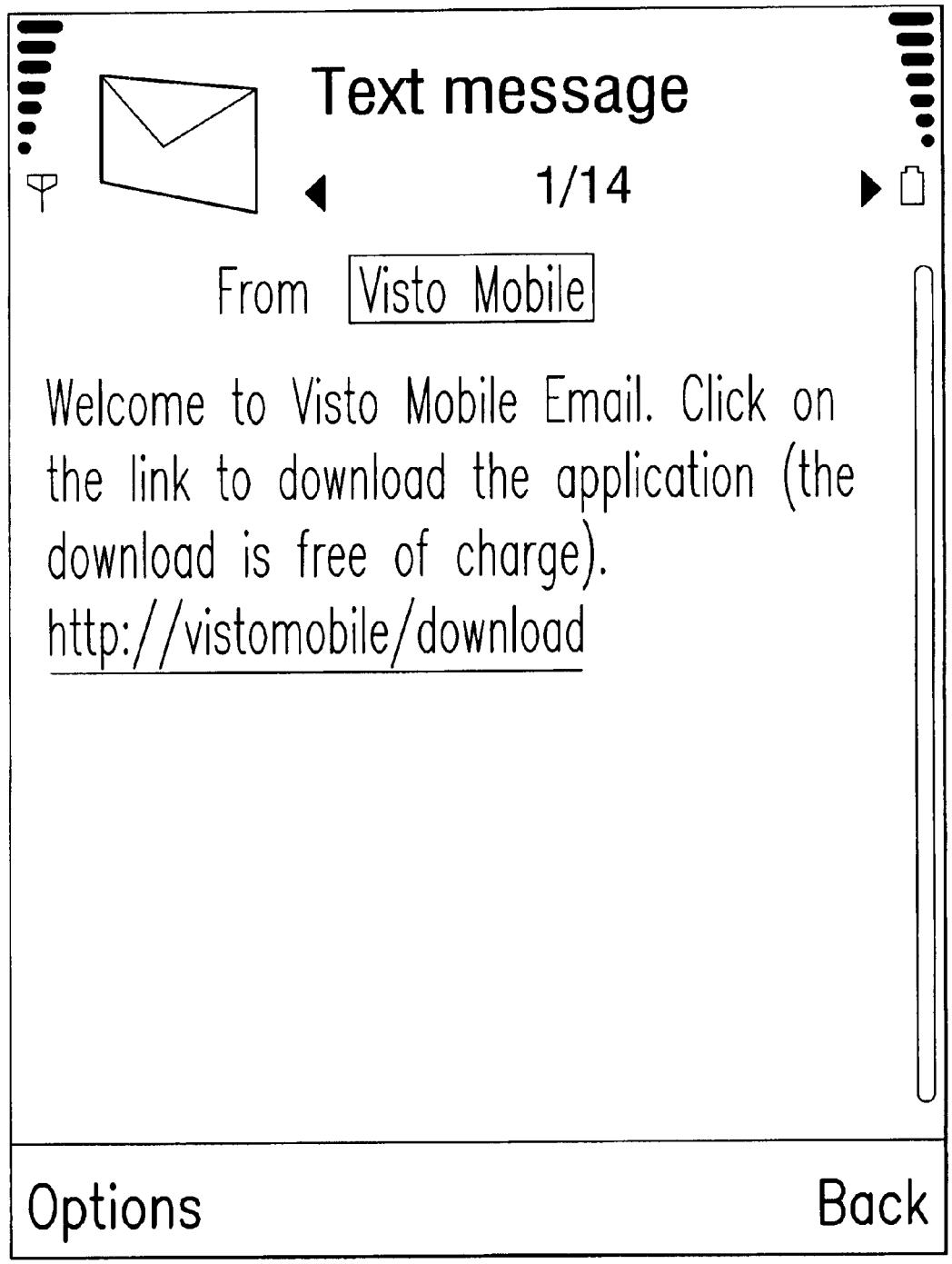
FIGS. 5 and 6 are screen shots of menus in which software applications can be downloaded.
Figure 6:
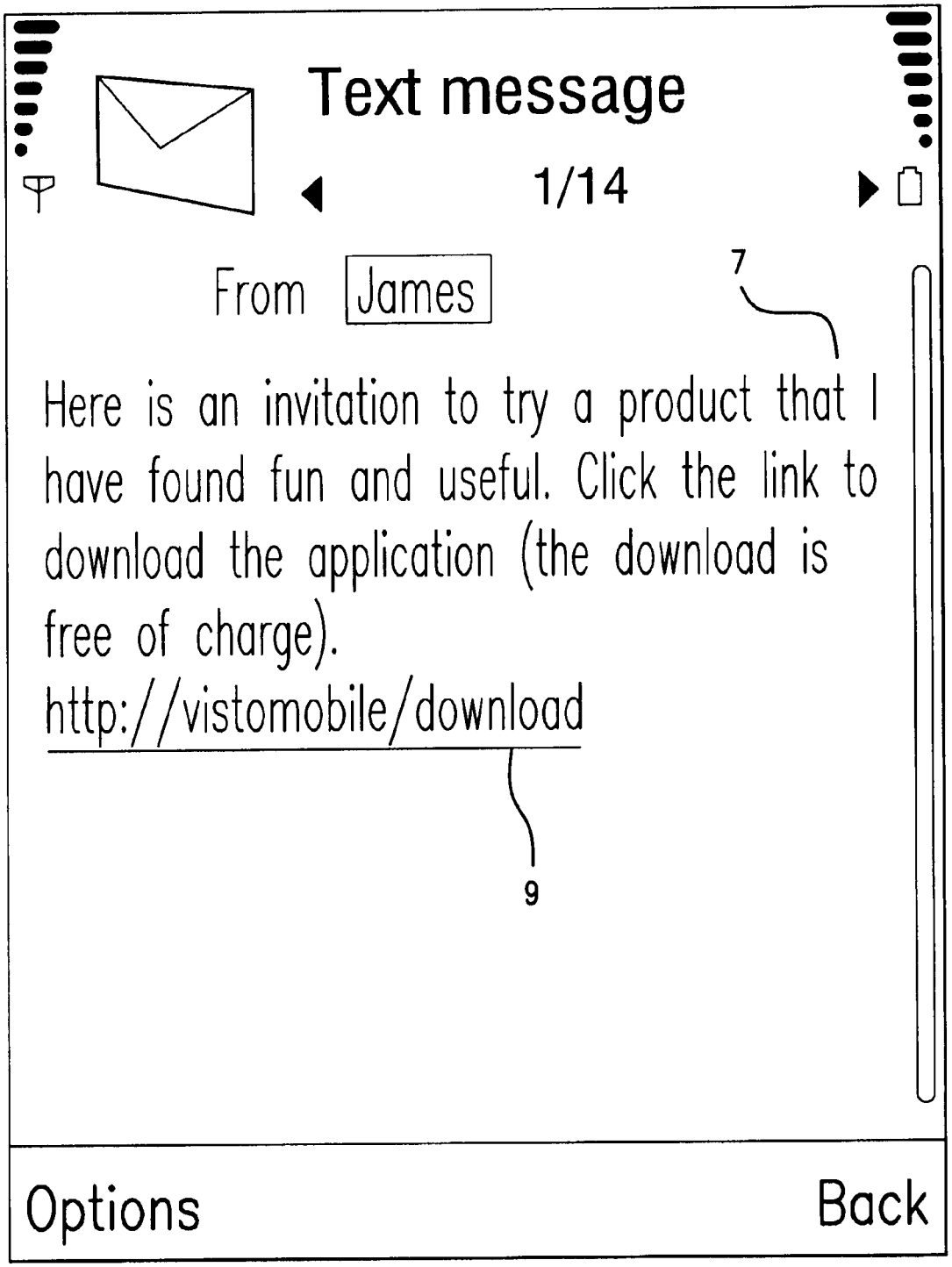
Figure 7:
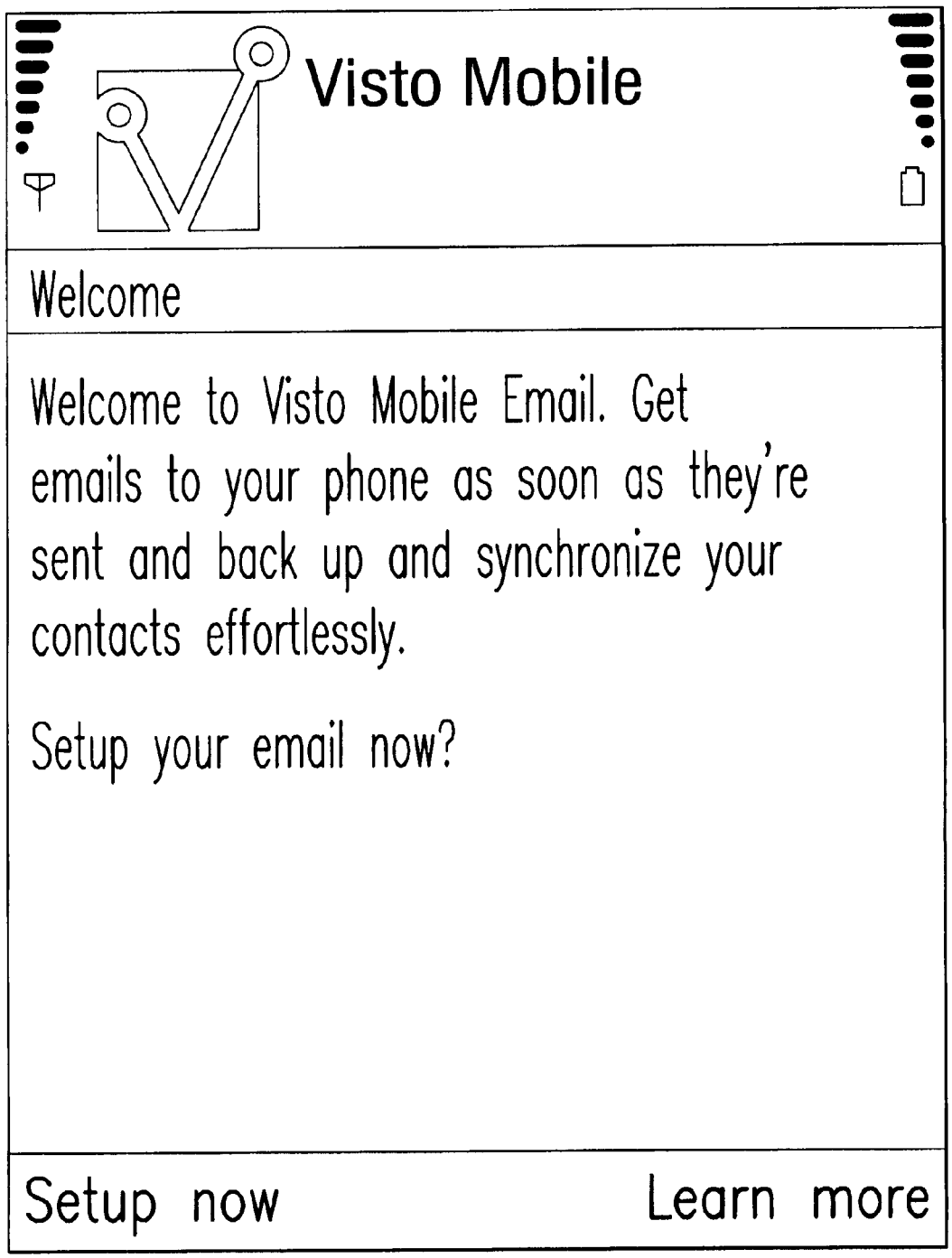
FIG. 7 is a screen shot of a setup menu for an embodiment of the present advancement.

Various menus and screens that are displayed by the display unit 109 of the communication device 101 will now be described with reference to FIGS. 1-59. A user can discover an application to be run on the communication device 101 through a call to action on the communication device 101. This call to action may, for example, be a link 1 to set up a mailbox from an Active Idle Screen, as shown in FIG. 1. Also, from the messaging menu shown in FIG. 2, a link 3 to a predefined mailbox item may be displayed prompting the user to setup the application. FIG. 3 similarly shows a setup menu in which a user can set up the application. By clicking on the application logo 5 on the program menu, shown in FIG. 4, the user can launch the setup process of the application. A user may click on the predefined mailbox to launch the setup process. FIGS. 5 and 6 show a link displayed within a text message in which a user can download the application. FIG. 7 is a screen shot of a setup menu in which a user can setup email and synchronize contacts.

The application may not initially be stored on a user's device, but is installed on the user's device after the user purchases the device. For example, if the application is not pre-installed on the user's device, service discovery can still be triggered by customer care or by a recommendation from a friend. The invitation 7 (shown in FIG. 6) to use the application could come from, for example, a customer service representative or sent over the network to the device. If a recommendation to use the application comes from a current subscriber, the new user could click on a link 9 displayed in a graphical user interface to start an automatic download of the designated application, followed by installation on the device.

Figure 8:
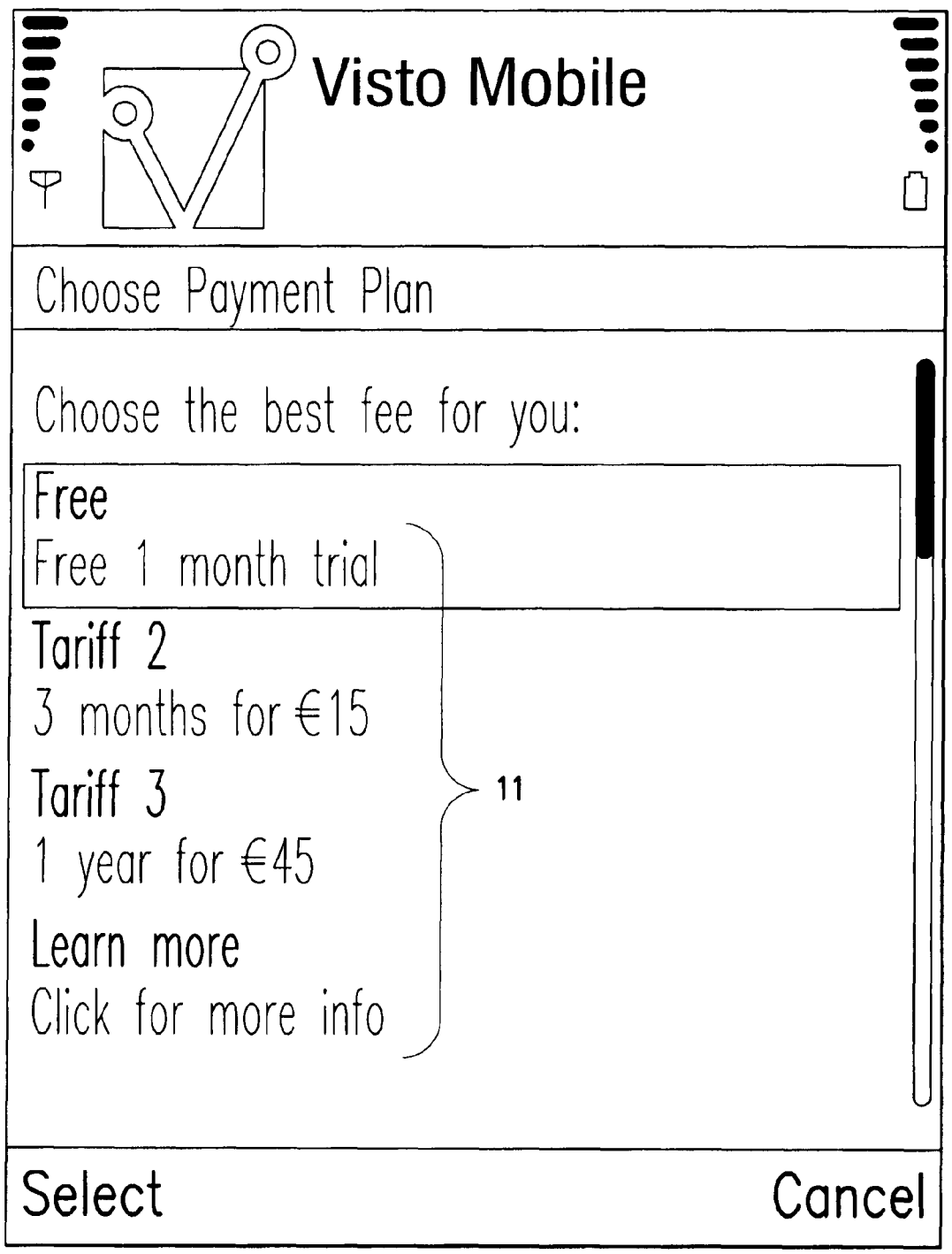
FIG. 8 is a screen shot of a subscription menu for an embodiment of the present advancement.
Figure 9:
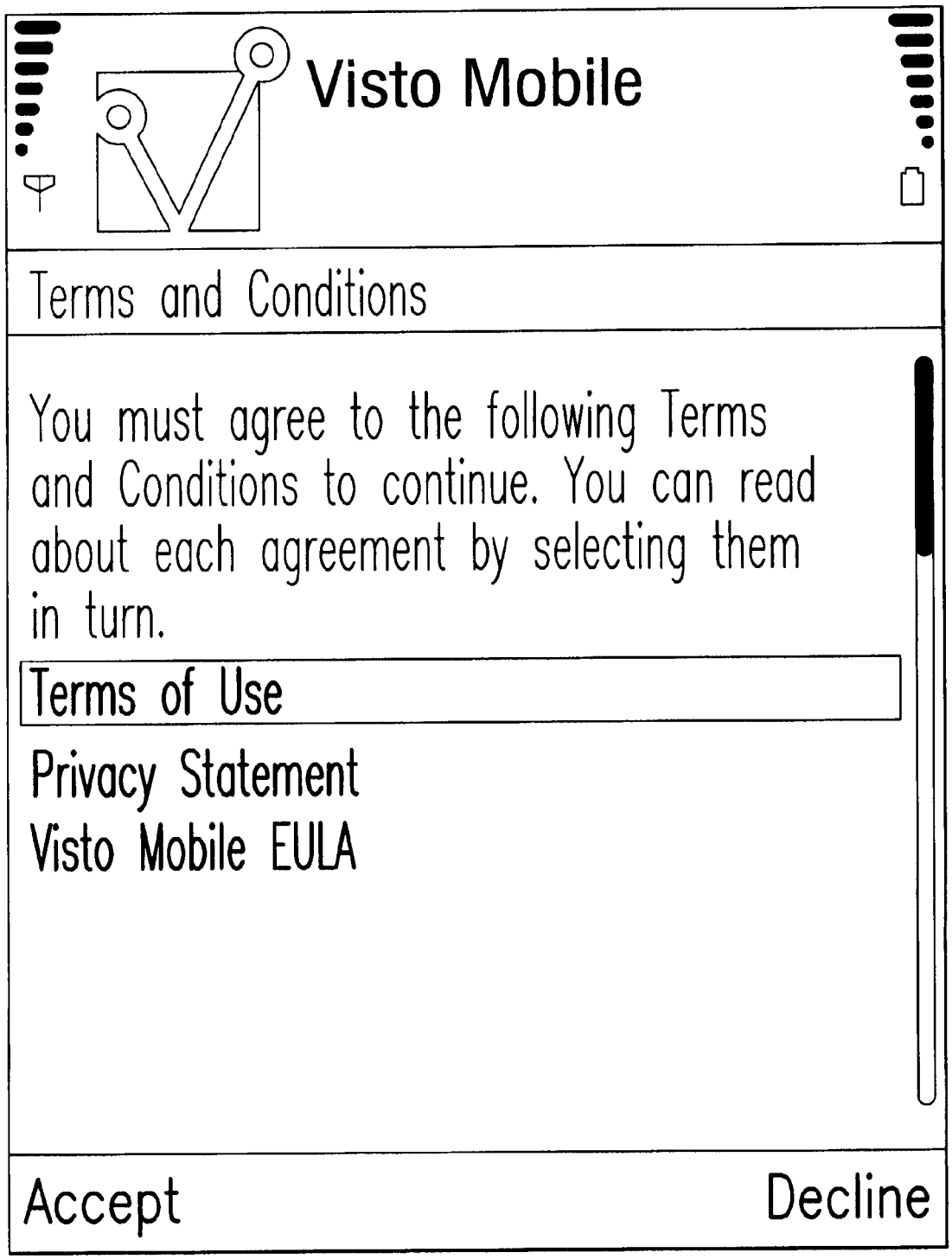
FIG. 9 is a screen shot of a terms and conditions menu for an embodiment of the present advancement.

Once the application is installed on the user's device, the setup process is configured to be launched, for example, from a special email, an application icon in the main menu, or automatically after full installation of the client application. The setup process triggers a subscription selection process shown in FIGS. 8 and 9, where the user is prompted to select an appropriate subscription 11 for the service and different payment plans can be selected. The available payment plans may be retrieved from a server. Server components may include a windows based operating system, however alternative operating systems may include, but are not limited to Unix, Solaris, Linux, as well as Apple MAC-OS. Thus, the web server provides the front end for connection to the network such as the Internet. In the exemplary embodiment, a web server would employ Microsoft® Windows Server 2008, Active Directory, and FTP.

The user can then select an appropriate subscription and corresponding fee from a list displayed on the graphical user interface of the user's device. The subscription selection process activates the application and registers the commercial arrangement (i.e. terms and conditions) between the user and the operator (i.e. manufacturer of the application).

Figure 10:
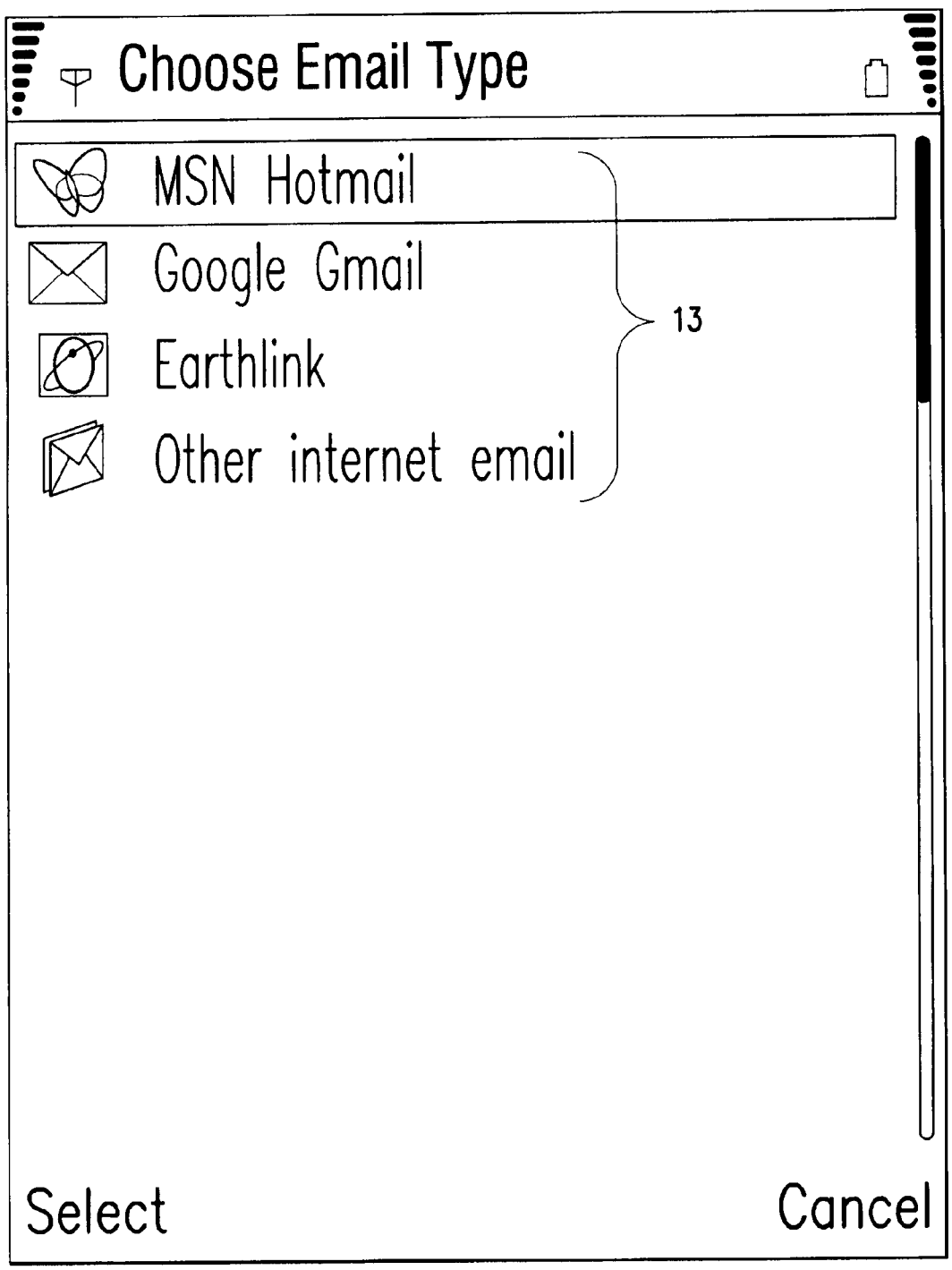
FIG. 10 is a screen shot of an email setup menu for an embodiment of the present advancement.
Figure 11:
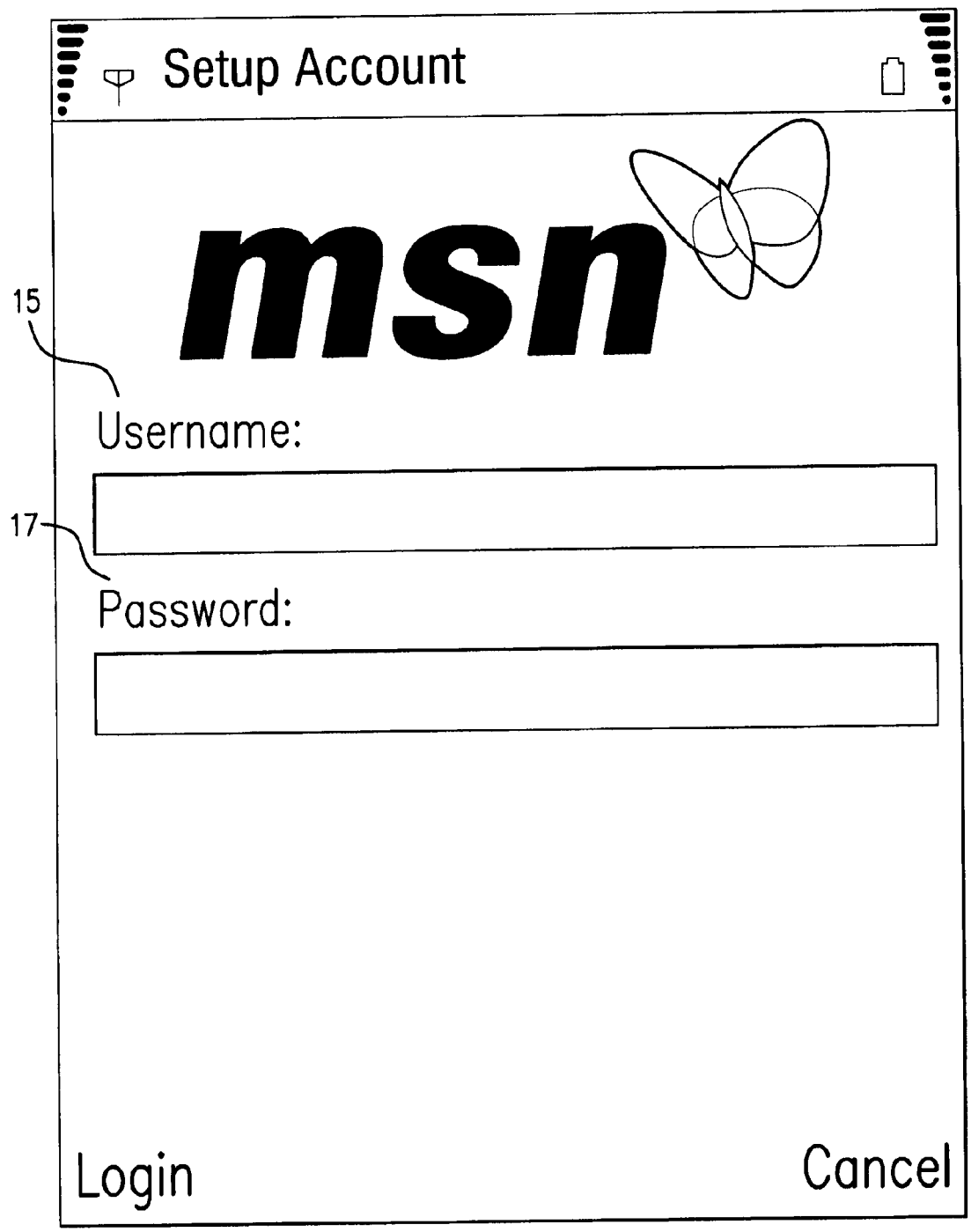
FIG. 11 is a screen shot of a login menu for an embodiment of the present advancement.
Figure 12:
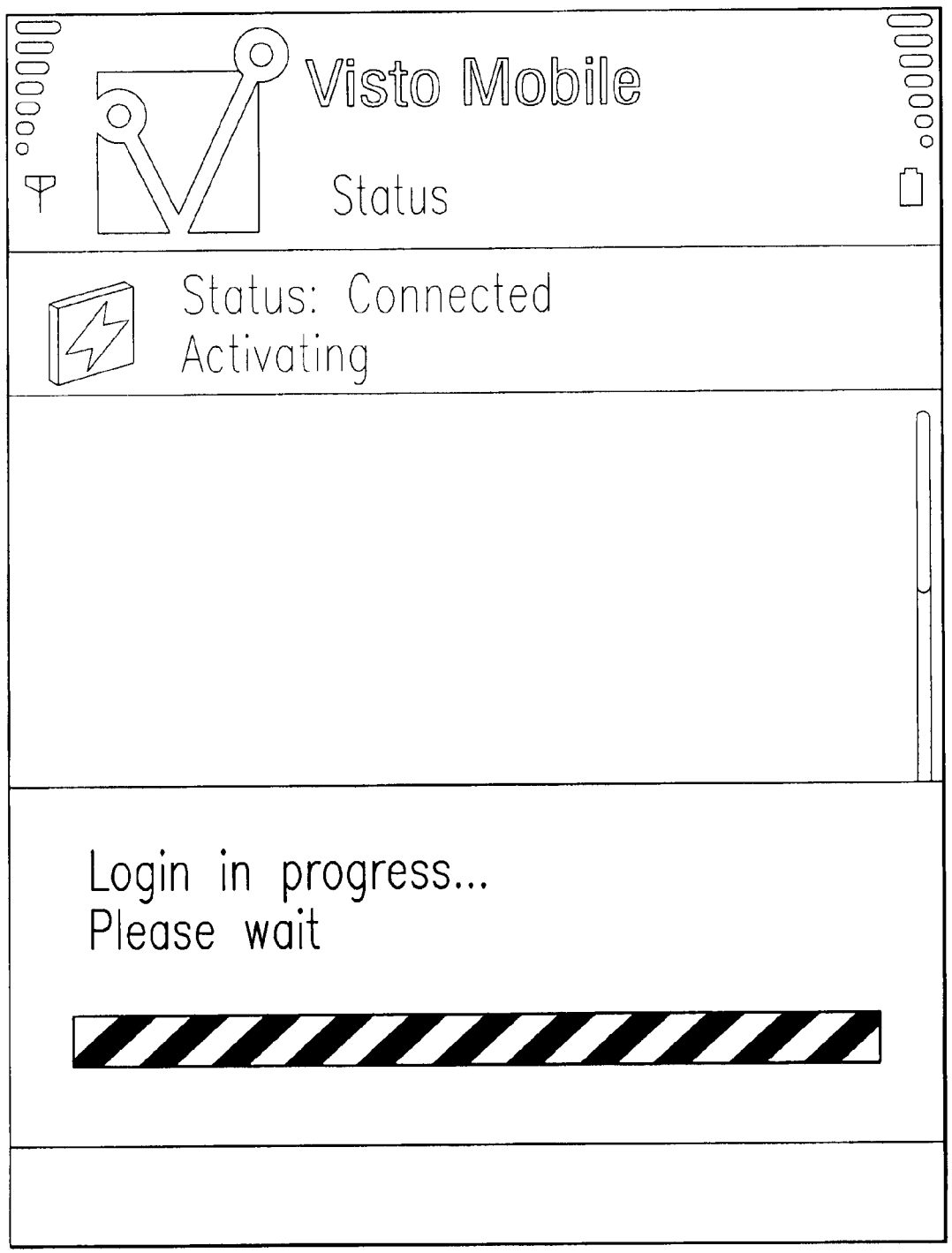
FIG. 12 is a screen shot of a login status screen for an embodiment of the present advancement.
Figure 13:
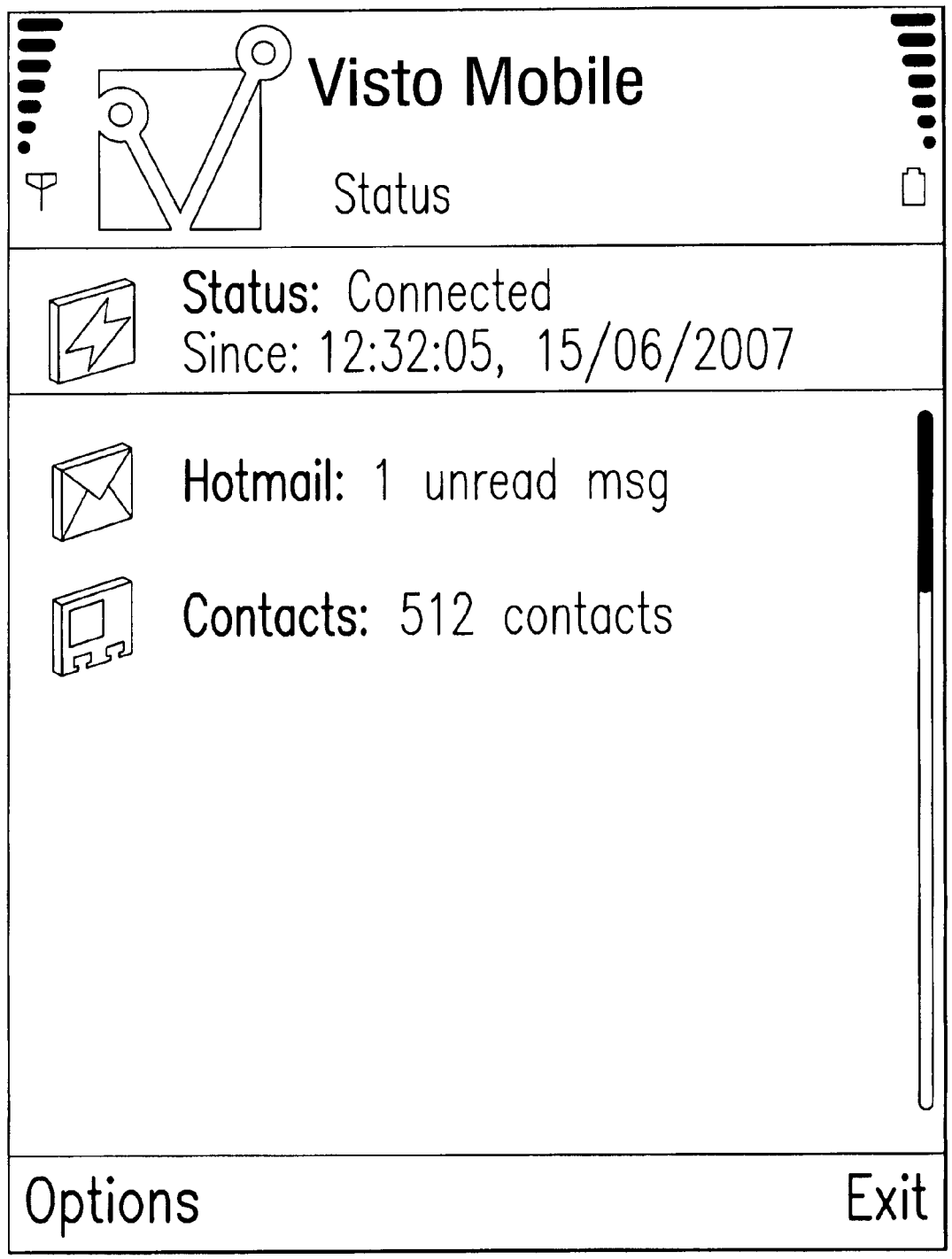
FIG. 13 is a screen shot of a connection status screen for an embodiment of the present advancement.
Figure 14:
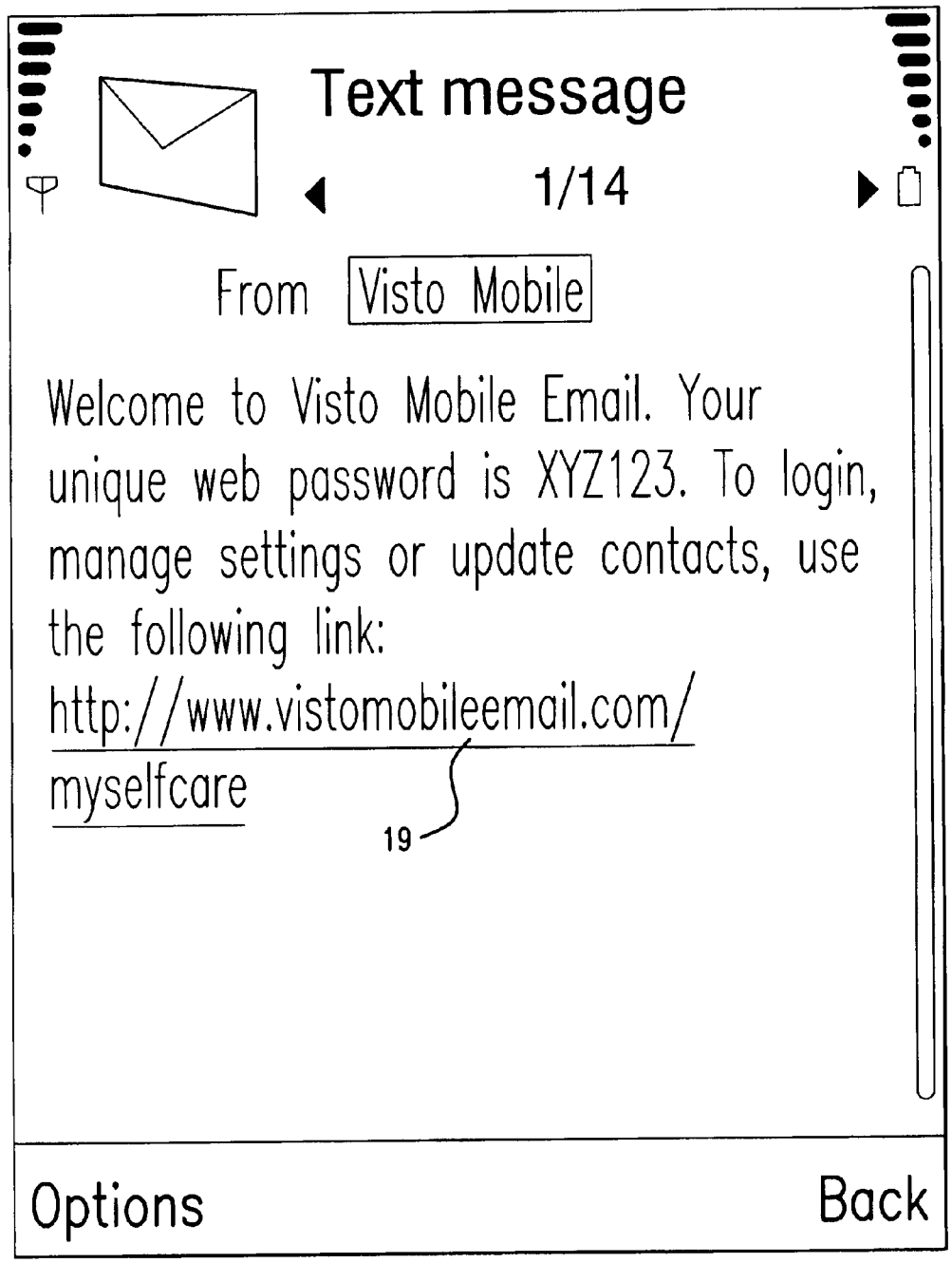
FIG. 14 is a screen shot of a text message containing a web password for an embodiment of the present advancement.

Once the service has been activated, the user is asked to configure a first mailbox for the application. First, as shown in FIG. 10, the user is asked to select a service provider from a list of service providers 13 or create a standard ISP account. The domain will be pre-filled with the default settings of the service provider. The user is only required to enter a username 15 and password 17 as shown in FIG. 11. While the login is in progress, a login status screen as shown in FIG. 12 is displayed. The account is then added to a mailbox view of the GUI, shown in FIG. 13, and a first synchronization process is performed. In addition, the user has the ability to manage their settings and update their contacts from a self-care website which is configured to be accessed by the user's device or via the interne from a personal computer. The user is sent the link 19 and password to the self-care website, as shown in FIG. 14. Also, personal information management (PIM) data on the device is configured to be automatically backed up via a mobile PIM service.

Figure 15:
FIG. 15 is a screen shot of a message inbox for an embodiment of the present advancement.
Figure 16:
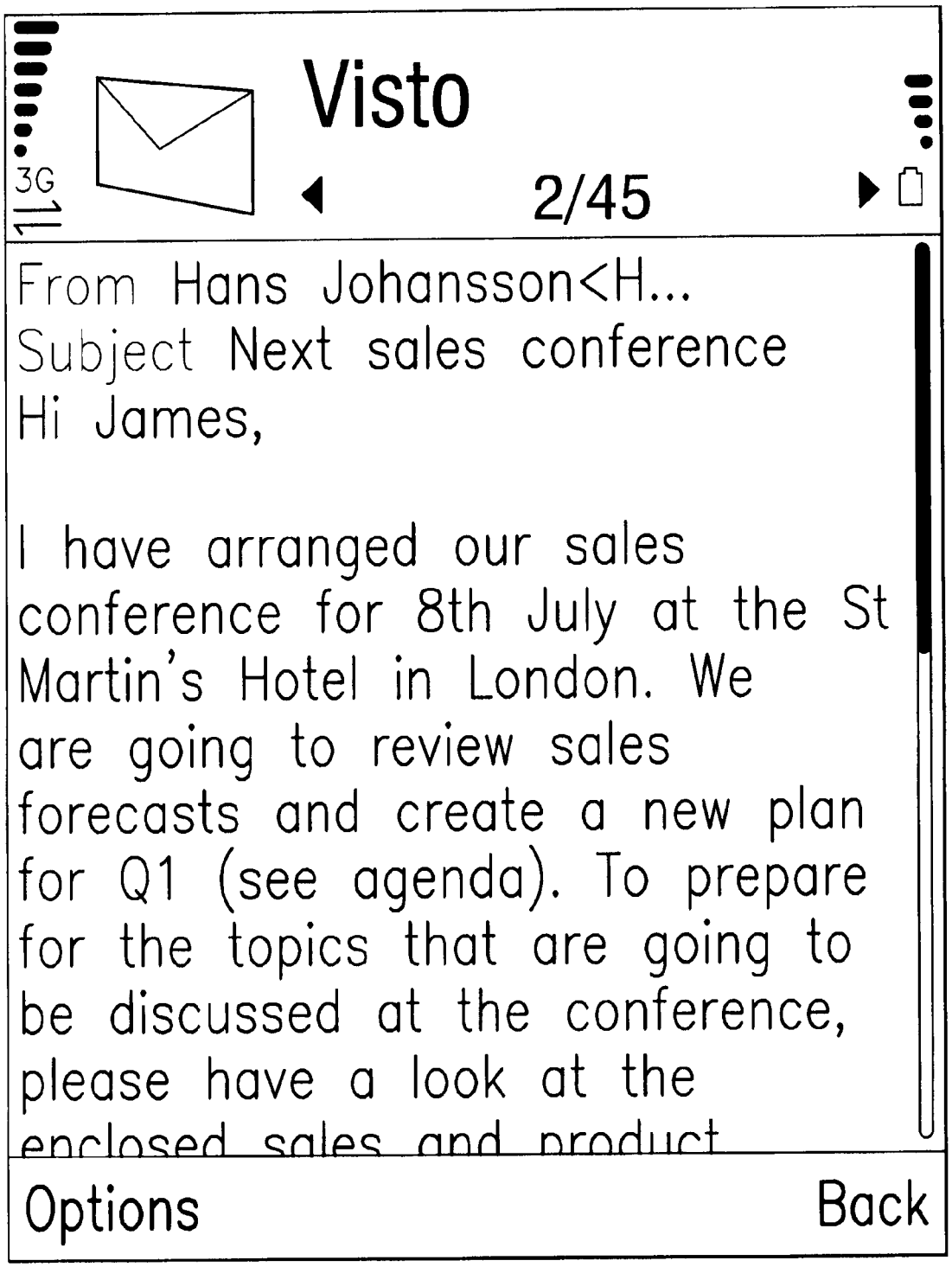
FIG. 16 is a screen shot of a message displayed on an embodiment of the present advancement.
Figure 17:
FIG. 17 is a screen shot of an options menu for an embodiment of the present advancement.
Figure 18:
FIGS. 18-20 are screen shots of an attachment selection menu for an embodiment of the present advancement.
Figure 19:
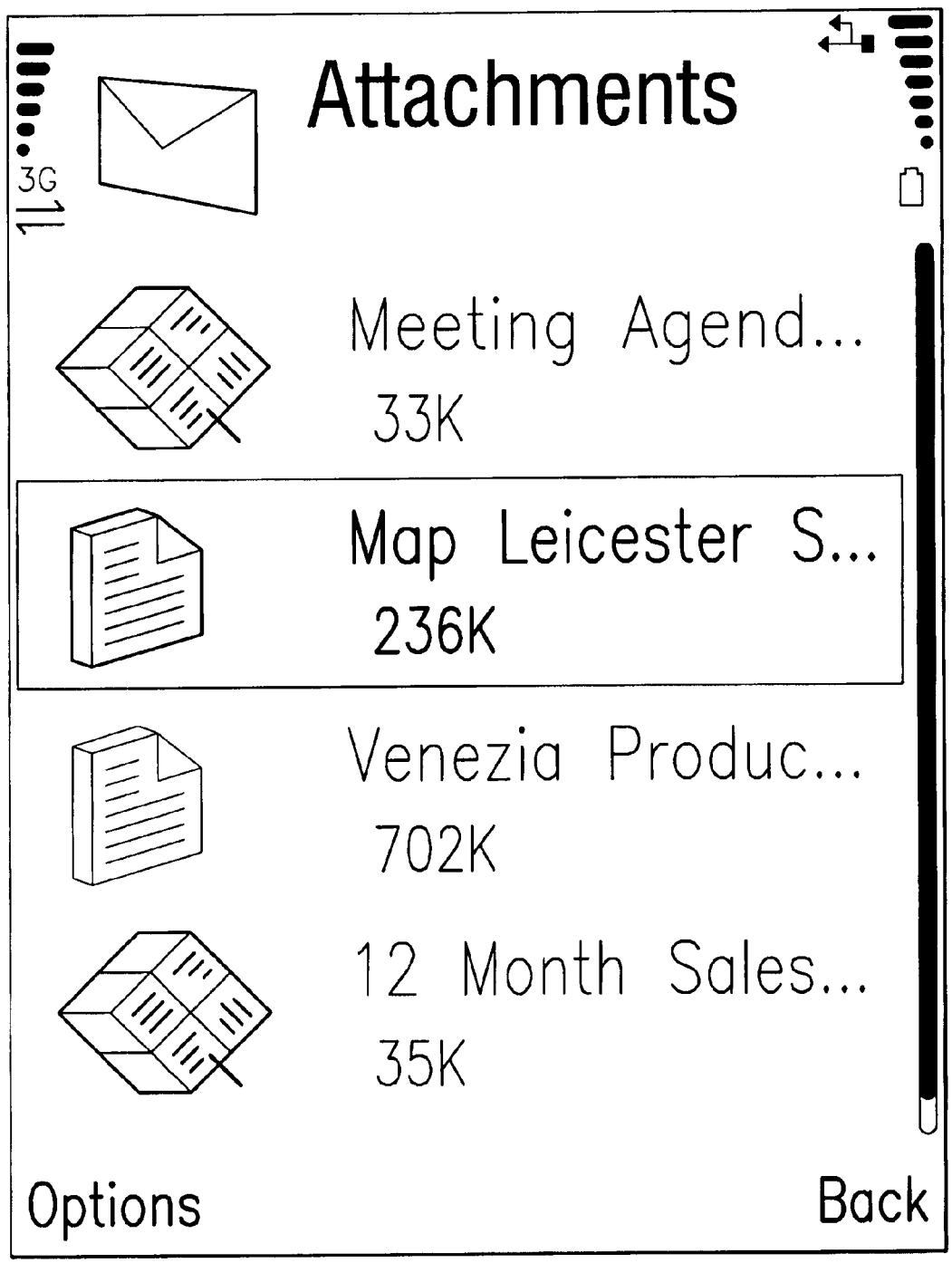
Figure 20:
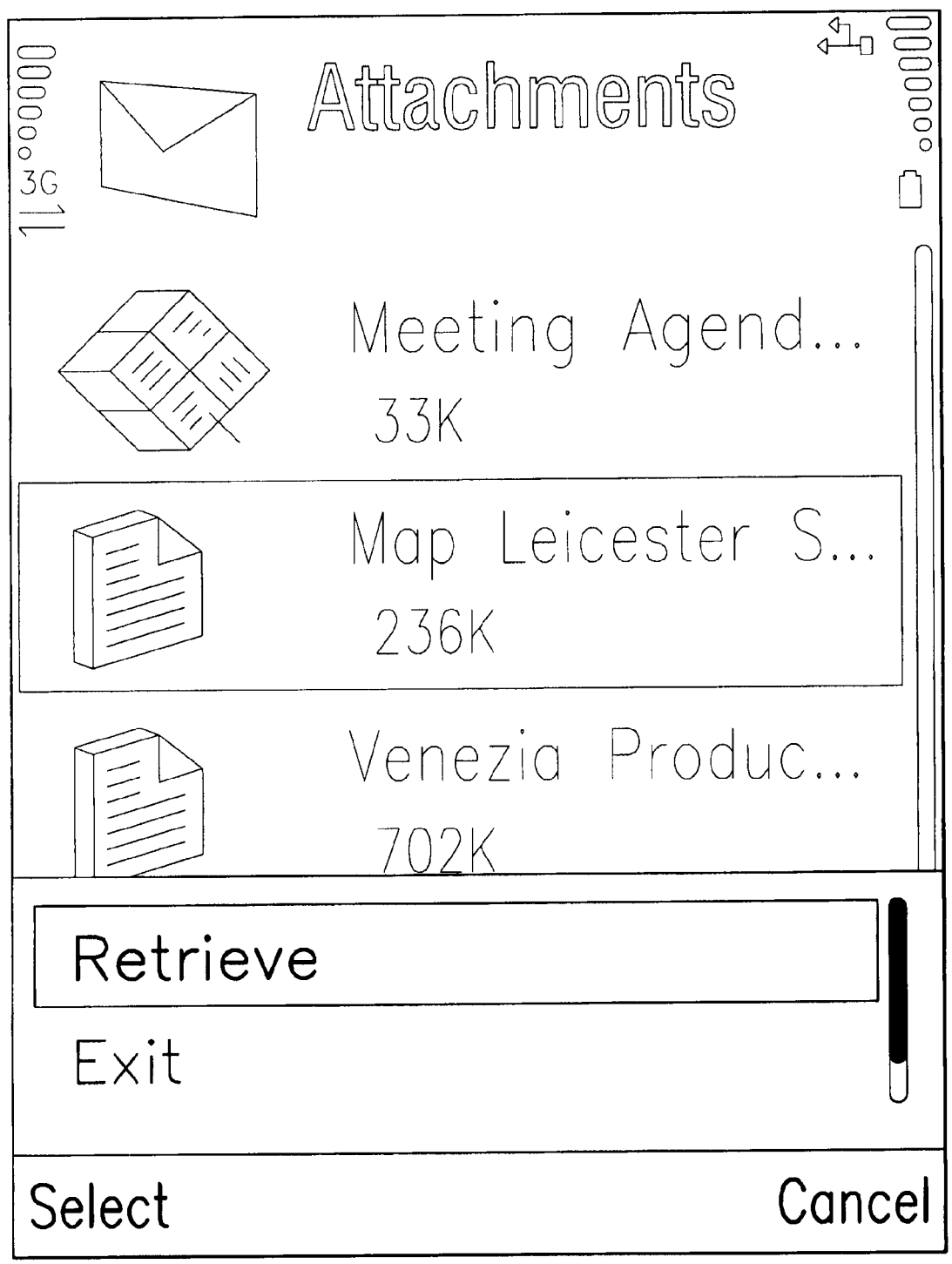
Figure 21:
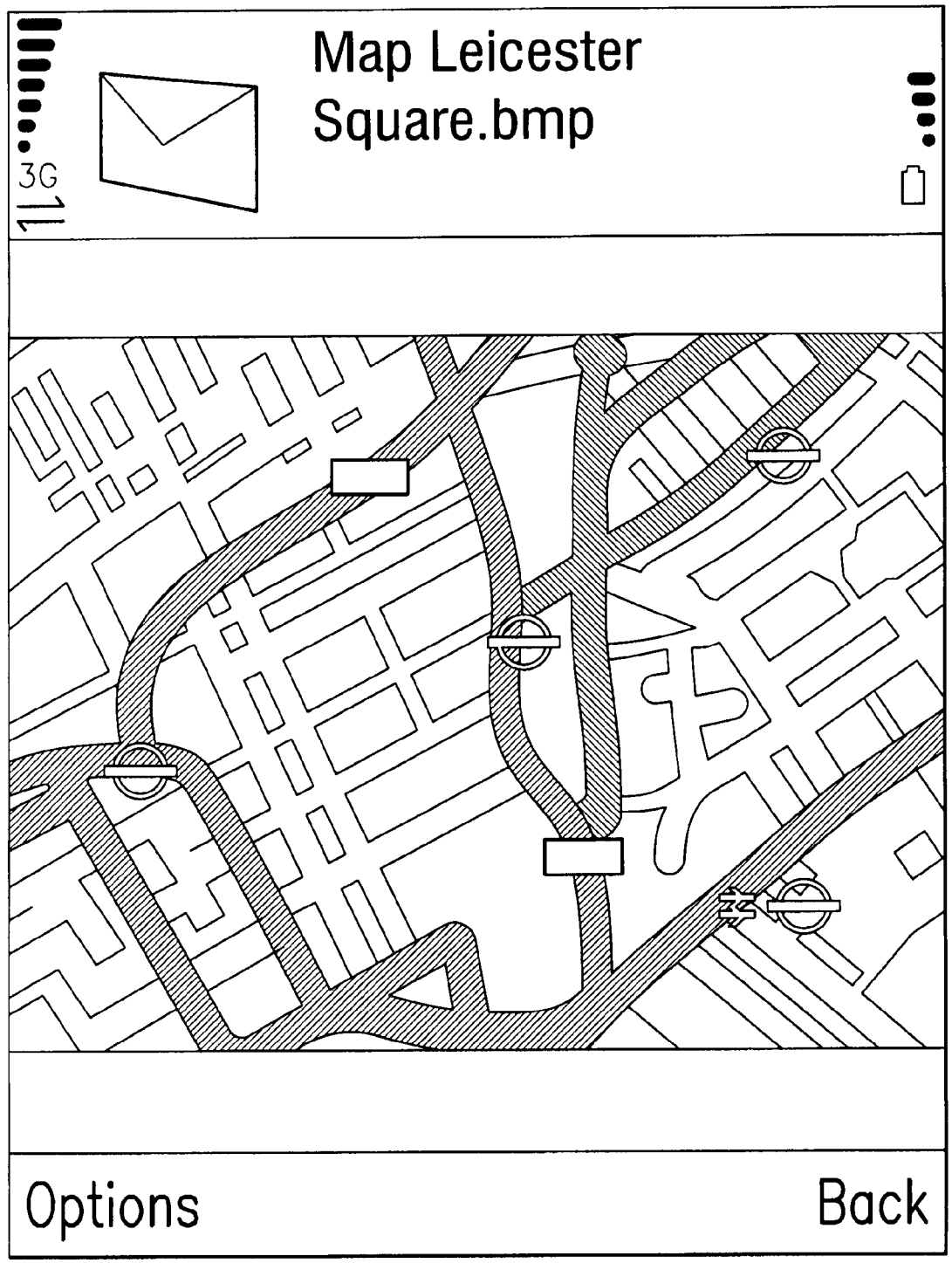
FIG. 21 is a screen shot of a map displayed on an embodiment of the present advancement.
Figure 22:
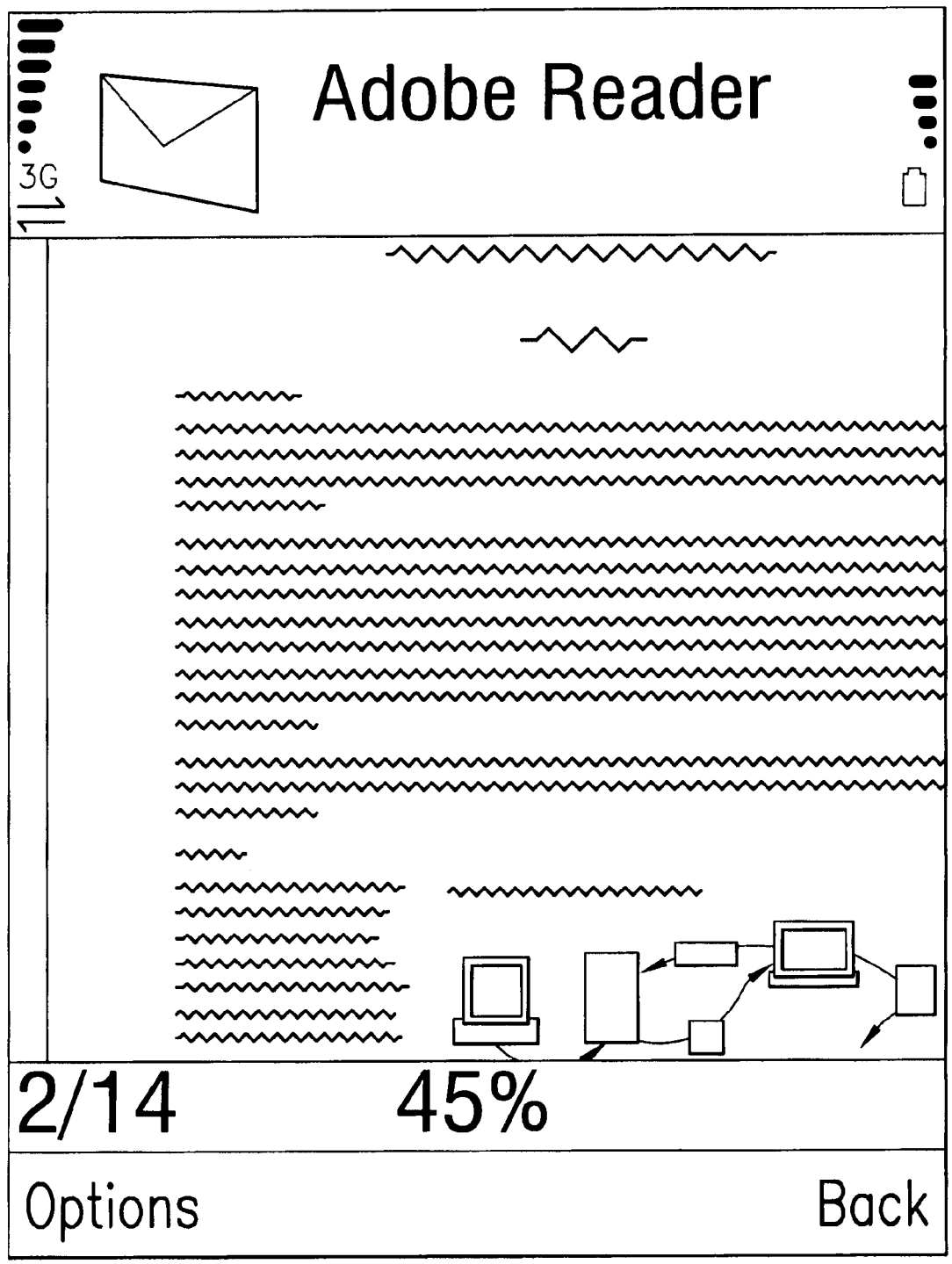
FIGS. 22 and 23 are screen shots of documents displayed on an embodiment of the present advancement.
Figure 23:
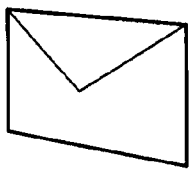

Next, the process for receiving email and viewing attachments will be described. The present advancement makes new email messages instantly visible on the device and permits easy viewing of text and attachments. Mail can be viewed from a mail inbox which displays the user's email messages. The email messages may be arranged in a plurality of ways (e.g. by sender, by date, by subject, etc.). In the mail inbox screen 21, shown in FIG. 15, attachments are visible as paper clips 23 in the margin to the right of the sender's name 25. Once the user has selected a particular email, the email is displayed as in FIG. 16, and the user has several options available to them, such as, for example, replying to the email, forwarding the email, calling the sender of the email, deleting the mail, selecting/deleting attachments, and viewing the details of the particular email. FIG. 17 shows a menu in which these options may be selected. Further, as shown in FIGS. 18-20, attachments may be downloaded selectively one by one. Once the attachments are downloaded (this is indicated by the application icon), attachments may be opened for viewing or saved to the file system. When the application is displaying an attachment, details of the attachment can be displayed, such as, for example, the title of the attachment, file type extension, and the file size of the attachment. FIG. 21 shows a map that is an attachment, with the name and file type displayed. FIGS. 22 and 23 show attachments displayed that are in Adobe® Acrobat format and Microsoft® Excel format.

Figure 24:
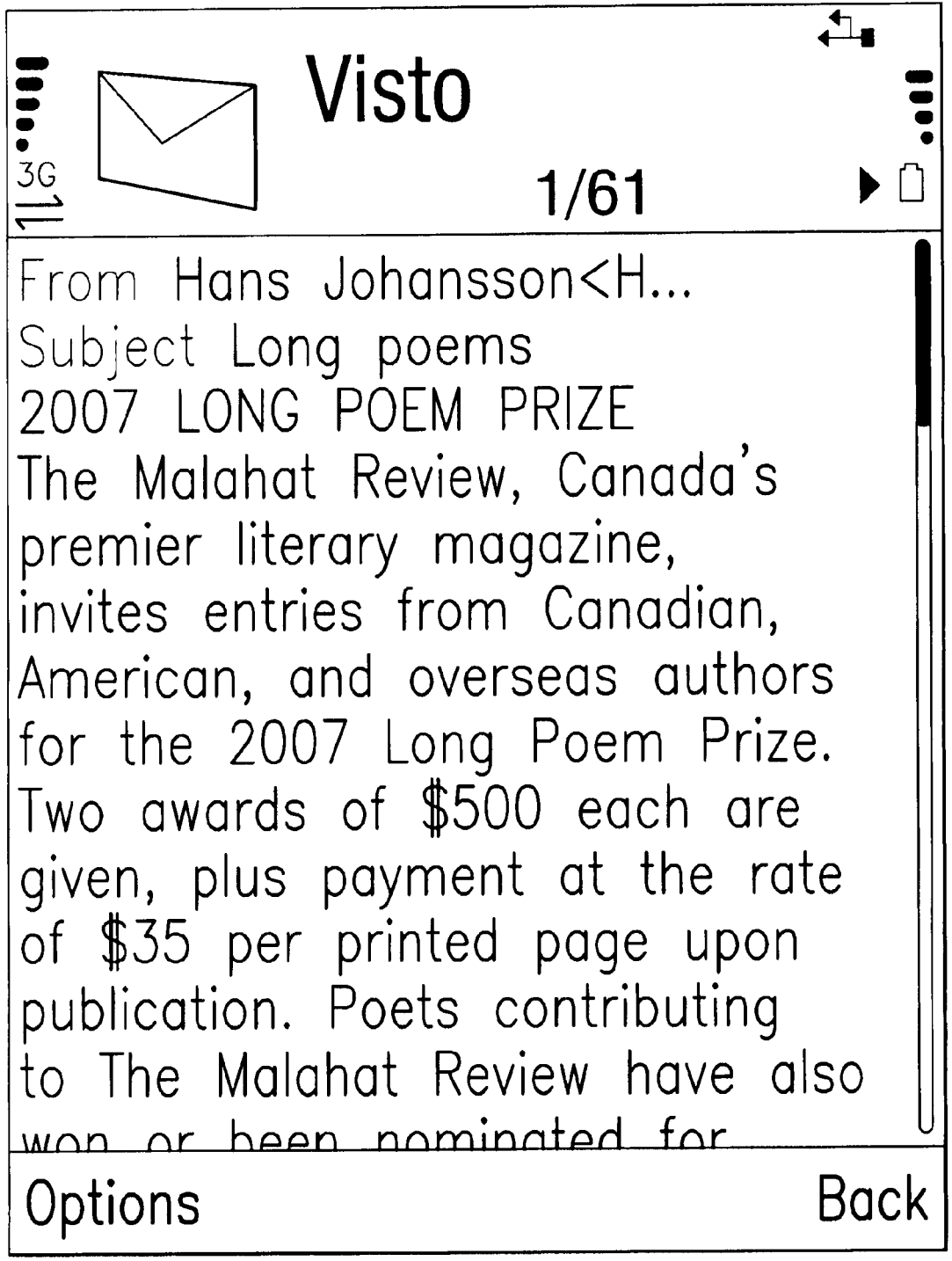
FIGS. 24 and 25 are screen shots of a message displayed on an embodiment of the present advancement.
Figure 25:
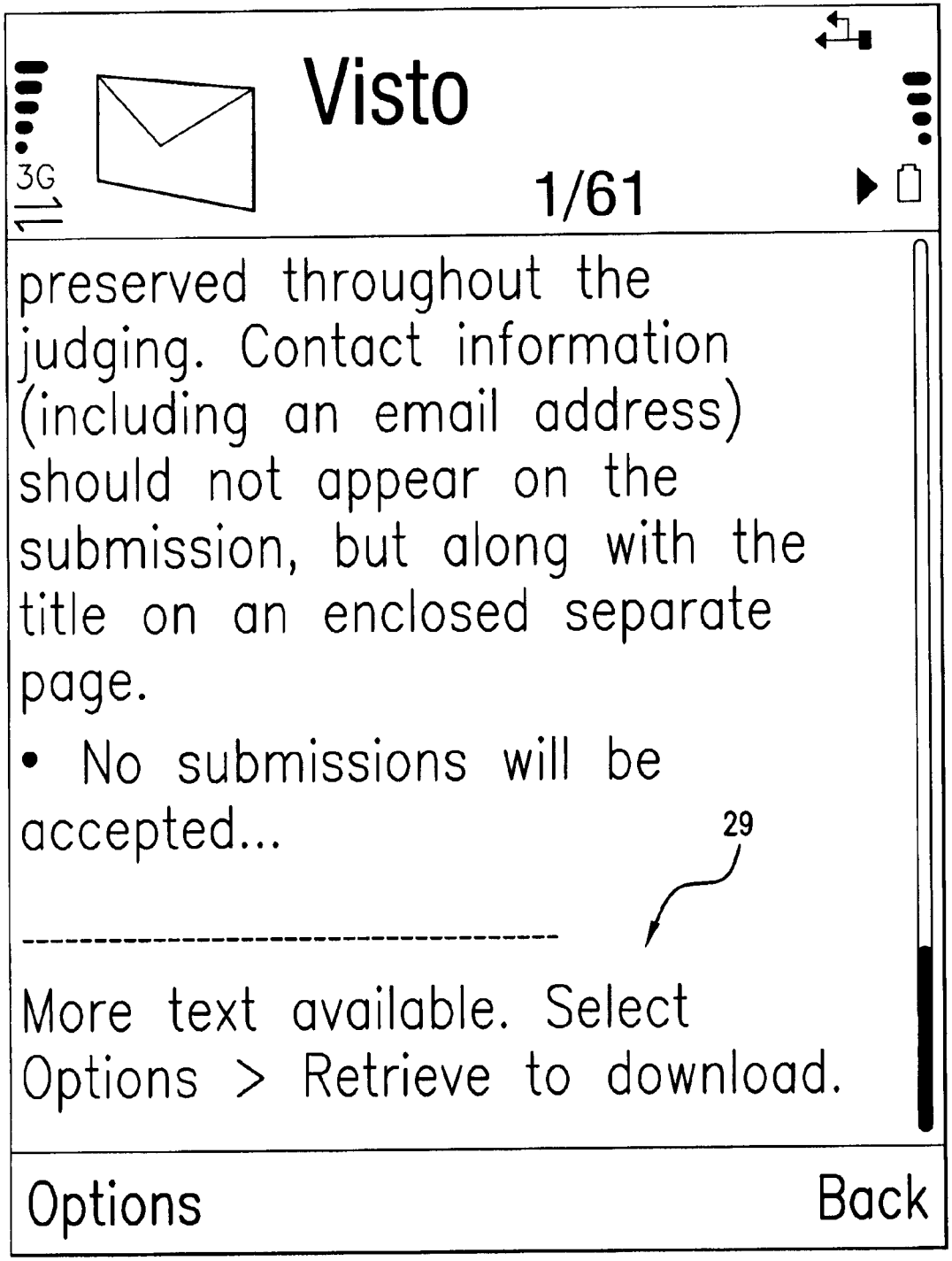
Figure 26:
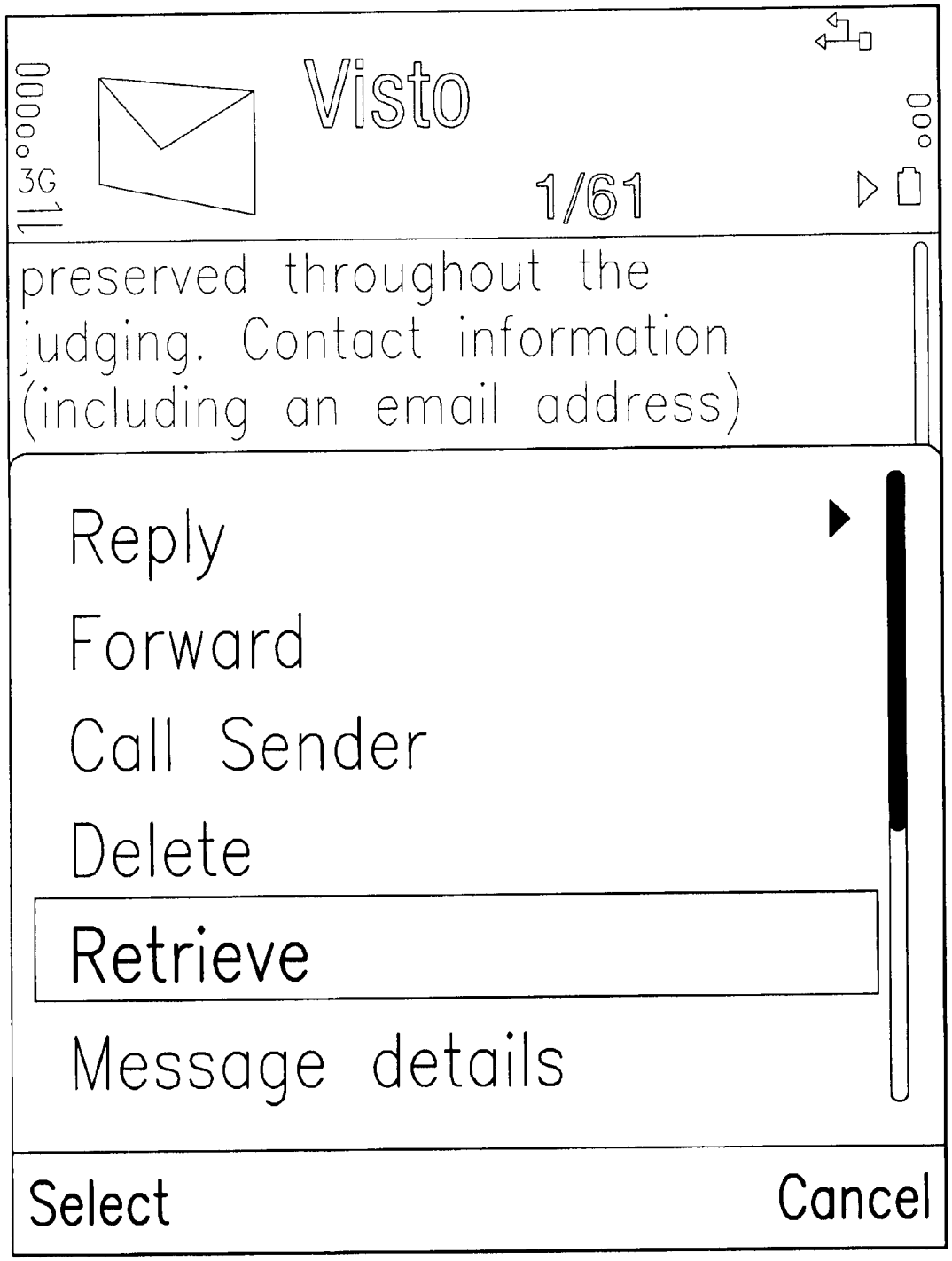
FIG. 26 is a screen shot of an options menu for an embodiment of the present advancement.
Figure 27:
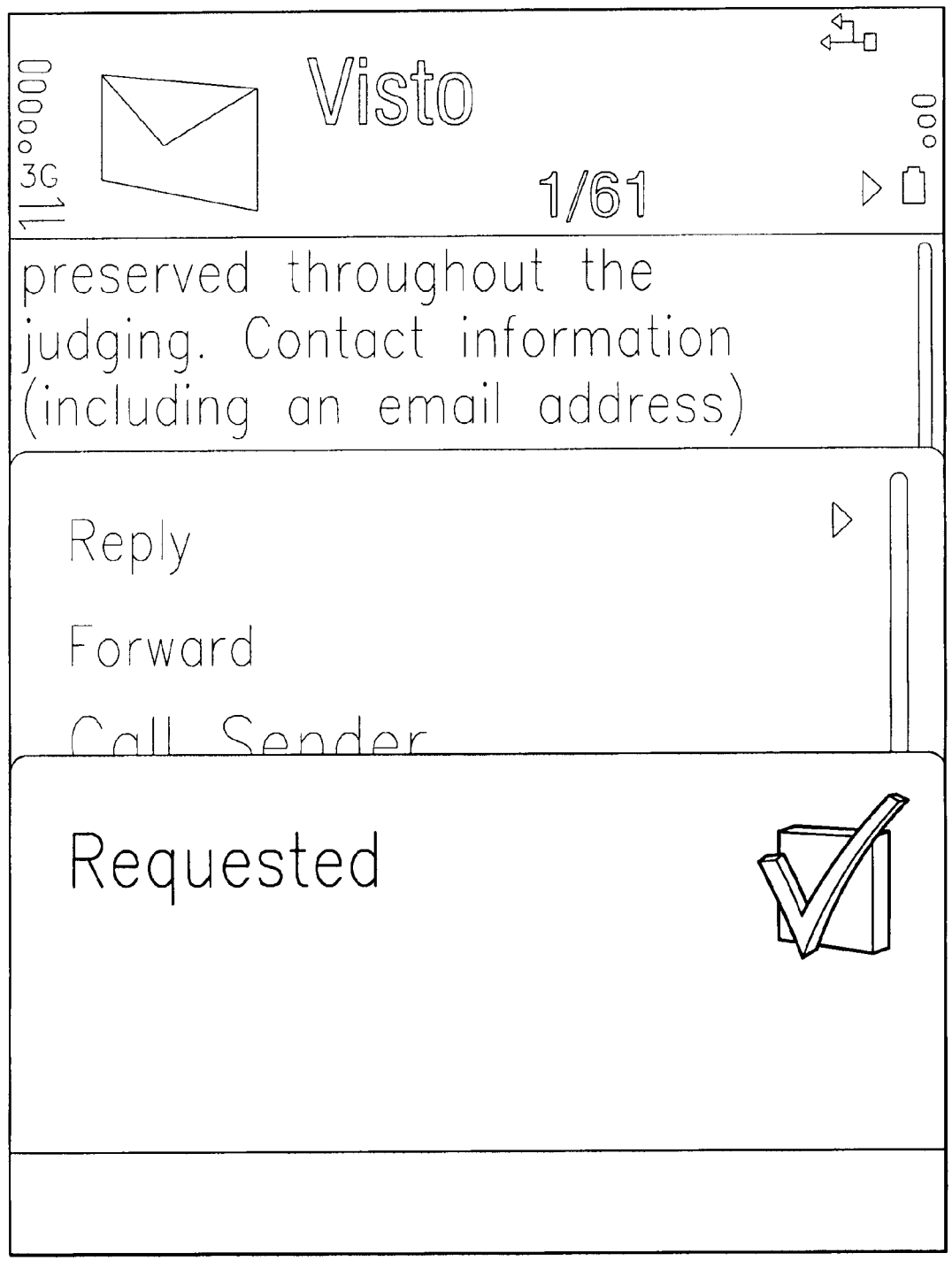
FIG. 27 is a screen shot of an embodiment of the present advancement.
Figure 28:
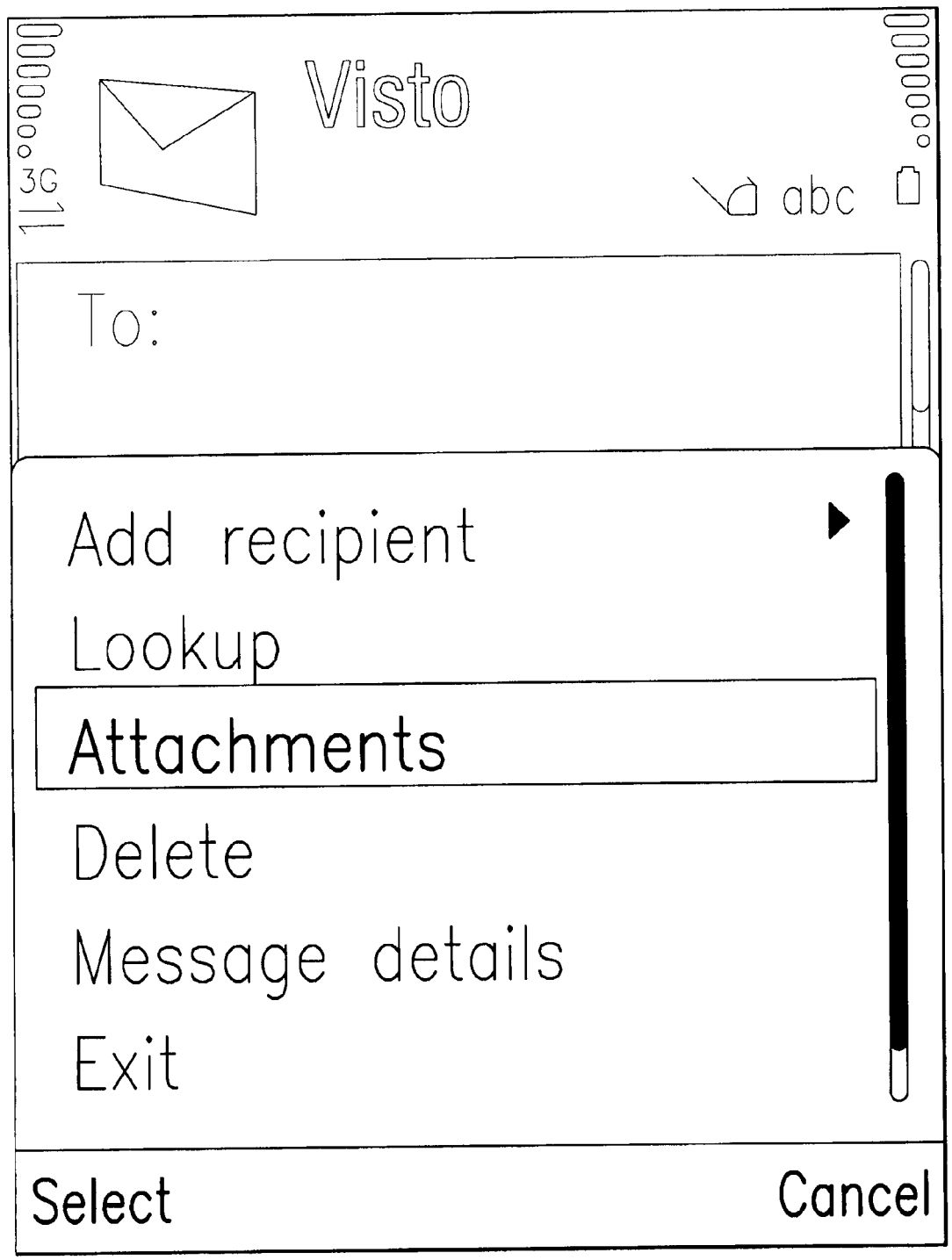
FIG. 28 is a screen shot of an options menu for an embodiment of the present advancement.
Figure 29:
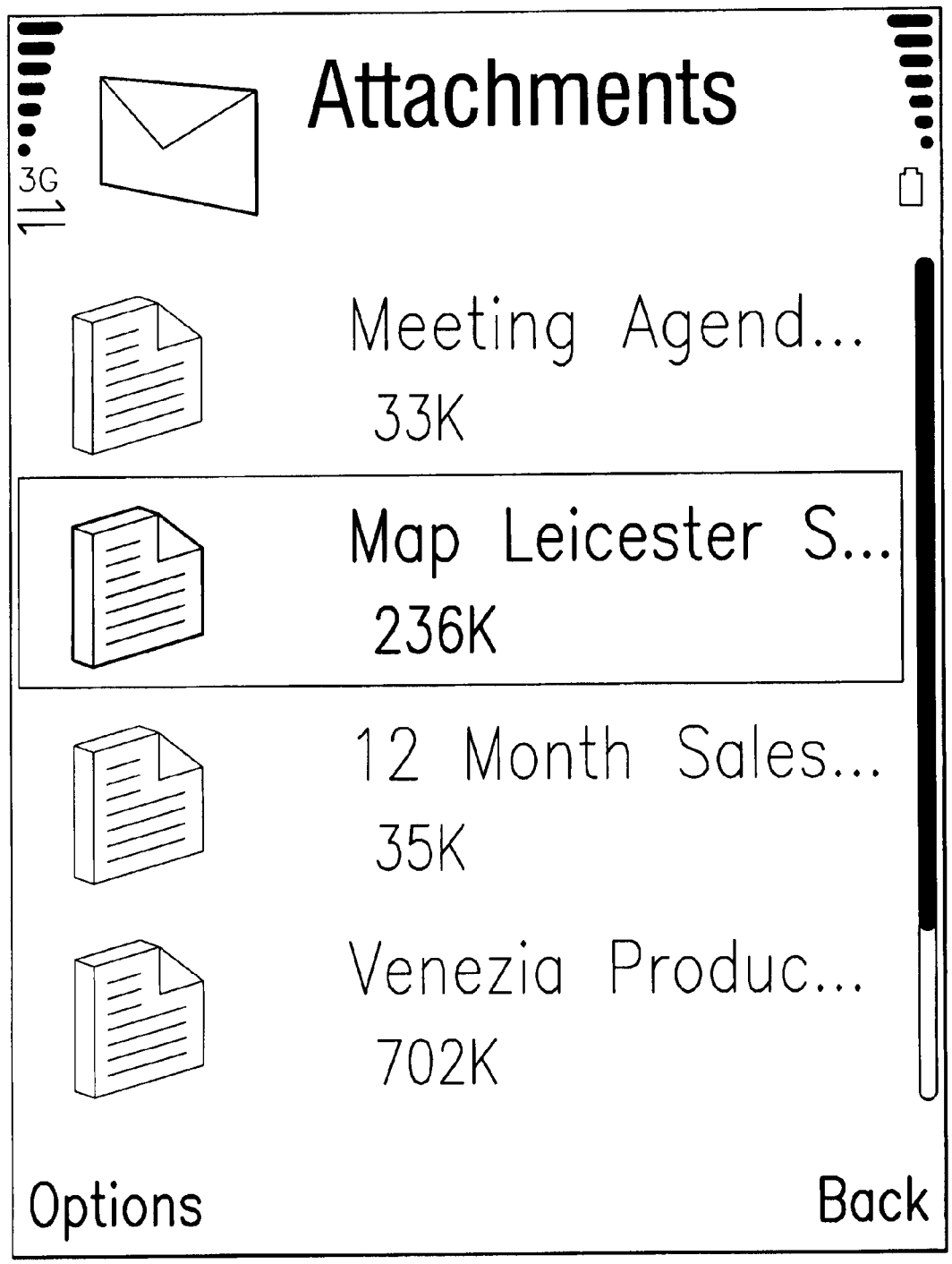
FIG. 29 is a screen shot of an attachment selection menu for an embodiment of the present advancement.
Figure 30:
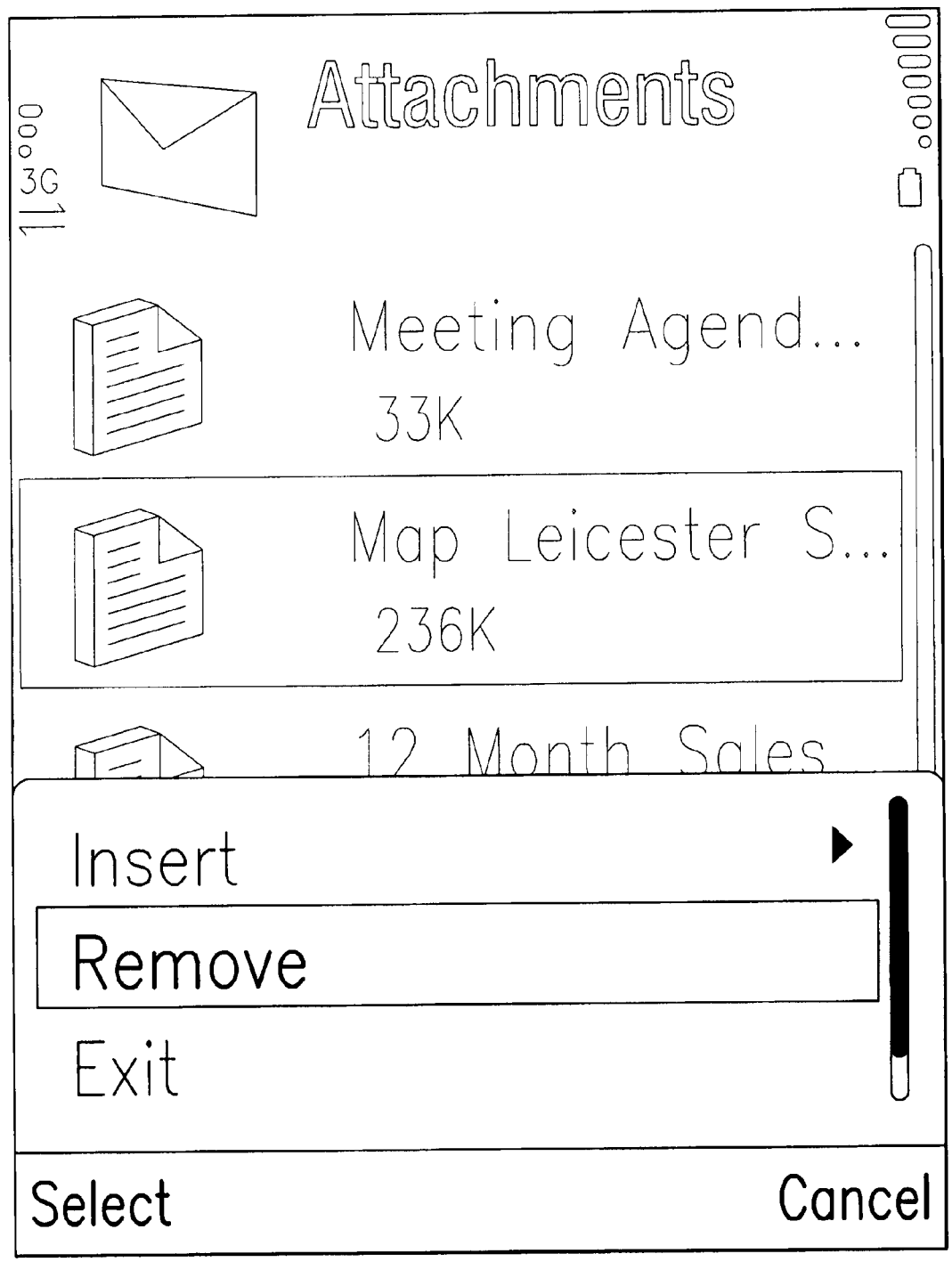
FIG. 30 is a screen shot of an attachment removal menu for an embodiment of the present advancement.

Next, a process will be described by which a user can retrieve the full text of an email message. As shown in FIGS. 24 and 25, long email messages may be restricted to initial text 27 only. However, when viewing the text of the message, the user can request to download the entire email message to permit viewing of the message in its entirety. In one embodiment of the present advancement, the body of text may be truncated if the email is larger than a certain size, e.g. 2 KB. If the body of the text is truncated, the full body of text is immediately retrieved and appended to the email message. Further, a message 29 is displayed at the bottom of the truncated message telling the user that more text is available (shown in FIG. 25). The user can then download or view the rest of the message by navigating through an options menu shown in FIGS. 26 and 27.

Figure 31:
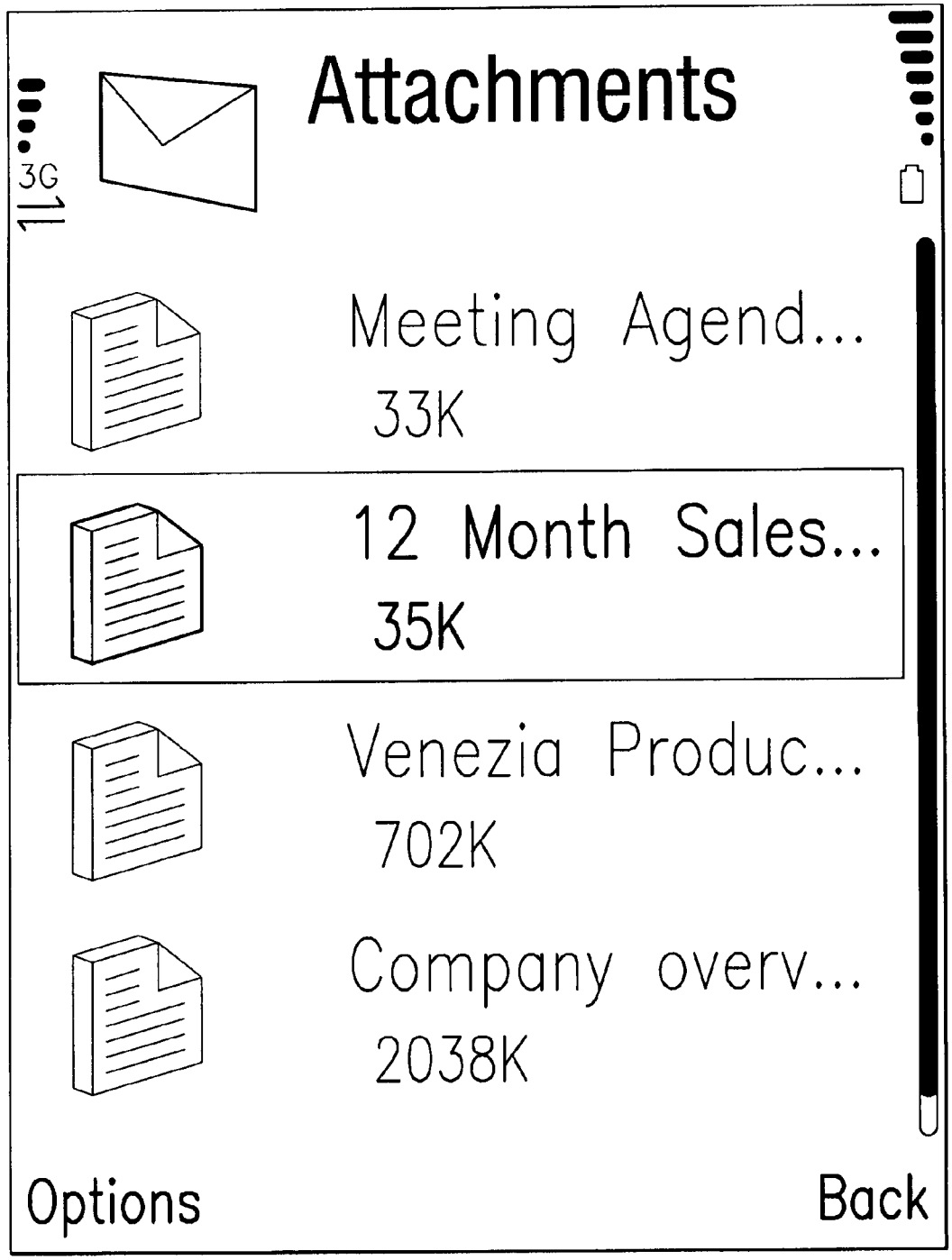
FIG. 31 is a screen shot of an attachment selection menu for an embodiment of the present advancement.
Figure 32:
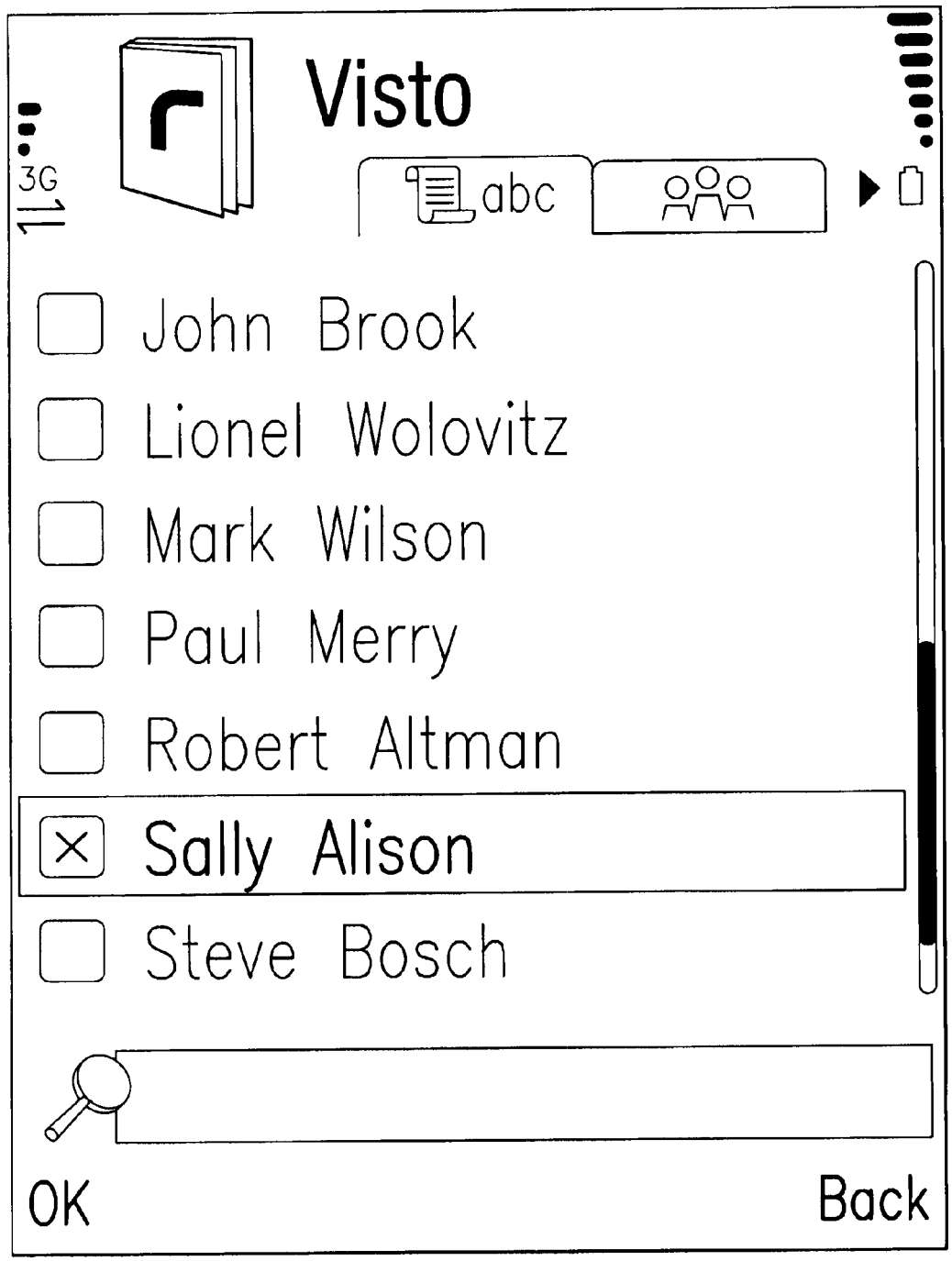
FIG. 32 is a screen shot of a contact selection menu for an embodiment of the present advancement.

Next, the process of forwarding an email message will be described. In an embodiment of the present advancement, the user may forward an email message with or without attachments. If the original message contained attachments, these do not have to be submitted from the device (instead, they are appended to the outgoing message by a NOC, i.e. Smart Forwarding). Individual attachments can also be added or deleted, as shown in FIGS. 28-31. This allows the user to selectively choose which attachments they want to send with a particular email. As shown in FIG. 31, the size of the attachments can also be displayed when the user is selecting which attachments to forward with the email. The user can select the recipient of the email or text message by selecting the recipient's name in the contact selection menu shown in FIG. 32.

Figure 33:
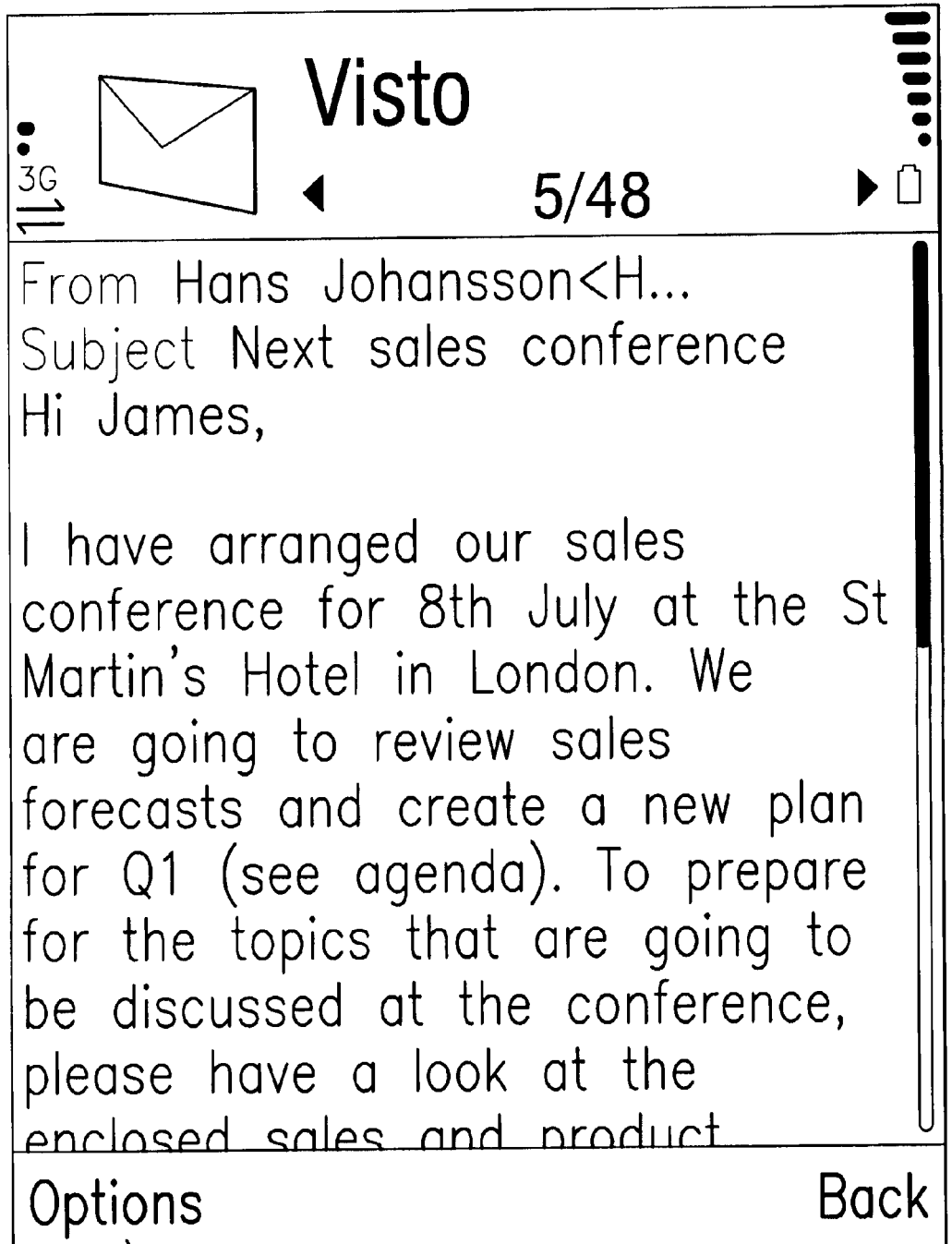
FIG. 33 is a screen shot of a message displayed on an embodiment of the present advancement.
Figure 34:
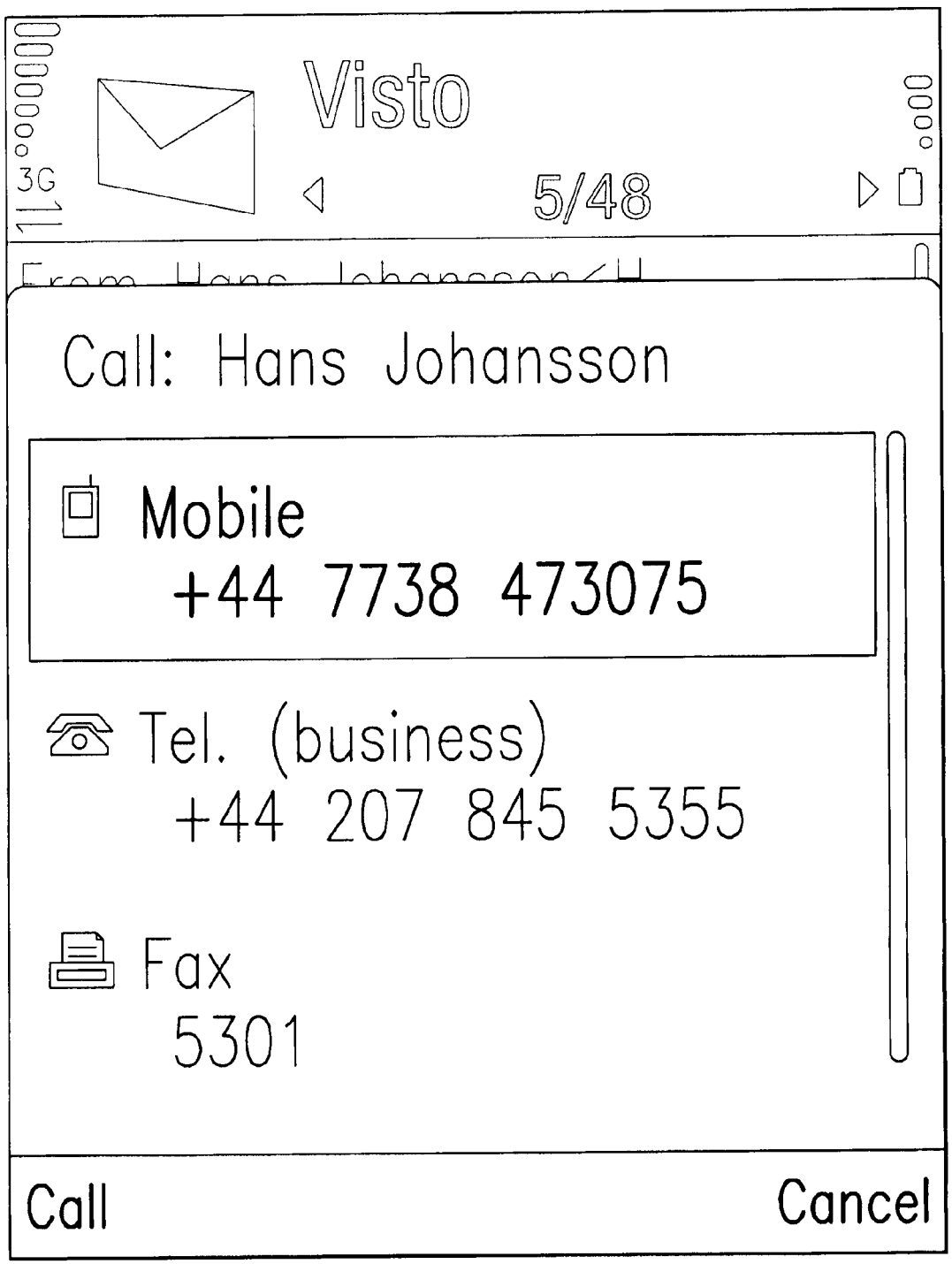
FIG. 34 is a screen shot of a contact information screen for an embodiment of the present advancement.
Figure 35:
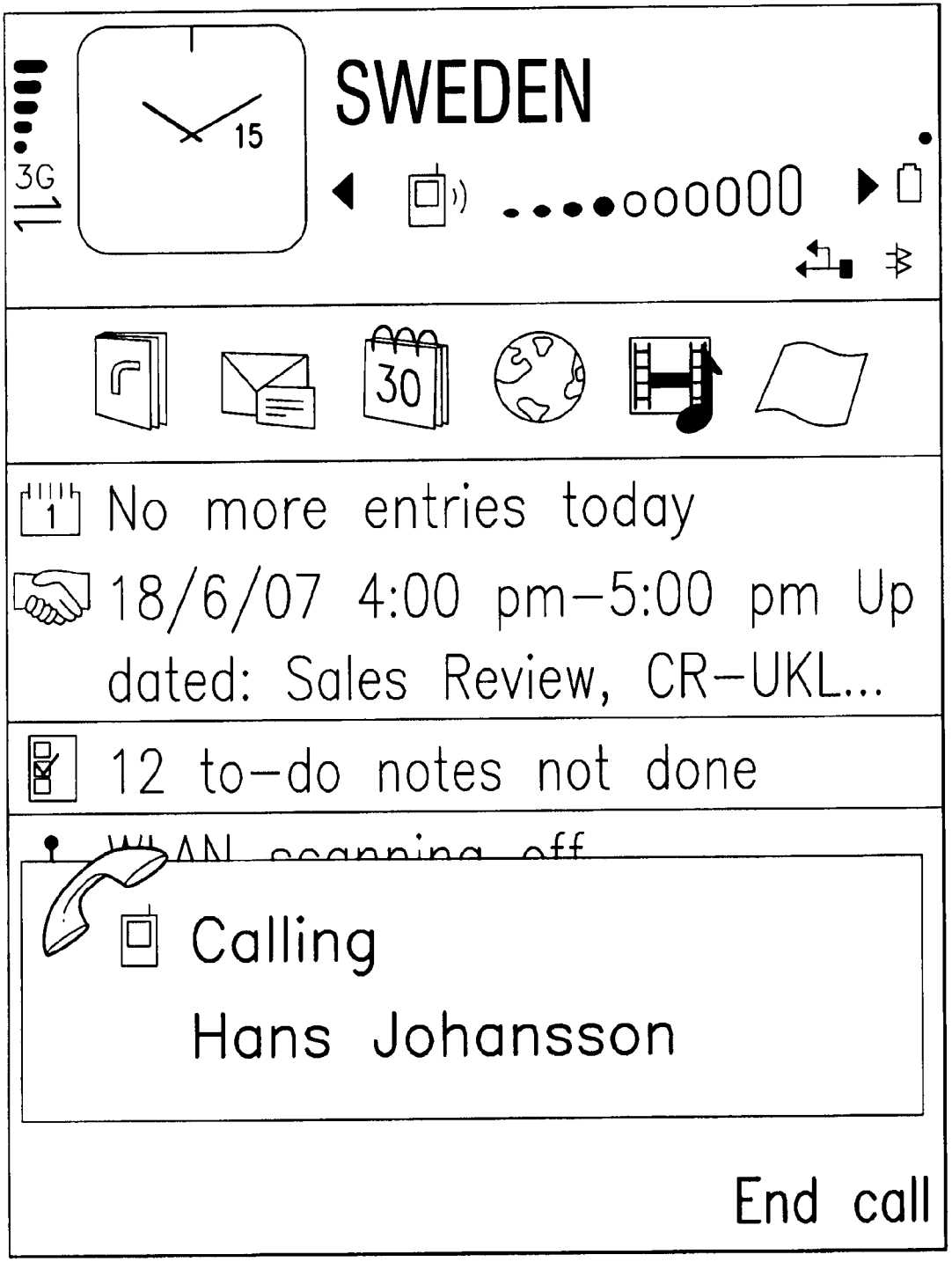
FIG. 35 is a screen shot of a call status screen for an embodiment of the present advancement.
Figure 36:
FIG. 36 is a screen shot of an options menu for an embodiment of the present advancement.
Figure 37:
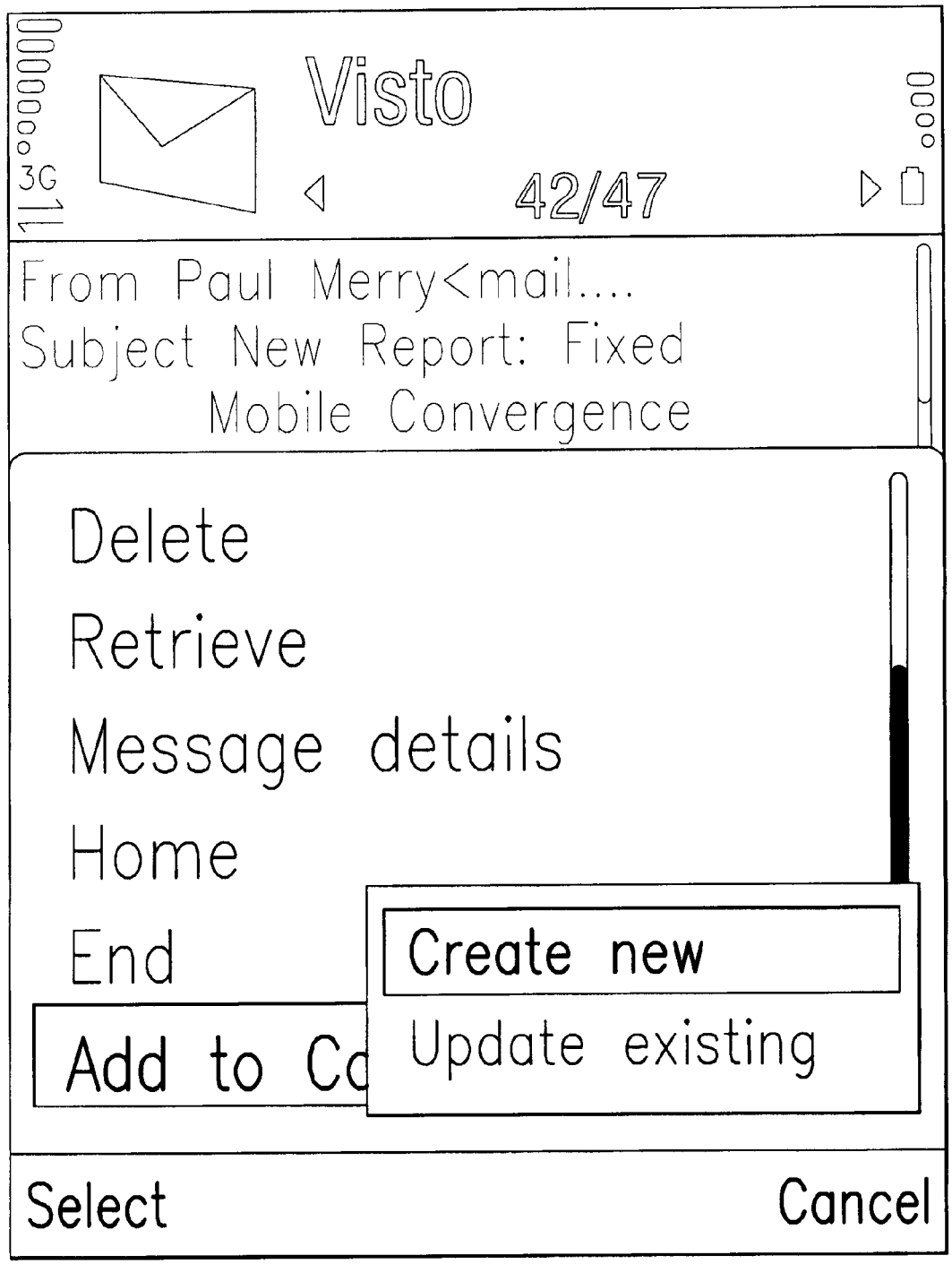
FIG. 37 is a screen shot of a create new contact menu for an embodiment of the present advancement.
Figure 38:
FIG. 38 is a screen shot of a contact information screen for an embodiment of the present advancement.
Figure 39:
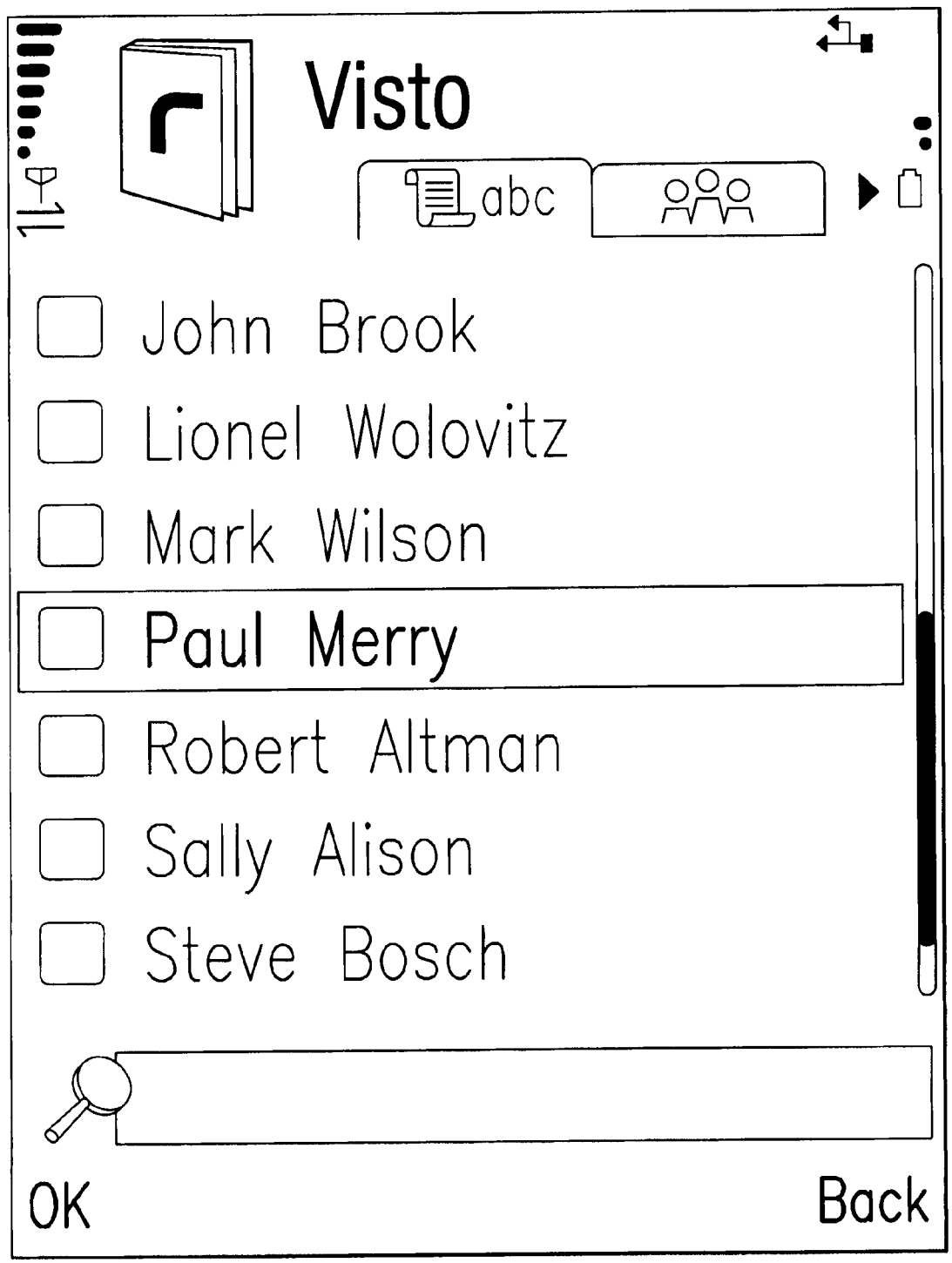
FIG. 39 is a screen shot of a contact selection menu for an embodiment of the present advancement.

Another function available to a user when viewing email is that the user can call the sender of the email. In FIG. 33, displayed below the text of an email is an options tab 31. Once the user selects the options tab 31 several quick actions may be taken when viewing the message. FIG. 17 shows several actions which may be taken when viewing an email. One option is that the user may respond to the email by calling the sender of the email. The sender is mapped to the corresponding entry in the address book. Further, the user can select the appropriate phone number from a menu, as shown in FIG. 34, before initiating the call. Once the user selects the appropriate phone number, a call status screen as shown in FIG. 35 is displayed, in which the name of the person being called is indicated.

Another function available to a user when viewing email is that the user can save the sender of an email to the address book of the device. Another action that may be performed is saving the sender's address details to the address book of the device. The email address may be used to create a new contact or it may be added to an existing contact. As shown in FIGS. 36-39, the address book on the device is configured to be immediately updated when a contact is saved.

Figure 40:
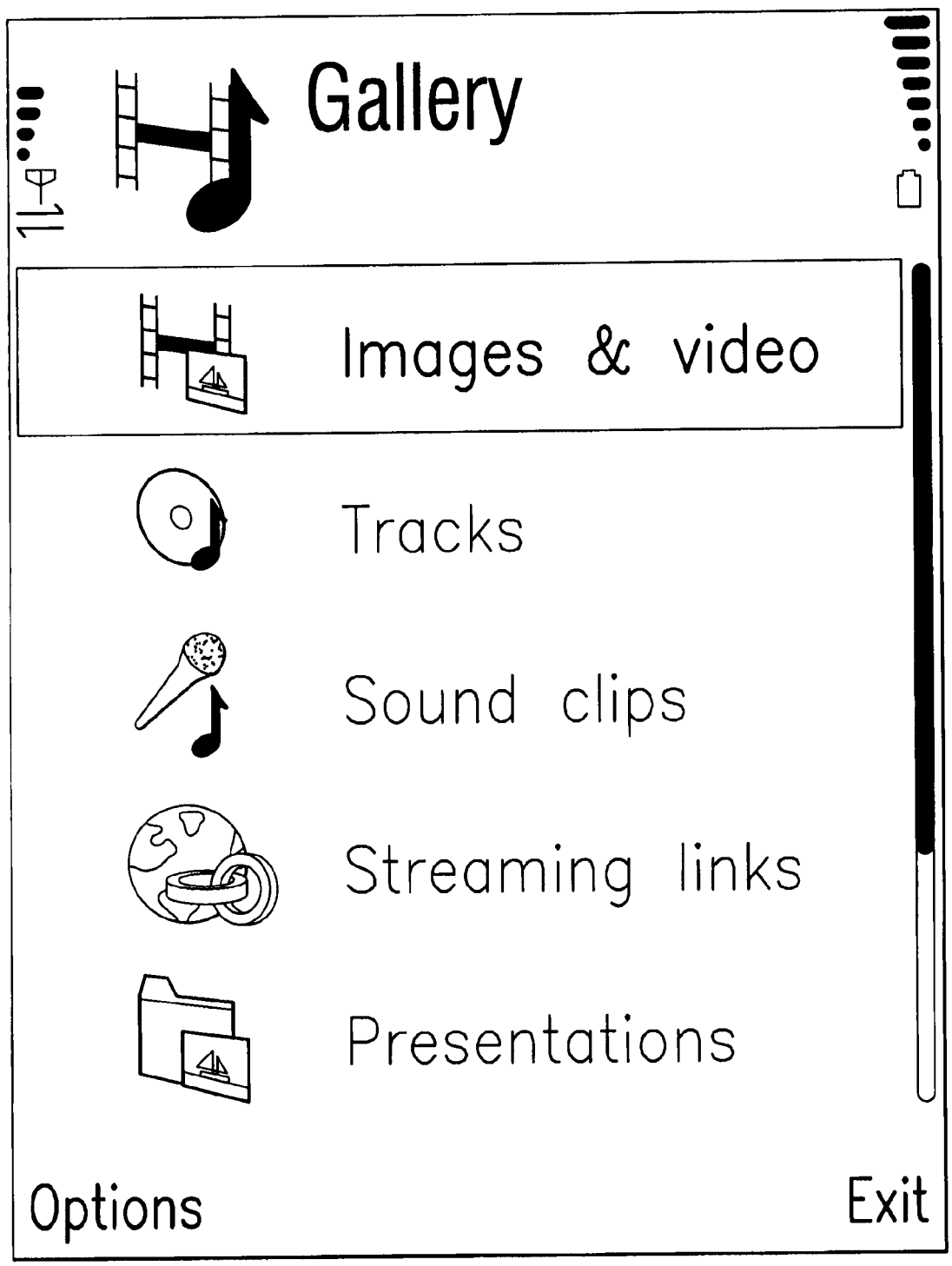
FIG. 40 is a screen shot of a multimedia menu for an embodiment of the present advancement.
Figure 41:
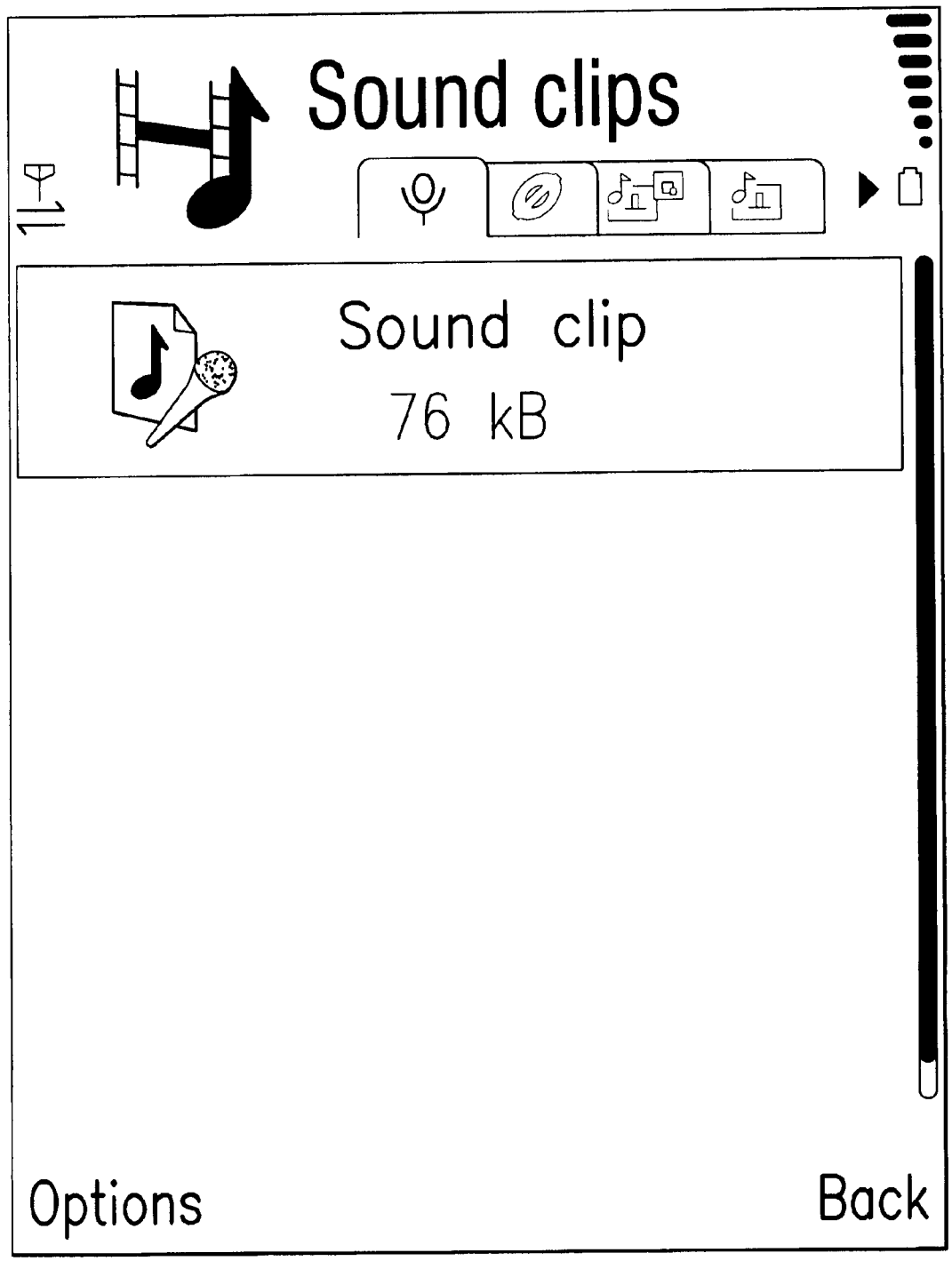
FIG. 41-43 are screen shots of sound clip screens for an embodiment of the present advancement.
Figure 42:
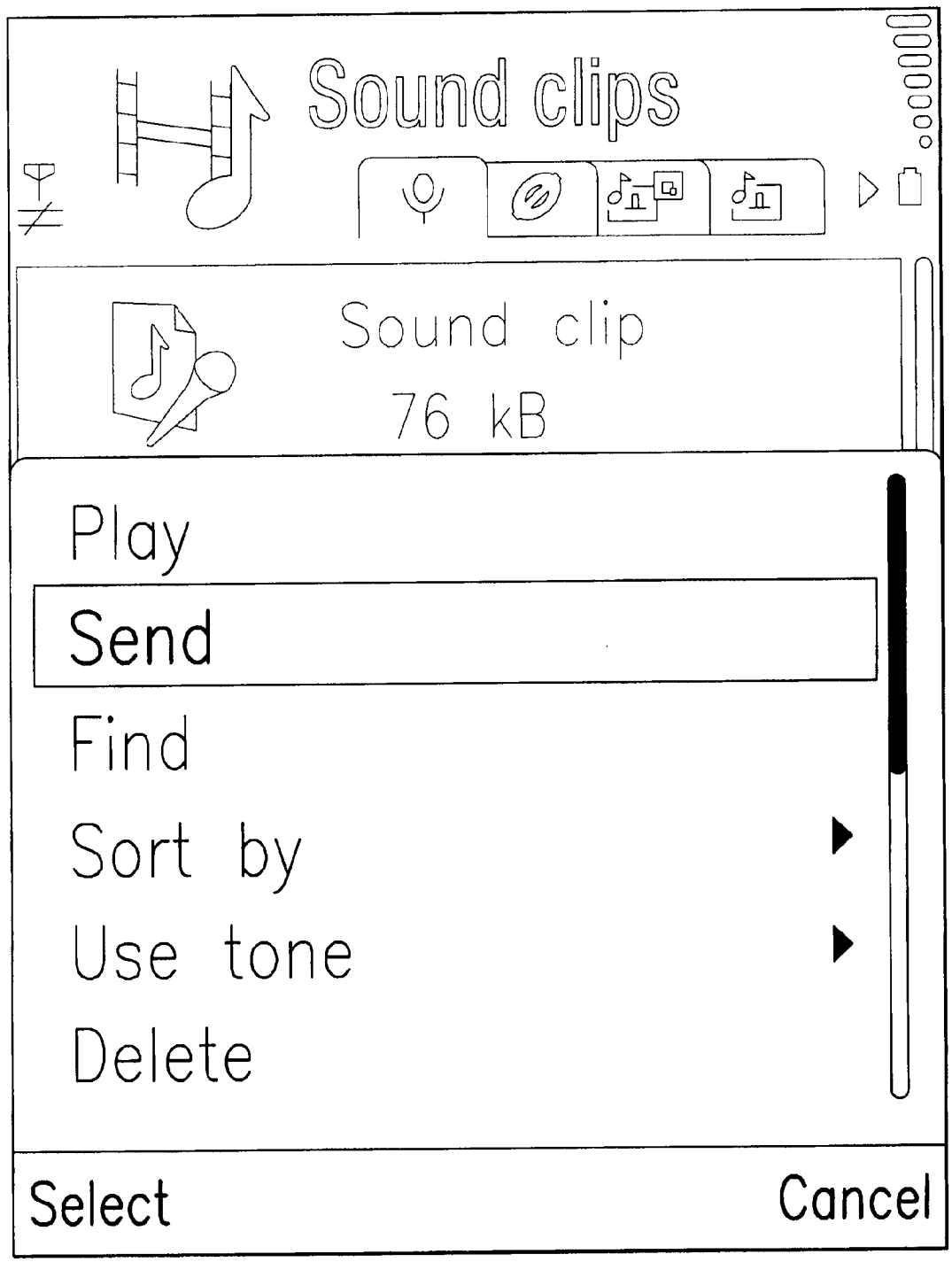
Figure 43:
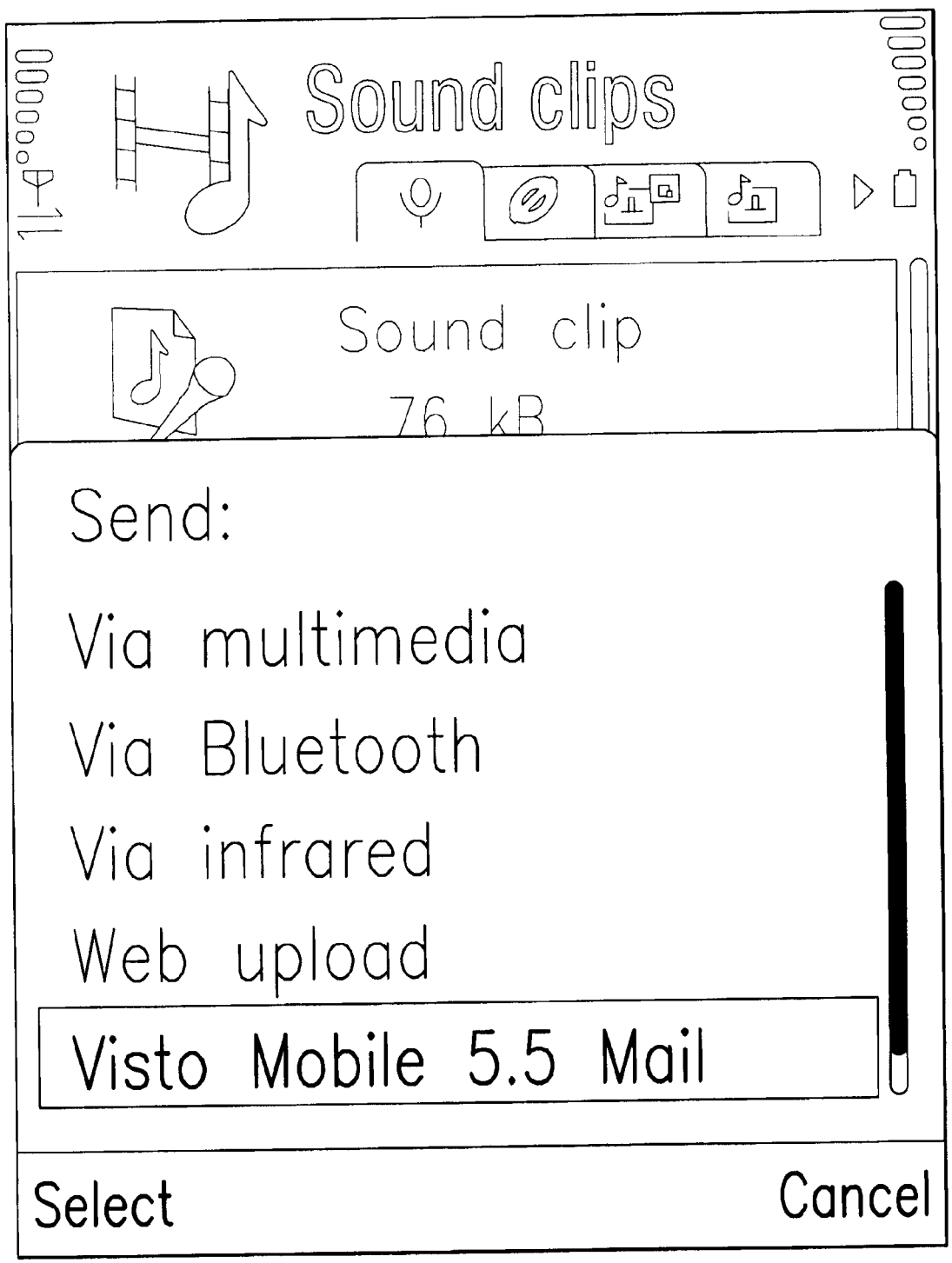
Figure 44:
FIG. 44 is a screen shot of an options menu for an embodiment of the present advancement.

Another function available to a user when viewing email is that the user can send a media clip to another individual. The present advancement makes it easy to send or share individual media files or documents. In FIGS. 40-42, the user first selects the media clip they would like to send. Next, in FIG. 43, the user selects the method that they would like to use to send the media clip (e.g. via multimedia, Bluetooth, infrared, web upload, or Visto Mobile Mail). Next, in FIG. 44, the user selects a send tab 44 displayed in the GUI and the media file is sent to the recipient. No file size or format restrictions are imposed on the media files.

Figure 46:
FIG. 46 is a screen shot of an email displayed on an embodiment of the present advancement.
Figure 47:
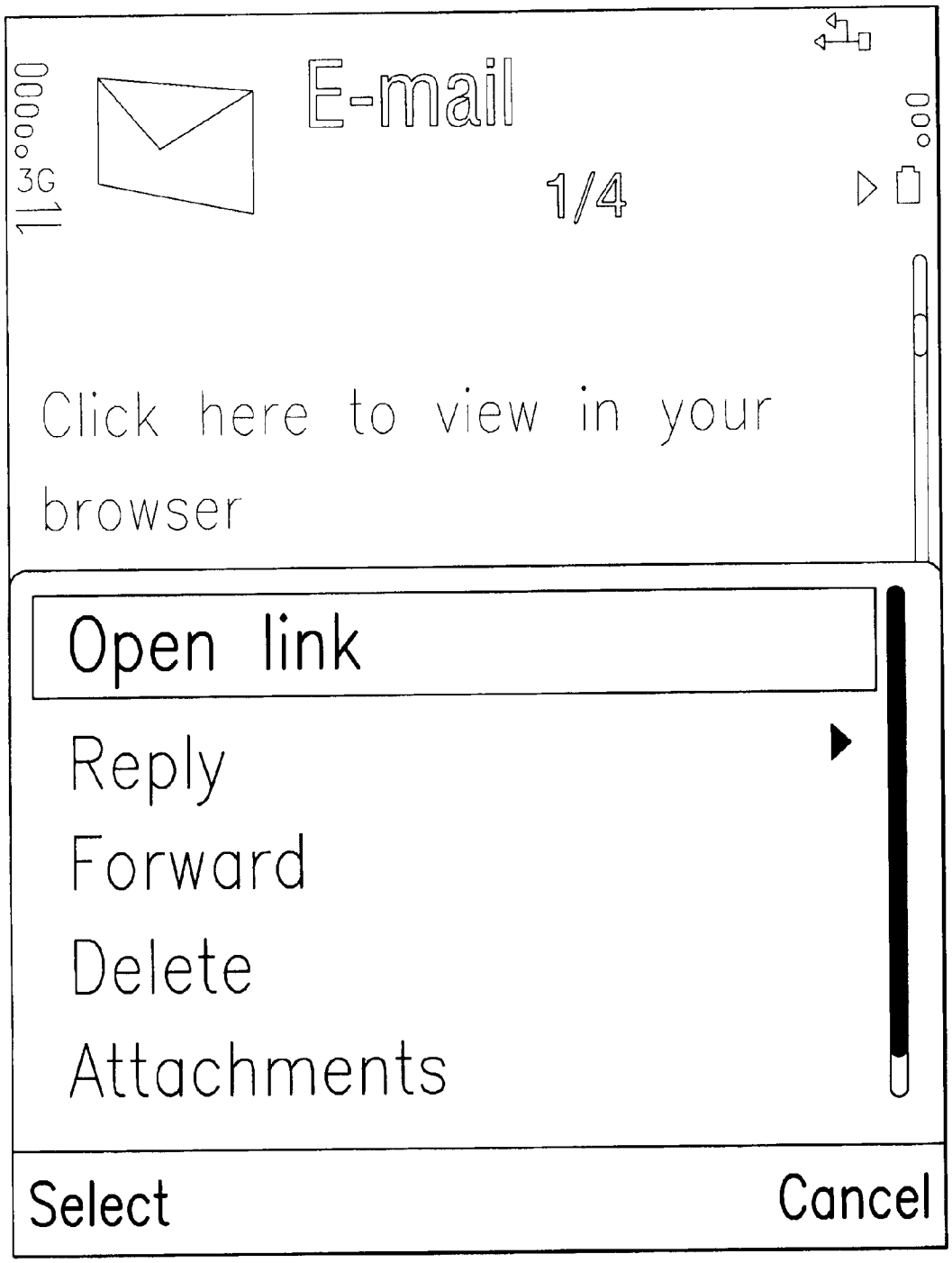
FIG. 47 is a screen shot of an options menu for an embodiment of the present advancement.
Figure 48:
FIG. 48 is a screen shot of a webpage displayed on an embodiment of the present advancement.

Another advantageous feature of the present advancement is that it is simple to select a contact from the address book because the address book is configured to be kept continuously up-to-date with a mobile personal information management (PIM) service. Another function available to a user when viewing email is that the user can browse a hyperlink 33 embedded in the text of an email (shown in FIG. 46). While reading an email, a user can open a hyperlink 33 in the body text and immediately browse the corresponding web site, as shown in FIGS. 47 and 48.

Figure 45:
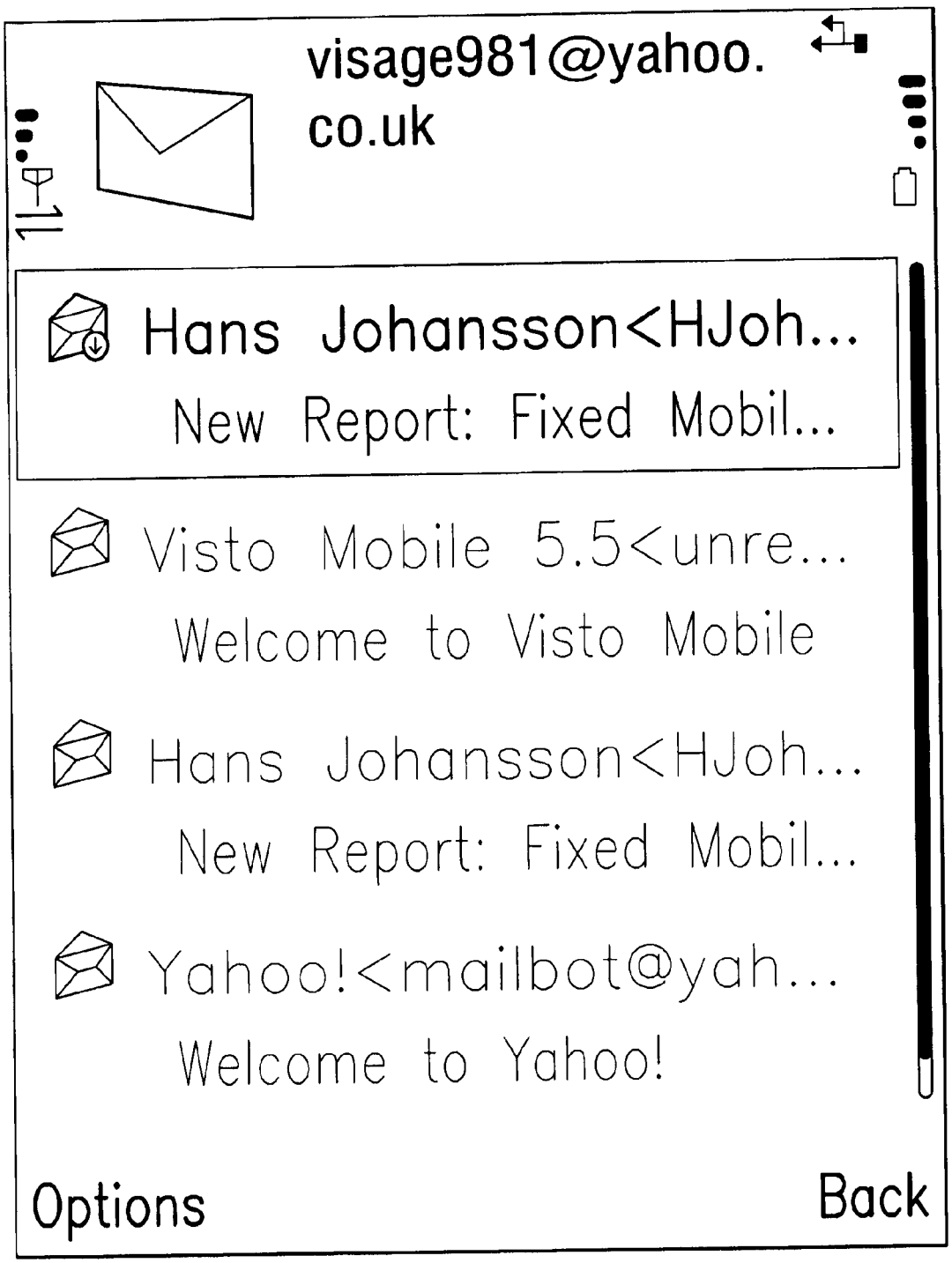
FIG. 45 is a screen shot of a message inbox for an embodiment of the present advancement.

Contacts may be managed from the mobile device or from a self-care website. Any changes are synchronized in the background, keeping PIM on the mobile device safe and up-to-date. For example, contacts may be added, updated or deleted via the self-care website. Further, the device is configured to be quickly updated via the synchronization process. Similarly, any updates on the device may be accessible via the self-care website. Updates to the system can be displayed via email in a message inbox as shown in FIG. 45.

Next the desktop synchronization process will be described. Computer software allows PIM data to be synchronized from Microsoft Outlook on a user's personal computer or the mobile device. The application is configured to synchronize desktop data according to a connection time schedule or may be manually initiated by the user. The mobile device can synchronize with only one source, a self-care website, or more than one source. The self-care website may be controlled and branded by the operator of the mobile device (i.e. service provider). In addition, the computer synchronization software application may be minimized to the system tray of the user's computer.

Figure 49:
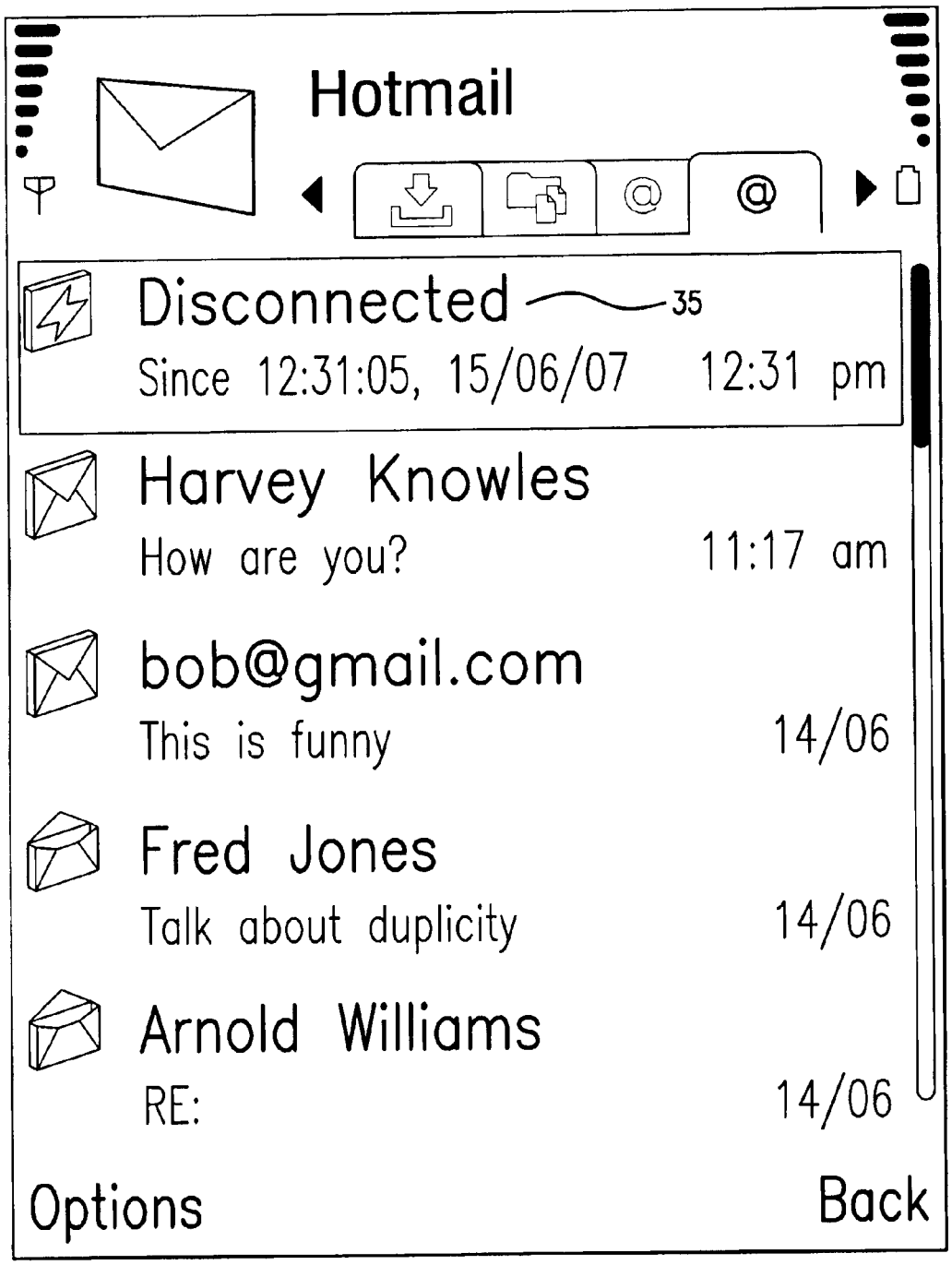
FIG. 49 is a screen shot of a message inbox for an embodiment of the present advancement.
Figure 50:
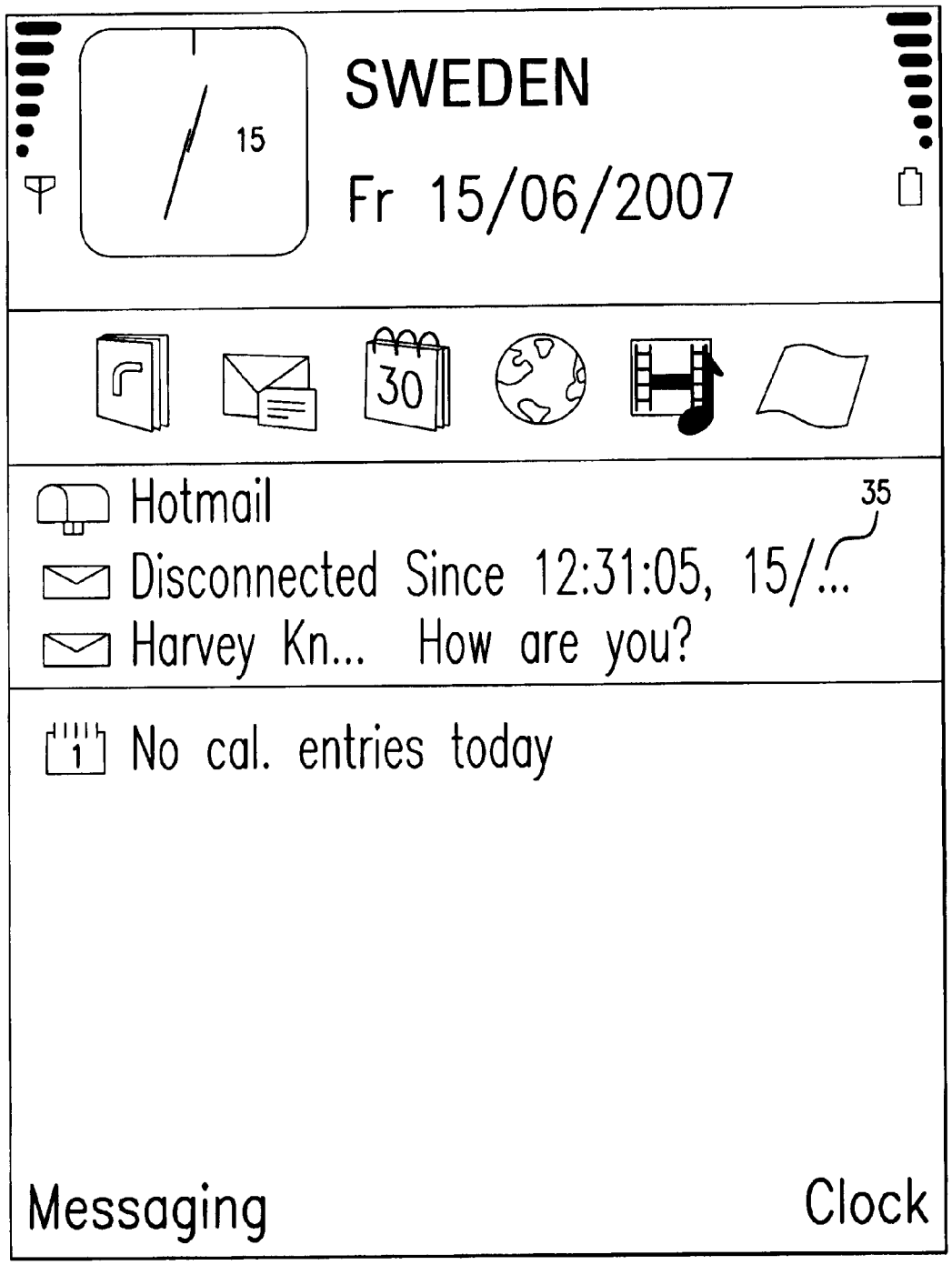
FIG. 50 is a screen shot of an active idle screen of an embodiment of the present advancement.
Figure 51:
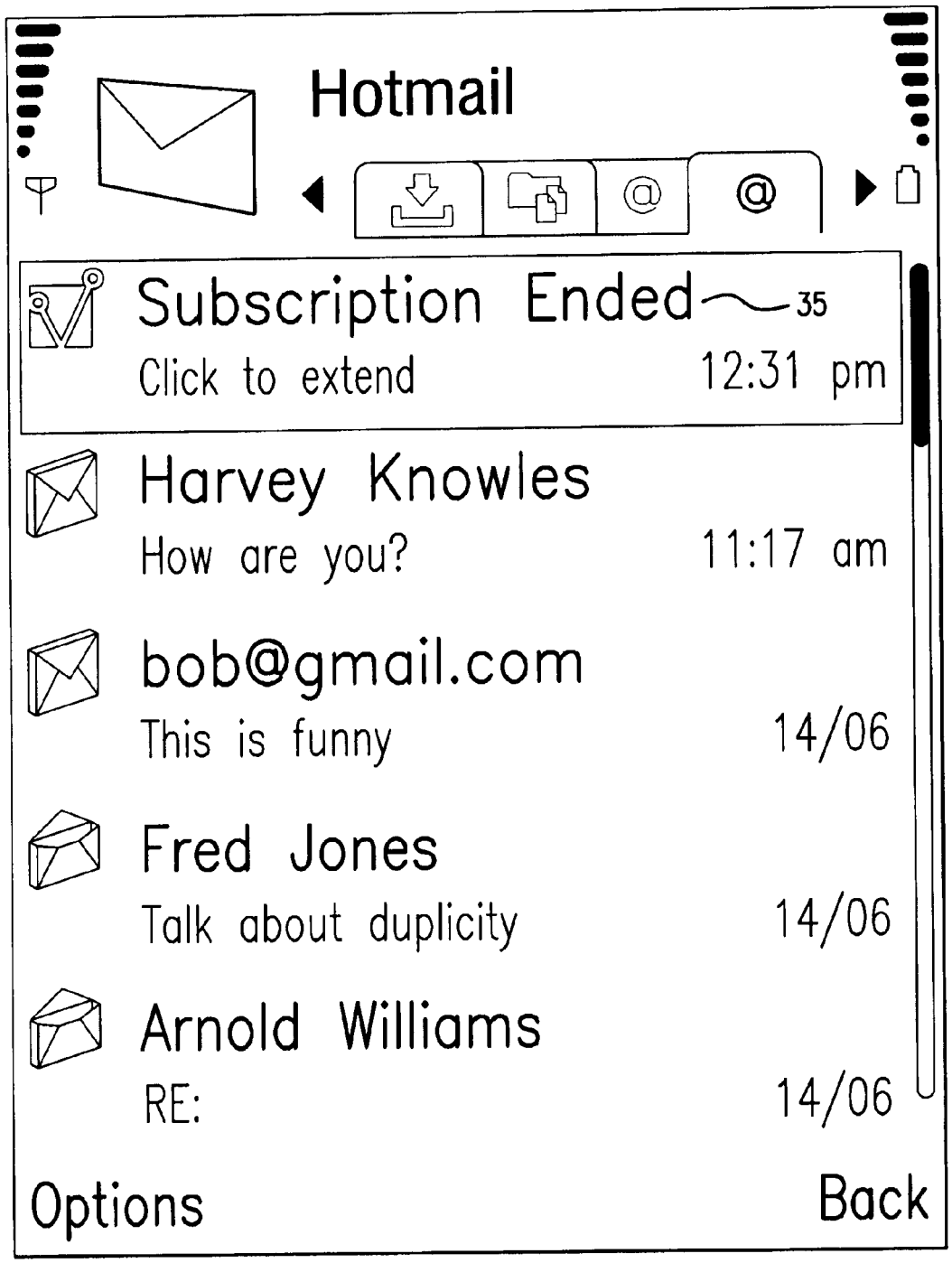
FIG. 51 is a screen shot of a message inbox for an embodiment of the present advancement.

An embodiment of the present advancement also includes a service message and service status framework (SSF) that provides status alerts, as shown in FIGS. 49-51, to users of the application.

An embodiment of the present advancement can use a set of defined service states which define the state of both the account and the client. Some of these service states have an associated user interface which is to inform the user of the state and solicit required actions from them. The service state messages may be, for example, informational, the connection status of the device (disconnected, no signal, voice call, etc.), a call to action, the subscription status (subscription suspended, requires renewal, etc.), upgrade availability information, roaming information, and service unavailability information (may be per mailbox).

Service state messages are "special" or high priority emails that remain at the top of the email inbox, and when opened provide a user with further information and options to take necessary actions to resolve the service interruption. An example of a service message 35 is shown in FIGS. 49-51. In addition, the application is closely integrated with an Idle Screen (shown in FIG. 50) in order to provide a true push user experience and good visibility of relevant messages. Messages from the inbox appear on the Idle Screen. The latest or highest priority message will be displayed. The displayed message may either be a service message or a regular email (service messages take precedence over regular email messages).

Some service messages are connection states and are therefore shown in a connection state item of an Application tab. Other service messages are independent of the connection state and are shown elsewhere, such as in a list of data channels. Service messages can also be shown in an email inbox. These service messages are very similar to connection state messages. Opening the message would then launch a service message user interface. This type of message is always marked as unread. As with the connection state emails, it is preferable that the mail does not exist to the mail viewer; selecting next/previous message in the viewer would not launch a service message user interface. Also, commands to "reply", "forward", "delete", "Mark as read" or "move" the email may be removed or disabled.

Further, it is possible that multiple service messages will be active simultaneously. Message priorities determine how to deal with multiple active service messages. In the individual service state messages, each is given a priority. Further, the inbox will display all service messages. If it is possible to keep all service messages at the top of the inbox, then they will first be ordered by priority, and then ordered by creation date.

Figure 52:
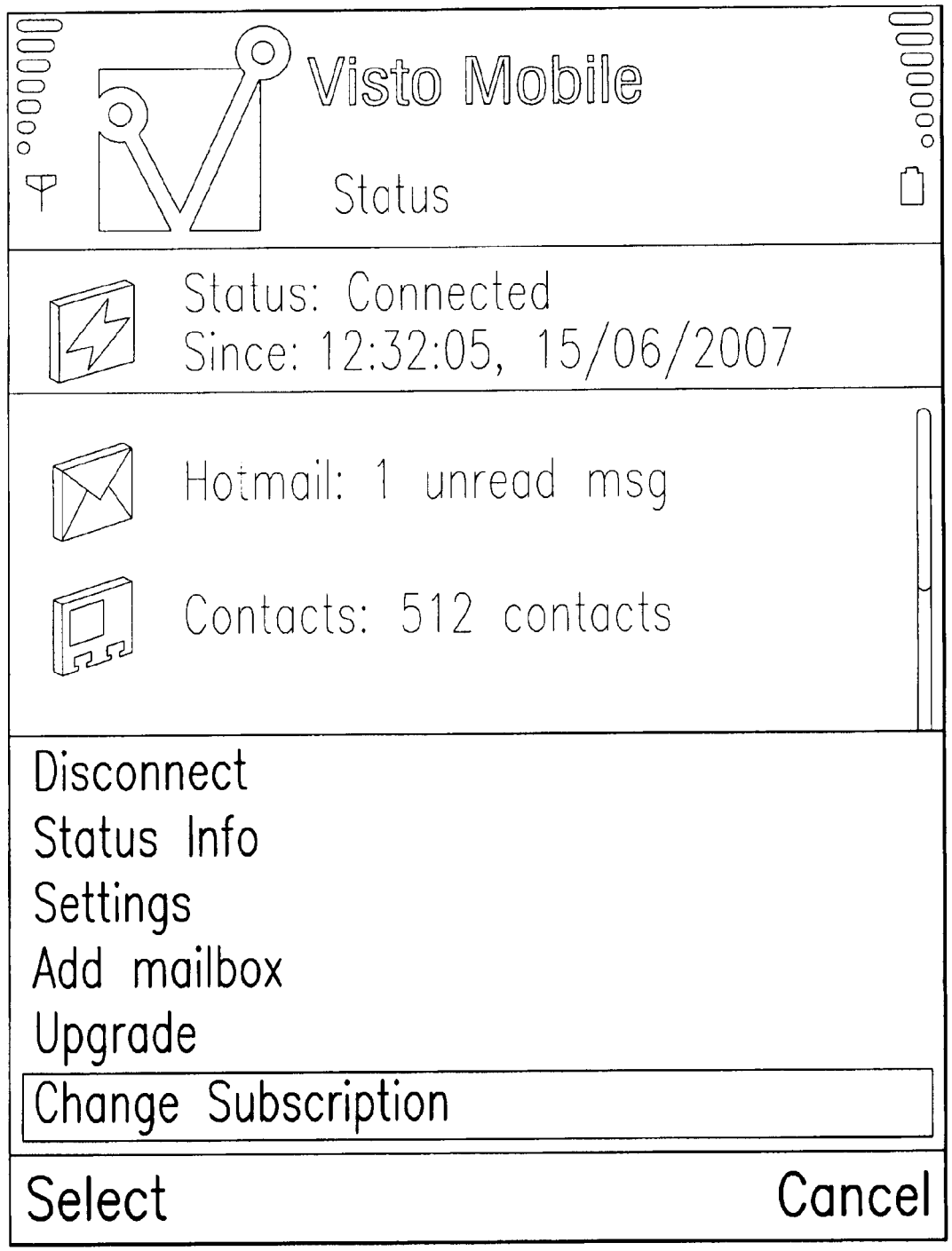
FIG. 52 is a screen shot of a settings menu for an embodiment of the present advancement.
Figure 53:
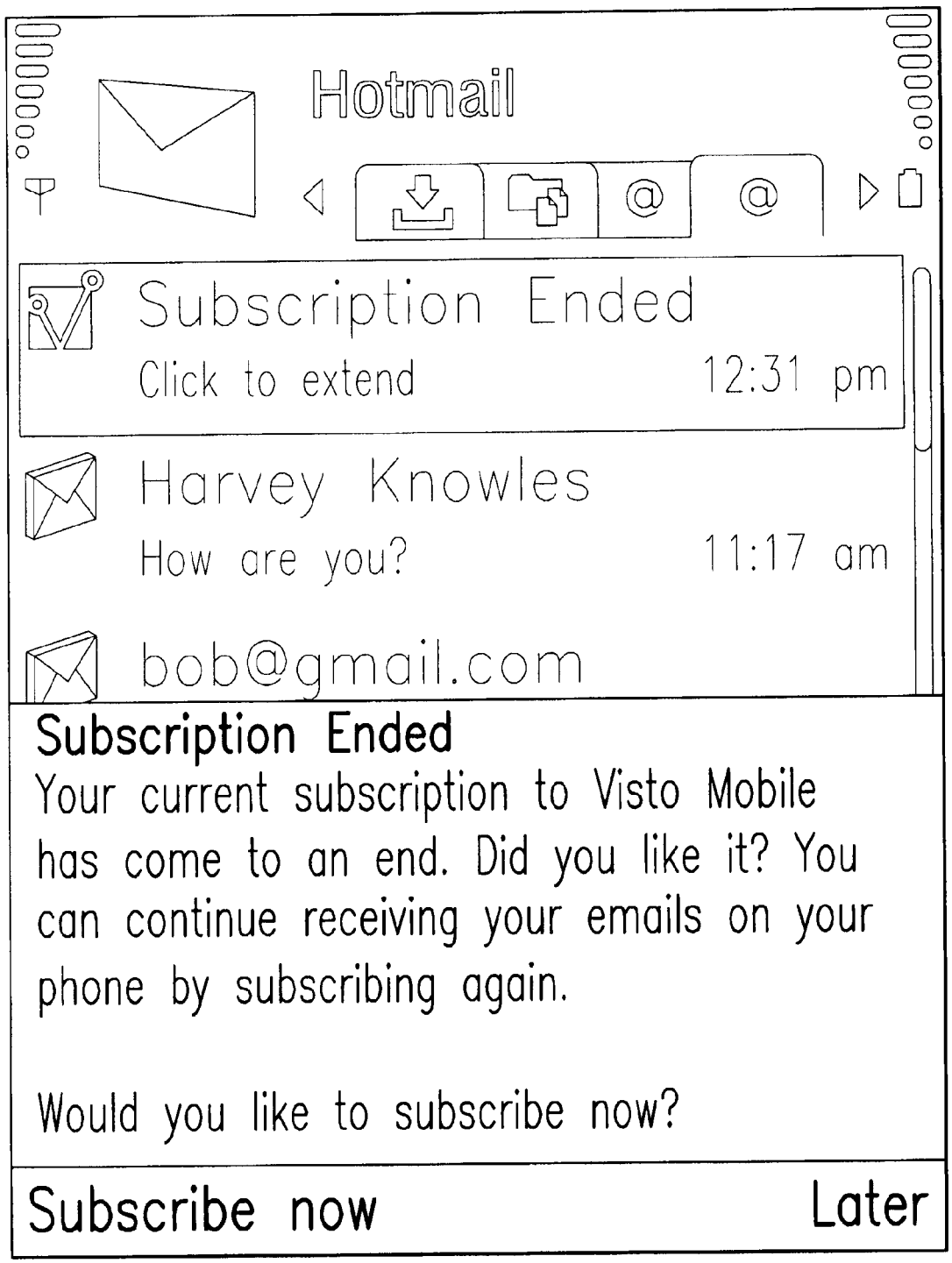
FIG. 53 is a screen shot of a subscription status notification screen for an embodiment of the present advancement.
Figure 59:
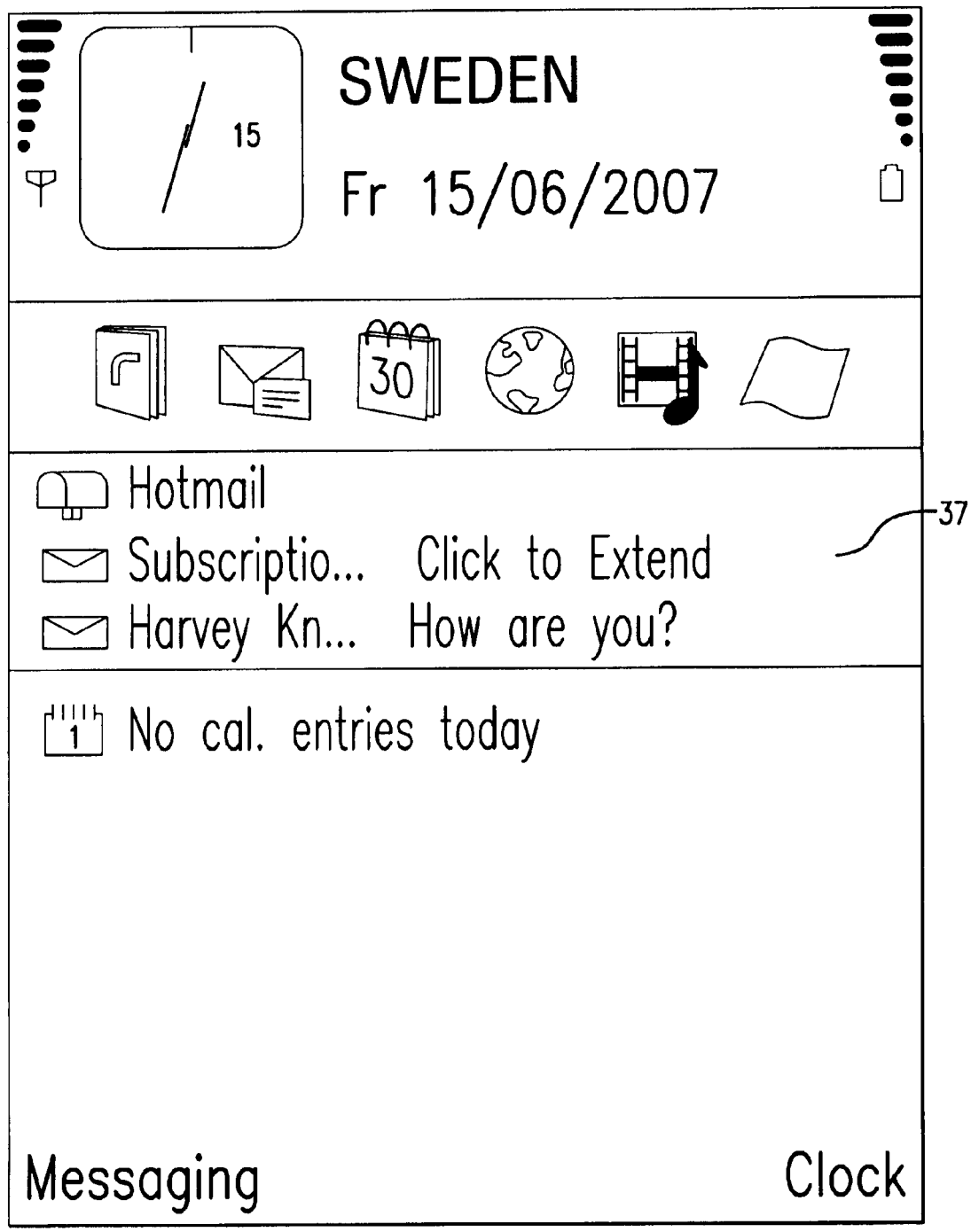

After the expiration of the trial/subscription period for the application, there will be a subscription alert 37 displayed in the user's inbox, as shown in FIG. 59. Alternatively, the user may change their subscription status manually, as shown in FIG. 52. The subscription prompt is visible in the inbox and on the Idle Screen. The user can also change their subscription from the main menu of the application, as seen in FIG. 52. Once the user has renewed their subscription, the subscription message is removed from the user's inbox and service is resumed. As shown in FIG. 53, service is temporarily suspended until the user renews their subscription. Available payment plans for the subscription are retrieved from a server and displayed in a menu as shown in FIG. 10.

Figure 54:
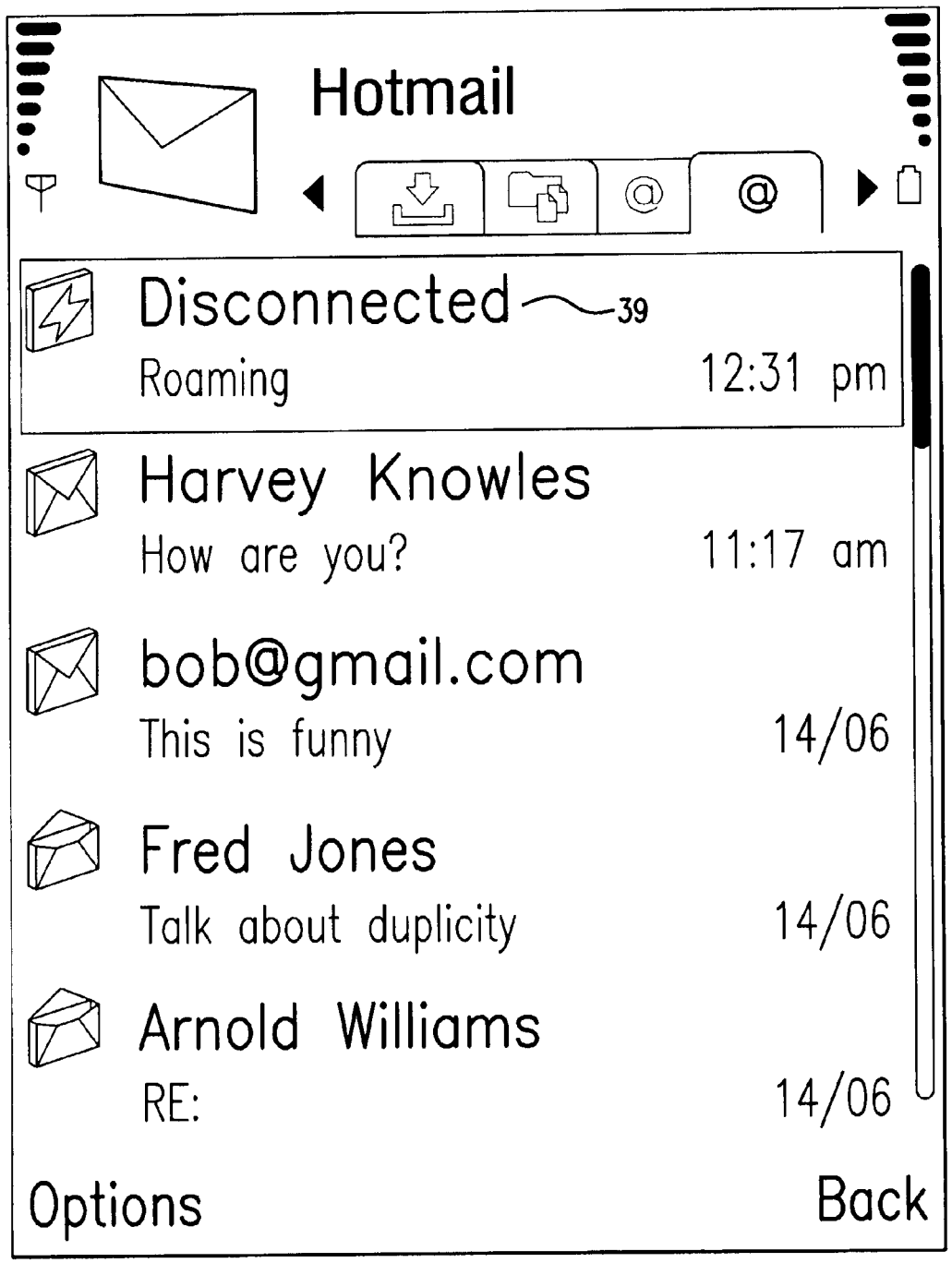
FIG. 54 is a screen shot of a message inbox for an embodiment of the present advancement.
Figure 55:
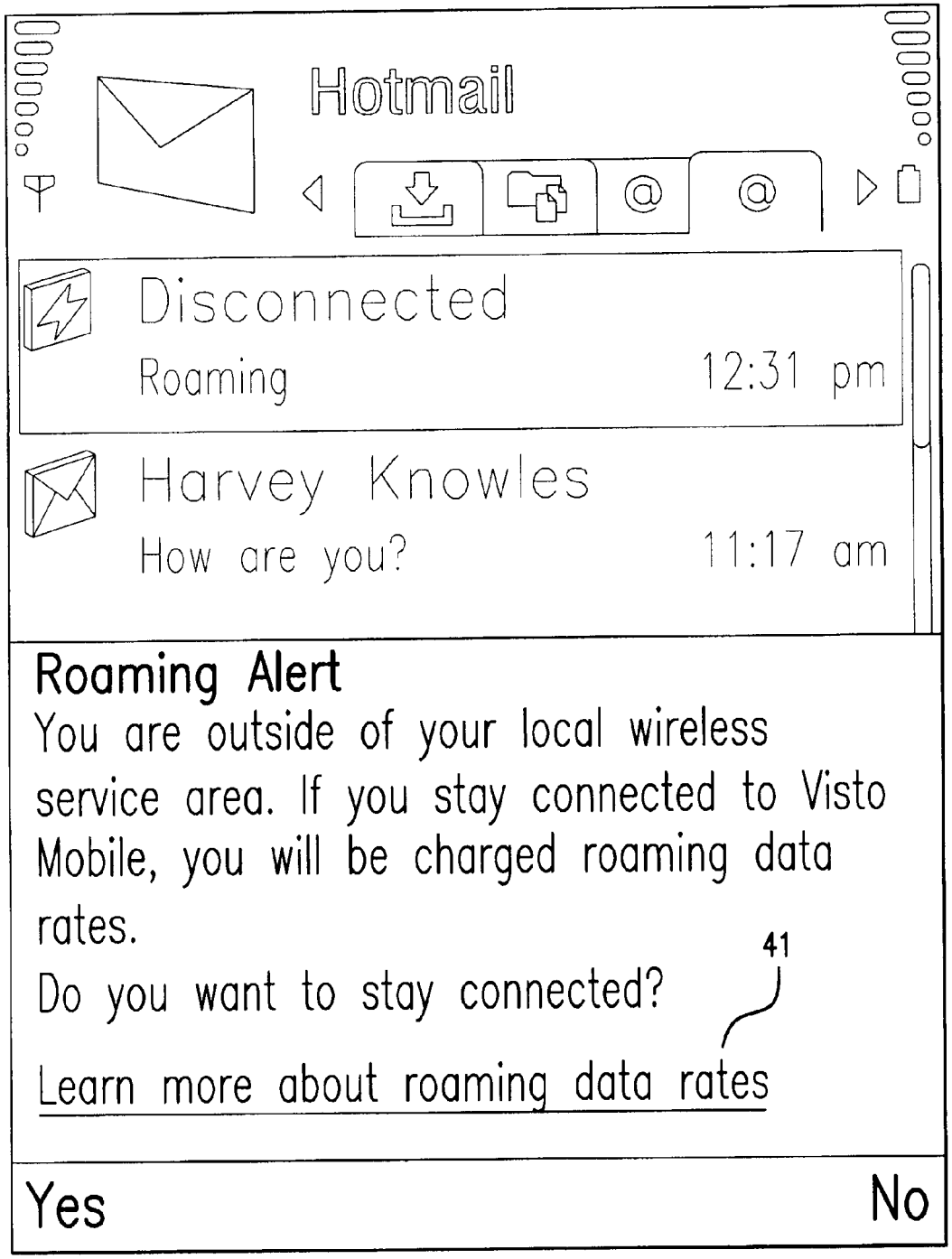
FIG. 55 is a screen shot of a roaming status notification screen for an embodiment of the present advancement.
Figure 56:
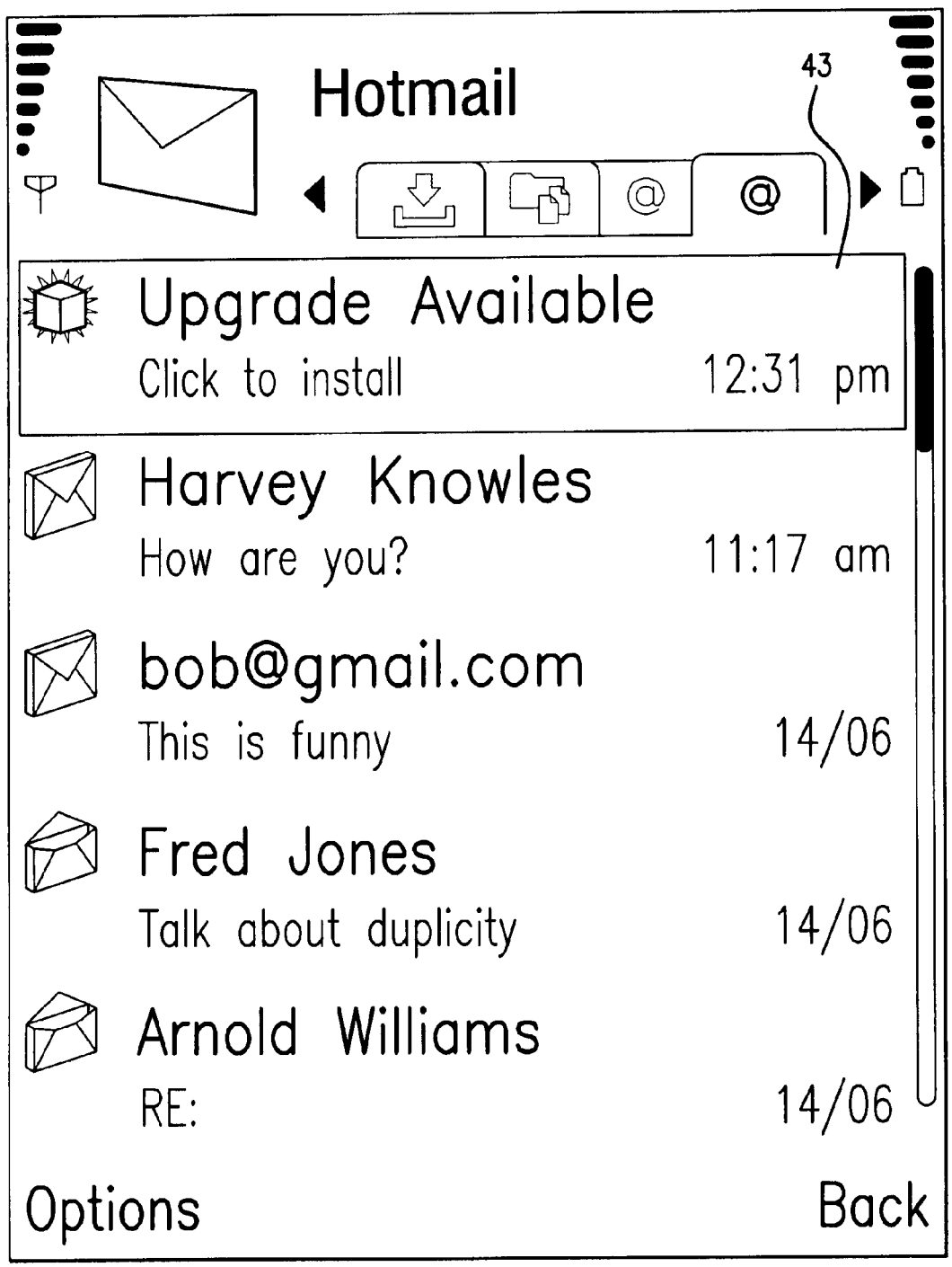
FIG. 56 is a screen shot of a message inbox for an embodiment of the present advancement.

The application can also automatically detect when the user's device is in a roaming mode. Initially, the service is temporarily suspended for use when roaming until the user accepts roaming data rates, or returns to the domestic network. The application alerts the user that they are roaming by an alert email 39 being sent to the user's inbox (shown in FIG. 54) notifying the user that they are roaming and that their service has been disconnected. Once the user selects the user alert message, a message as shown in FIG. 55 is displayed. FIG. 55 shows that a user can select a link 41 to find out more details about the roaming data rates they will incur if they stay connected in the roaming region. Once the user reads the message and accepts the roaming rates, the message is removed from the user's inbox (shown in FIG. 56) and service is resumed.

In some situations, it may be necessary to disconnect the client remotely and prompt the user to agree to terms & conditions before their service may be resumed. This can happen if the user's subscription has been changed out of band by a customer service representative. The message is removed only when the user agrees to the terms and conditions of the subscription.

Figure 57:
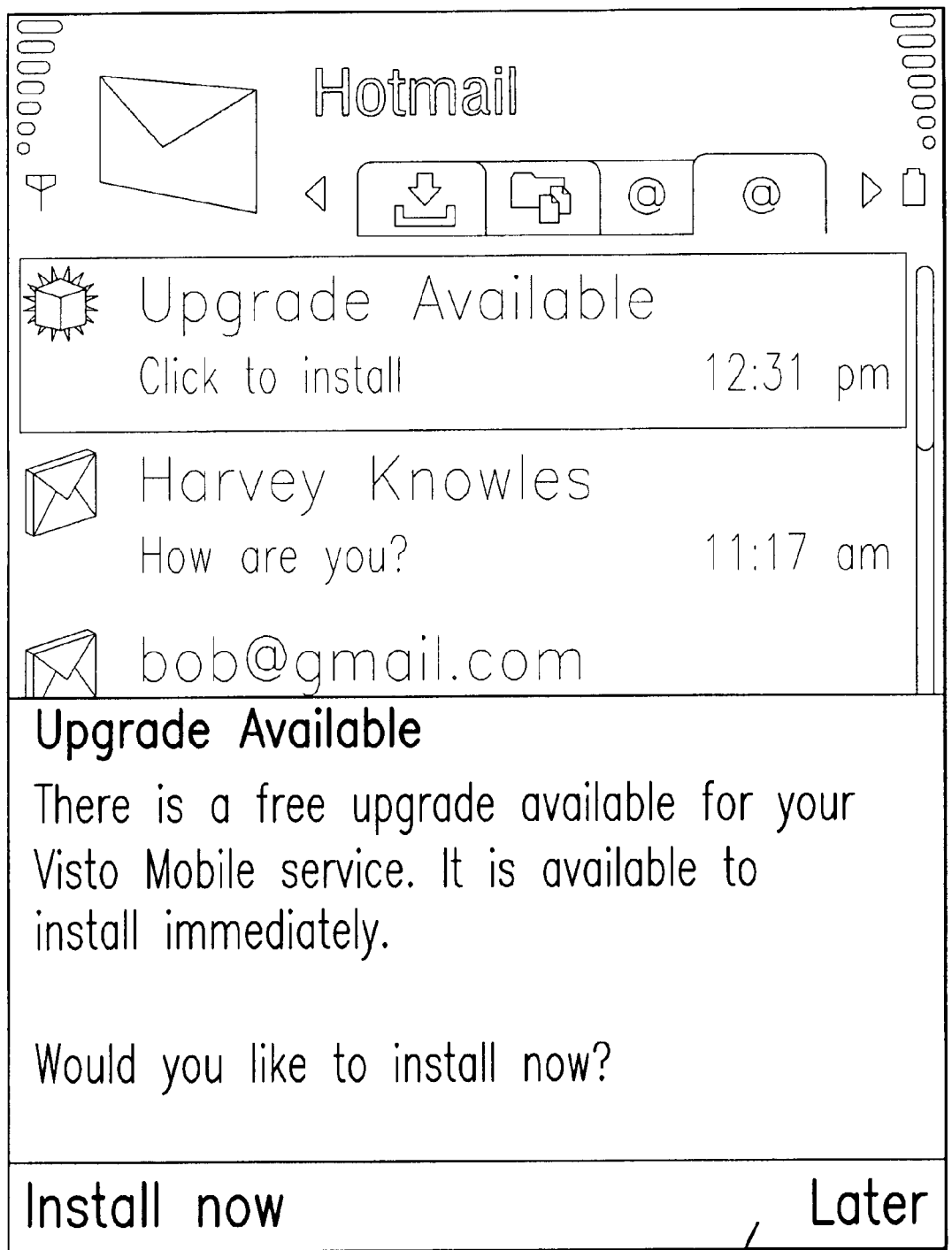
FIG. 57 is a screen shot of a upgrade notification screen for an embodiment of the present advancement.
Figure 58:
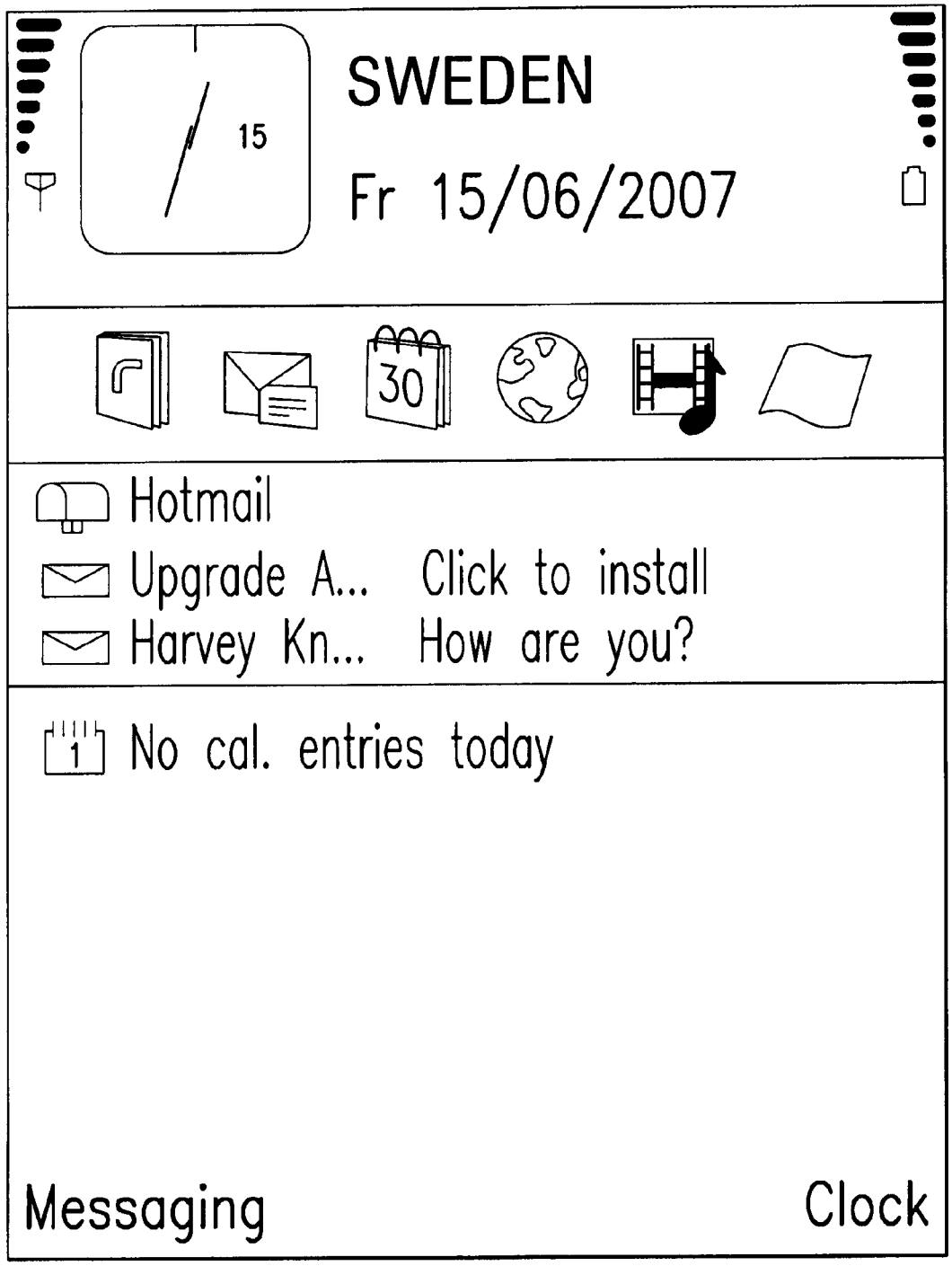
FIGS. 58 and 59 are screen shots of an active idle screen of an embodiment of the present advancement.

In an embodiment of the present advancement, new updates for the application are configured to be automatically downloaded and the user may be informed when an upgrade is available. The user then has the option to install the upgrade immediately or to defer installation of the upgrade until a later time. The upgrade notification message will remain visible in the inbox for as long as the user has not acted on the upgrade. The user is prompted to accept the upgrade when the user selects the upgrade notification message 43 displayed in their inbox. Once the user accepts the upgrade, the upgrade is installed automatically. As shown in FIG. 57, if the user dismisses the upgrade notification message 43 by clicking on the "Later" tab 45, the "Upgrade Available" prompt will return again the next day. Further, the Idle Screen, as shown in FIG. 58, will display the upgrade notification as long as it is available in the inbox.

In an embodiment of the present advancement, a message may be displayed by the application that signals to the user that a previously unavailable data channel for a premium account has become available and that data preparation must be performed. A service message will be created for each newly available data channel. Further, the application may be set to always display a connection state to the user. A disconnected state is communicated to the user in all display locations. Further, a "connected" state is the default message for the idle screen plug-in, which is displayed if there are no other messages.

Figure 61:
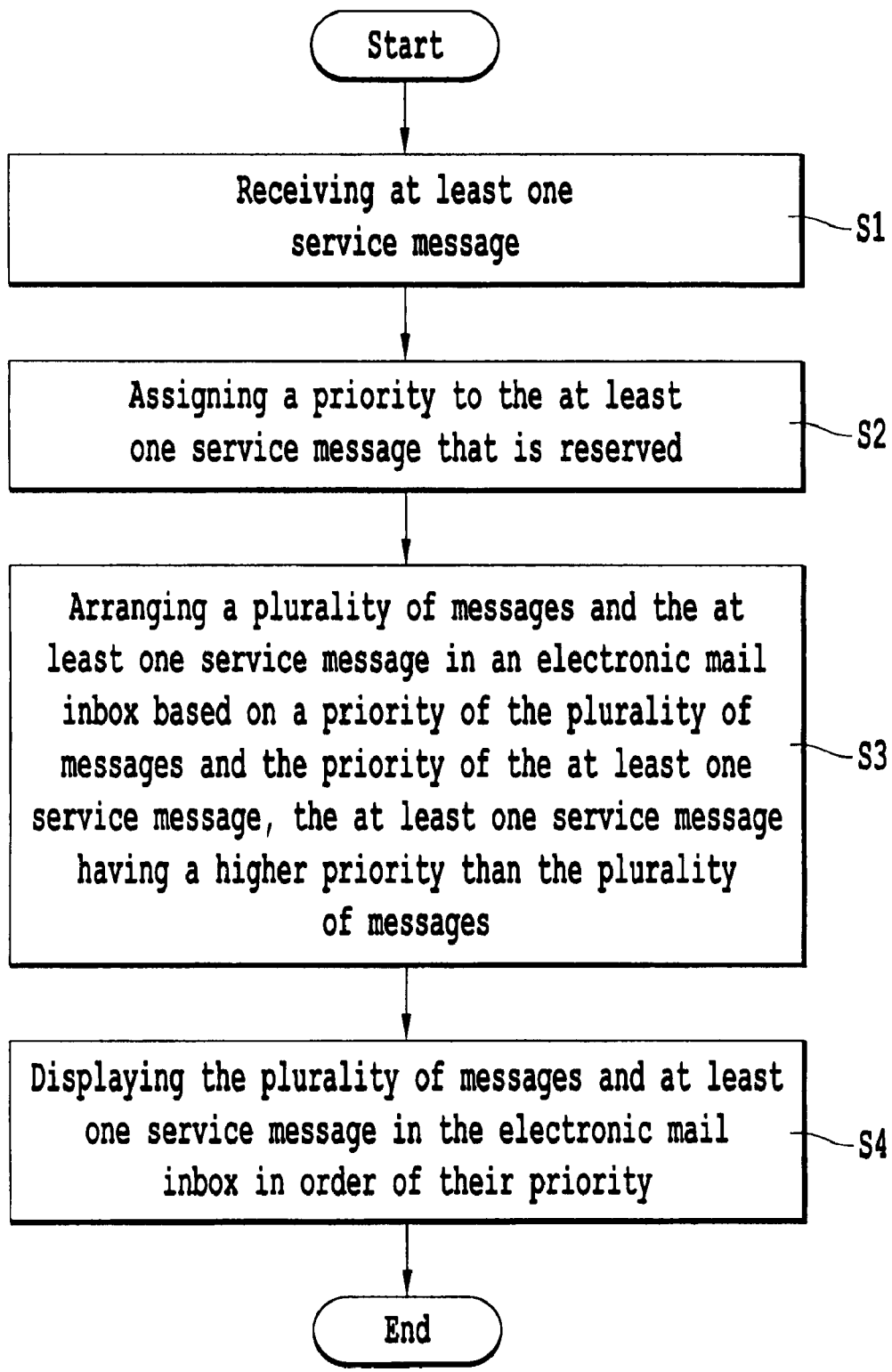
FIG. 61 is a flow chart of an exemplary method of the present advancement.

FIG. 61 is a flow chart describing the high level algorithm of managing service messages on a mobile device. In step S1, at least one service message is received. In step S2, a priority to the at least one service message that is received is assigned. In step S3, a plurality of messages and the at least one service message in an electronic mail inbox are arranged based on a priority of the plurality of messages and the priority of the at least one service message. The at least one service message has a higher priority than the plurality of messages, and thus greater importance is imparted on this message when it is arranged relative to other types of messages. Lastly, in step S4, the plurality of messages and at least one service message in the electronic mail inbox are displayed in order of their priority. The service message may be maintained in a position at the top of an inbox to alert a user of a service condition. In this way, especially active email users will not miss an important service condition.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software.

The invention claimed is:

1. A method for managing service messages on a mobile device, the mobile device having an e-mail application and at least one service application thereon, the service application being configured to generate service messages, the method comprising:
configuring the e-mail application to
receive at least one service state message generated by at least one service application;
assign a priority to the at least one service state message;
arrange a plurality of regular e-mail messages and the at least one service state message in an electronic mail inbox based on a priority of the plurality of regular e-mail messages and the priority of the at least one service state message, the at least one service state message having a higher priority than the plurality of regular e-mail messages; and
display the plurality of regular e-mail messages and the at least one service state message in the electronic mail inbox in order of their priority.

2. The method of claim 1, wherein the service state message includes information informing a user that an upgrade for the mobile device is available.

3. The method of claim 1, wherein the e-mail application is arranged to display the plurality of regular e-mail messages and the at least one service state message in the electronic mail inbox in order of priority such that the at least one service state message remains at a top of the electronic mail inbox.

4. The method of claim 1, wherein the service state message includes information informing a user of a service interruption with the mobile device.

5. The method of claim 4, wherein the service state message further includes information including steps that can be performed to correct the service interruption.

6. The method of claim 1, wherein the service state message includes information informing a user that the mobile device is in a roaming region.

7. The method of claim 6, wherein the mobile device is configured to go into a disconnected state when a roaming service state message is received by the mobile device, and the mobile device is configured to go into a connected state when a roaming subscription is selected.

8. The method of claim 1, wherein the service state message includes information informing a user that a service subscription has expired.

9. The method of claim 8, wherein the service state message includes information including steps that can be performed to renew the service subscription.

10. The method of claim 9, wherein the service state message further includes payment plan information and subscription duration information.

11. The method of claim 1, wherein, responsive to selection of the at least one service message in the electronic mail inbox, the method further comprises configuring the e-mail application to invoke a service message user interface, the service message user interface displaying at least one user selectable option relating to a service state identified in the service state message.

12. The method according to claim 11, wherein selection of the selectable option changes a connection state of the mobile device.

13. The method of claim 11, wherein, responsive to selection of the selectable option, the e-mail application removes the service state message from the electronic mail inbox.

14. A computer readable storage medium encoded with instructions which when executed by a computer cause the computer to cause a processor to execute a method for managing service state messages on a mobile device, the mobile device having an e-mail application and at least one service application thereon, the service application being configured to generate service state messages, the method comprising:
configuring the e-mail application to
receive at least one service state message generated by the at least one service application;
assign a priority to the received at least one service state message;
arrange a plurality of regular e-mail messages and the at least one service state message in an electronic mail inbox based on a priority of the plurality of regular e-mail messages and the priority of the at least one service state message, the at least one service state message having a higher priority than the plurality of regular e-mail messages; and
display the plurality of regular e-mail messages and the at least one service state message in the electronic mail inbox in order of their priority.

15. The computer readable storage medium of claim 14, wherein the service state message includes information informing a user that the mobile device is in a roaming region.

16. The computer readable storage medium of claim 14, wherein the service state message includes information informing a user that an upgrade for the mobile device is available.

17. The computer readable storage medium of claim 14, wherein the service state message includes information informing a user of a service interruption with the mobile device.

18. The computer readable storage medium of claim 17, wherein the service state message further includes information including steps that can be performed to correct the service interruption.

19. The computer readable storage medium of claim 14, wherein the service state message includes information informing a user that a service subscription has expired.

20. The computer readable storage medium of claim 19, wherein the service state message includes information including steps that can be performed to renew the service subscription.

21. The computer readable storage medium of claim 20, wherein the service state message further includes payment plan information and subscription duration information.

22. The computer readable storage medium of claim 21, wherein the mobile device is configured to go into a disconnected state when a roaming service state message is received by the mobile device, and the mobile device is configured to go into a connected state when a roaming subscription is selected.

23. A mobile communications device, comprising:
- at least one service application configured to generate a service state message; and
- an email application including
  - a receiving unit configured to receive at least one service state message generated by the at least one service application;
  - an assigning unit configured to assign priority to the received at least one service state message;
  - an arranging unit configured to arrange a plurality of regular e-mail messages and the at least one service state message in an electronic mail inbox based on a priority of the plurality of regular e-mail messages and the priority of the at least one service state message, the at least one service state message having a higher priority than the plurality of regular e-mail messages; and
  - a display unit configured to display the plurality of regular e-mail messages and the at least one service state message in the electronic mail inbox in order of their priority.

24. The method of claim 23, wherein the service state message includes information informing a user that an upgrade for the mobile device is available.

25. The mobile communication device of claim 23, wherein, responsive to selection of the at least one service state message in the electronic mail inbox, the e-mail application is further configured to invoke a service message user interface, a service message user interface displaying at least one user selectable option relating to the service state identified in the service state message.

26. The mobile communication device of claim 25, wherein, responsive to selection of the selectable option, a connection state of the mobile communication device is modified.

27. The mobile communication device of claim 25, wherein, responsive to selection of the selectable option, the e-mail application is arranged to remove the service state message from the electronic mail inbox.

28. The method of claim 23, wherein the service state message includes information informing a user of a service interruption with the mobile device.

29. The method of claim 28, wherein the service state message further includes information including steps that can be performed to correct the service interruption.

30. The method of claim 23, wherein the service state message includes information informing a user that the mobile device is in a roaming region.

31. The method of claim 30, wherein the mobile device is configured to go into a disconnected state when a roaming service state message is received by the mobile device, and the mobile device is configured to go into a connected state when a roaming subscription is selected.

32. The method of claim 23, wherein the service state message includes information informing a user that a service subscription has expired.

33. The method of claim 32, wherein the service state message includes information including steps that can be performed to renew the service subscription.

34. The method of claim 33, wherein the service state message further includes payment plan information and subscription duration information.

* * * * *